(12) United States Patent
Arbabi et al.

(10) Patent No.: US 10,670,782 B2
(45) Date of Patent: Jun. 2, 2020

(54) DISPERSIONLESS AND DISPERSION-CONTROLLED OPTICAL DIELECTRIC METASURFACES

(71) Applicant: CALIFORNIA INSTITUTE OF TECHNOLOGY, Pasadena, CA (US)

(72) Inventors: Ehsan Arbabi, Pasadena, CA (US); Amir Arbabi, Pasadena, CA (US); Seyedeh Mahsa Kamali, Pasadena, CA (US); Yu Horie, Pasadena, CA (US); Andrei Faraon, La Canada Flintridge, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 775 days.

(21) Appl. No.: 15/410,735

(22) Filed: Jan. 19, 2017

(65) Prior Publication Data
US 2017/0212285 A1     Jul. 27, 2017

Related U.S. Application Data

(60) Provisional application No. 62/281,913, filed on Jan. 22, 2016.

(51) Int. Cl.
*G06G 7/48* (2006.01)
*G02B 5/18* (2006.01)
*G02B 1/00* (2006.01)
*G02B 27/00* (2006.01)

(52) U.S. Cl.
CPC ........... *G02B 5/1847* (2013.01); *G02B 1/002* (2013.01); *G02B 5/1876* (2013.01); *G02B 27/0012* (2013.01); *G02B 27/0056* (2013.01)

(58) Field of Classification Search
None
See application file for complete search history.

(56) References Cited

U.S. PATENT DOCUMENTS

| | | |
|---|---|---|
| 8,830,556 B2 | 9/2014 | Smith et al. |
| 8,994,059 B2 | 3/2015 | Huh et al. |
| 9,054,424 B1 | 6/2015 | Hunt et al. |

(Continued)

FOREIGN PATENT DOCUMENTS

| | | |
|---|---|---|
| KR | 1020140113553 A | 9/2014 |
| WO | 2015-063762 A1 | 5/2015 |

(Continued)

OTHER PUBLICATIONS

Arbabi, Amir, et al. "Complete control of polarization and phase of light with high efficiency and sub-wavelength spatial resolution." arXiv preprint arXiv:1411.1494 (2014): 4308-4315.*

(Continued)

*Primary Examiner* — Rehana Perveen
*Assistant Examiner* — Nithya J. Moll
(74) *Attorney, Agent, or Firm* — Steinfl + Bruno LLP

(57) ABSTRACT

Metasurfaces comprise an array of pillars in a lattice. The dimensions of the pillars and the spacing are varied to obtain desired optical properties. The dispersionless metasurfaces can focus optical light over a broad wavelength range. Specific dispersion profiles for the metasurfaces can be designed. Gratings can be fabricated having similar properties as the array of pillars. Pillars in the metasurfaces can have different cross-section profiles.

12 Claims, 33 Drawing Sheets

(56) References Cited

U.S. PATENT DOCUMENTS

| | | |
|---|---|---|
| 9,385,435 B2 | 7/2016 | Bily et al. |
| 9,448,305 B2 | 9/2016 | Bowers et al. |
| 9,450,310 B2 | 9/2016 | Bily et al. |
| 9,482,796 B2 | 11/2016 | Arbabi et al. |
| 9,507,064 B2 | 11/2016 | Brongersma et al. |
| 9,618,680 B2 | 4/2017 | Baker et al. |
| 9,658,469 B2 | 5/2017 | Pugh et al. |
| 9,711,852 B2 | 7/2017 | Chen et al. |
| 9,733,545 B2 | 8/2017 | Belkin et al. |
| 9,806,414 B2 | 10/2017 | Chen et al. |
| 9,806,415 B2 | 10/2017 | Chen et al. |
| 9,806,416 B2 | 10/2017 | Chen et al. |
| 9,812,779 B2 | 11/2017 | Chen et al. |
| 9,995,859 B2 | 6/2018 | Kamali et al. |
| 9,995,930 B2 | 6/2018 | Arbabi et al. |
| 10,199,415 B2 | 2/2019 | Akselrod et al. |
| 10,267,956 B2 | 4/2019 | Arbabi et al. |
| 10,267,957 B2 | 4/2019 | Kamali et al. |
| 10,488,651 B2 | 11/2019 | Kamali et al. |
| 2003/0169504 A1 | 9/2003 | Kaminsky et al. |
| 2003/0170442 A1 | 9/2003 | Kaminsky et al. |
| 2003/0175004 A1 | 9/2003 | Garito et al. |
| 2003/0176777 A1 | 9/2003 | Muller-Dethlefs |
| 2005/0062928 A1 | 3/2005 | Yau et al. |
| 2005/0203364 A1 | 9/2005 | Monfre et al. |
| 2006/0176471 A1 | 8/2006 | Hendriks |
| 2006/0250613 A1 | 11/2006 | Demuth et al. |
| 2006/0276713 A1 | 12/2006 | Maier |
| 2007/0019306 A1 | 1/2007 | Wu et al. |
| 2007/0060806 A1 | 3/2007 | Hunter et al. |
| 2008/0161194 A1 | 7/2008 | Turner et al. |
| 2008/0186483 A1 | 8/2008 | Kiesel et al. |
| 2008/0219027 A1 | 9/2008 | Bourdelais et al. |
| 2009/0250110 A1 | 10/2009 | Yu et al. |
| 2010/0252721 A1 | 10/2010 | Xu |
| 2011/0105867 A1 | 5/2011 | Schultz et al. |
| 2011/0141541 A1 | 6/2011 | Bratkovski |
| 2011/0210459 A1 | 9/2011 | Bille |
| 2012/0038915 A1 | 2/2012 | Tsuchida et al. |
| 2012/0082863 A1 | 4/2012 | Ohta et al. |
| 2012/0113419 A1 | 5/2012 | Wang et al. |
| 2013/0208332 A1 | 8/2013 | Yu et al. |
| 2013/0337436 A1 | 12/2013 | Toury et al. |
| 2014/0085693 A1* | 3/2014 | Mosallaei ............... G02B 1/002 359/107 |
| 2014/0124033 A1 | 5/2014 | Dimitrakopoulos et al. |
| 2014/0146390 A1 | 5/2014 | Kaempfe et al. |
| 2014/0167022 A1 | 6/2014 | Huh et al. |
| 2014/0264998 A1 | 9/2014 | Smith et al. |
| 2014/0277433 A1 | 9/2014 | Pugh et al. |
| 2014/0277436 A1 | 9/2014 | Pugh et al. |
| 2015/0117032 A1 | 4/2015 | Hu et al. |
| 2015/0124480 A1 | 5/2015 | Baker et al. |
| 2015/0219806 A1 | 8/2015 | Arbabi et al. |
| 2015/0255876 A1* | 9/2015 | Volpe ..................... G02B 26/06 343/911 R |
| 2015/0309218 A1* | 10/2015 | Shalaev ................. G02B 1/002 359/241 |
| 2015/0323385 A1 | 11/2015 | Han et al. |
| 2016/0025914 A1 | 1/2016 | Brongersma et al. |
| 2016/0041095 A1 | 2/2016 | Rothberg et al. |
| 2016/0299337 A1 | 10/2016 | Arbabi et al. |
| 2016/0306079 A1 | 10/2016 | Arbabi et al. |
| 2016/0313477 A1 | 10/2016 | Orenstein et al. |
| 2016/0320531 A1 | 11/2016 | Kamali et al. |
| 2017/0010483 A1 | 1/2017 | Fainman et al. |
| 2017/0030773 A1 | 2/2017 | Han et al. |
| 2017/0045652 A1 | 2/2017 | Arbabi et al. |
| 2017/0097558 A1 | 4/2017 | Belkin et al. |
| 2017/0188901 A1 | 7/2017 | Faraon et al. |
| 2017/0195652 A1 | 7/2017 | Du et al. |
| 2017/0195659 A1 | 7/2017 | Du et al. |
| 2017/0212285 A1 | 7/2017 | Arbabi et al. |
| 2017/0250577 A1 | 8/2017 | Ho et al. |
| 2017/0351111 A1 | 12/2017 | Jeong et al. |
| 2018/0006376 A1 | 1/2018 | Black et al. |
| 2018/0042527 A1 | 2/2018 | Rawicz et al. |
| 2018/0275321 A1 | 9/2018 | Kamali et al. |
| 2018/0292644 A1 | 10/2018 | Kamali et al. |

FOREIGN PATENT DOCUMENTS

| | | |
|---|---|---|
| WO | 2016/140720 A2 | 9/2016 |
| WO | 2016/168173 A1 | 10/2016 |
| WO | 2016/171962 A1 | 10/2016 |
| WO | 2017/034995 A1 | 3/2017 |
| WO | 2017/176343 A2 | 10/2017 |
| WO | 2017/176921 A1 | 10/2017 |

OTHER PUBLICATIONS

Arbabi, Amir, et al. "Dielectric metasurfaces for complete control of phase and polarization with subwavelength spatial resolution and high transmission." Nature nanotechnology 10.11 (2015): 937.*

Arbabi E., "Multi-wavelength Optical Dieletric Metasurfaces" CIT 7159-p. 1-6. 2 pages.

Arbabi, E., et al., "Dispersionless Optical Dielectric Metasurfaces," CIT-7418-P, 1-2. 2 pages.

Faraon, A., et al., "Flat free-space optical elements based on dielectric metasurfaces," SPIE Newsroom 6375.

Final Office Action for U.S. Appl. No. 15/241,914, filed Aug. 19, 2016 on behalf of California Institute of Technology dated Jul. 24, 2019 23 pages.

International Preliminary Report on Patentability for International Application No. PCT/US2016/027086 filed on Apr. 12, 2016 on behalf of California Institute of Technology dated Oct. 17, 2017 8 pages.

International Preliminary Report on Patentability for International Application No. PCT/US2016/027154 filed on Apr. 12, 2016 on behalf of California Institute of Technology dated Oct. 24, 2017 6 pages.

International Preliminary Report on Patentability for International Application No. PCT/US2016/047811 filed on Aug. 19, 2016 on behalf of California Institute of Technology dated Feb. 27, 2018 9 pages.

International Preliminary Report on Patentability for International Application No. PCT/US2017/014197filed on Jan. 19, 2017 on behalf of California Institute of Technology, dated Aug. 2, 2018. 2pages.

Non-Final Office Action for U.S. Appl. No. 15/096,615, filed Apr. 12, 2016, on behalf of California Institute of Technology, dated Oct. 29, 2018. 16 pages.

Non-Final Office Action for U.S. Appl. No. 15/241,914, filed Aug. 19, 2016 on behalf of California Institute of Technology, dated Mar. 13, 2019. 26 pages.

Non-Final Office Action for U.S. Appl. No. 15/975,521, filed Apr. 12, 2016, on behalf of California Institute of Technology, dated Sep. 18, 2018. 10 pgs.

Non-Final Office Action for U.S. Appl. No. 15/948,677, filed Apr. 9, 2018 on behalf of California Institute of Technology, dated Jul. 9, 2019. 16 pages.

Notice of Allowance for U.S. Appl. No. 15/975,521, filed May 9, 2018, on behalf of California Institute of Technology, dated Jan. 22, 2019. 10 pages.

Notice of Allowance for U.S. Appl. No. 15/096,615, filed Apr. 12, 2016, on behalf of California Institute of Technology, dated Feb. 13, 2019. 12 pages.

Restriction Requirement for U.S. Appl. No. 15/096,615, filed Apr. 12, 2016 on behalf of California Institute of Technology; dated May 30, 2018. 7 pages.

Silva, A., et al., "Performing mathematical operations with metamaterials," Science 343, 160-163 (2014).

Staude et al. "Tailoring Directional Scattering through Magnetic and Electric REsonances in Subwavelength Silicon Nanodisks" *ACS Nano, American Chemical Society*.2013. pp. 7824-7832. vol. 7, No. 9. 9 pgs.

(56) References Cited

OTHER PUBLICATIONS

West et al. "All-dielectric subwavelength metasurface focusing lens" *Optics Express, The Optical Society*.Oct. 20, 2014. vol. 22, No. 21. 10 pgs.

Yu Y.F., et al., "High-transmission dielectric metasurface with 2π phase control at visible wavelengths," Laser Photon. Rev. 9, 412-418 (2015).

International Search Report dated Oct. 31, 2017 for PCT/US2017/014197 filed on Jan. 19, 2017 in the name of California Institute of Technology 5 pages.

Written Opinion dated Oct. 31, 2017 for PCT/US2017/014197 filed on Jan. 19, 2017 in the name of California Institute of Technology 6 pages.

Aieta, F., et al., "Aberrations of Flat Lenses and Aplanatic Metasurfaces." *Optics Express* 21(25), 31530-31539 (2013).

Aieta, F., et al., "Aberration-Free Ultrathin Flat Lenses and Axicons at Telecom Wavelengths Based on Plasmonic Metasurfaces." *Nano Letters* 12, 4932-4936 (2012).

Aieta, F., et al., "Multiwavelength Achromatic Metasurfaces by Dispersive Phase Compensation." *Science* 347, 1342-1345 (2015). 5 pages.

Arbabi, A., et al., "Complete Control of Polarization and Phase of Light with High Efficiency and Sub-wavelength Spatial Resolution." arXiv:1411.1494, [physics.optics] (2014). 10 pages.

Arbabi, A., et al., "Controlling the Phase Front of Optical Fiber Beams using High Contrast Metastructures." *CLEO* (2014). 2 pages.

Arbabi, A., et al., "Dielectric Metasurfaces for Complete Control of Phase and Polarization with Subwavelength Spatial Resolution and High Transmission." *Nature Nanotechnology* 10, 937-943 (2015). 28 pages.

Arbabi, A., et al., "Efficient High NA Flat Micro-Lenses Realized Using High Contrast Transmitarrays," *Proc. SPIE* (2015). 7 pages.

Arbabi, A. et al., "Fundamental Limits of Ultrathin Metasurfaces." arXiv:1411.2537 (2014). 6 pages.

Arbabi, A., et al., "Highly Efficient Polarization Control Using Subwavelength High Contrast Transmitarrays." *Proc. SPIE* (2015). 7 pages.

Arbabi, A., et al., "Miniature Optical Planar Camera Based on a Wide-Angle Metasurface Doublet Corrected for Monochromatic Aberrations." *Nature Communications* 7:13682 (2016). 9 pages.

Arbabi, E., et al., "Multiwavelength Polarization-Insensitive Lenses Based on Dielectric Metasurfaces with Meta-Molecules." *Optica* 3, 628-633 (2016).

Arbabi, A., et al., "Subwavelength-Thick Lenses with High Numerical Apertures and Large Efficiency Based on High Contrast Transmitarrays." arXiv:1410.8261 [physics.optics] (2014). 10 pages.

Arbabi, A., et al., "Subwavelength-Thick Lenses with High Numerical Apertures and Large Efficiency Based on High-Contrast Transmitarrays." *Nature Communications* 6:7069 (2015). 6 pages.

Astilean, S., et al., "High-Efficiency Subwavelength Diffractive Element Patterned in a High-Refractive-Index Material for 633 nm." *Optics Letters* 23, 552-554 (1998). 4 pages.

Bennett, S. J. "Achromatic Combinations of Hologram Optical Elements." *Applied Optics* 15, 542-545 (1976).

Buralli, D. A., et al., "Some Fundamental Limitations of Achromatic Holographic Systems." *J. Opt. Soc. Am. A* 6(12), 1863-1868 (1989).

Chen, Y., et al., "Engineering the Phase Front of Light with Phase-Change Material Based Planar Lenses," *Scientific Reports* 5:8660 (2015). 7 pages.

Cheng, J., et al., "Truly Achromatic Optical Metasurfaces: A Filter Circuit Theory-Based Design." *Journal of the Optical Society of America B* 32, 2115-2121 (2015). 8 pages.

Chong, K. E., et al., "Polarization-Independent Silicon Metadevices for Efficient Optical Wavefront Contro.l" *Nano Letters* 15, 5369-5374 (2015). 25 pages.

Decker, M. et al. "High-Efficiency Dielectric Huygens' Surfaces." *Advanced Optical Materials* 3, 813-820 (2015).

Di Falco, A., et al., "Flexible Metamaterials at Visible Wavelengths." *New Journal of Physics* 12:113006 (2010). 8 pages.

Donner, J. S., et al., "Fast and Transparent Adaptive Lens Based on Plasmonic Heating." *ACS Photonics* 2, 355-360 (2015).

Eisenbach, O., et al., "Metasurfaces Based Dual Wavelength Diffractive Lenses." *Optics Express* 23, 3928-3936 (2015).

Ergin, T., et al., "Three-Dimensional Invisibility Cloak at Optical Wavelengths." *Science* 328, 337-339 (2010). 4 pages.

Faklis, D., et al., "Spectral Properties of Multiorder Diffractive Lenses." *Applied Optics* 34(14), 2462-2468 (1995).

Fan, P. et al. "An Invisible Metal-Semiconductor Photodetector." *Nature Photonics* 6, 380-385 (2012).

Fattal, D., et al., "Flat Dielectric Grating Reflectors with Focusing Abilities." *Nature Photonics* 4, 466-470 (2010). 5 pages.

Gutruf, P., et al., "Mechanically Tunable Dielectric Resonator Metasurfaces at Visible Frequencies." *ACS Nano.* 10, 133-141 (2016). 30 pages.

He, J., et al., "Inorganic Materials and Assembly Techniques for Flexible and Stretchable Electronics." *Proc. IEEE* 103, 619-632 (2015).

HOLO/OR, The Early Pioneer of Diffractive Optics Since 1989, Tahei Boeki Co Ltd.

Huang, Y.-W., et al., "Gate-Tunable Conducting Oxide Metasurfaces." *Nano Letters* 16, 5319-5325, arXiv:1511.09380 preprint (2015). 13 pages.

Jahani, S., et al., "All-Dielectric Metamaterials." *Nature Nanotechnology* 11, 23-36 (2016).

Kamali, S. M., et al., "Highly Tunable Elastic Dielectric Metasurface Lenses." *Laser & Photonics Reviews* 10(6), 1002-1008, arXiv:1604.03597 (2016). 7 pages.

Kamali, S. M., et al., "Decoupling Optical Function and Geometrical Form Using Conformal Flexible Dielectric Metasurfaces." *Nature Communications* 7:11618 (2016). 7 pages.

Karimi, E. et al. "Generating Optical Orbital Angular Momentum at Visible Wavelengths Using a Plasmonic Metasurface." *Light: Science & Applications* 3, e167 (2014). 4 pages.

Khorasaninejad, M. et al. "Achromatic Metasurface Lens at Telecommunication Wavelengths." *Nano Letters* 15, 5358-5362 (2015).

Kildishev, A. V., et al., "Planar Photonics with Metasurfaces." *Science* 339, 1232009 (2013). 9 pages.

Knapp, D. J. "Fundamentals of Conformal Dome Design." *Proc. SPIE* 4832, 394-409 (SPIE, 2002).

Koenderink, A. F., et al., "Nanophotonics: Shrinking Light-Based Technology." *Science* 348, 516-521 (2015).

Lalanne, P., et al., "Blazed Binary Subwavelength Gratings with Efficiencies Larger than Those of Conventional Echelette Gratings." *Optics Letters* 23, 1081-1083 (1998). 4 pages.

Lalanne, P., et al., "Design and fabrication of blazed binary diffractive elements with sampling periods smaller than the structural cutoff." *J. Opt. Soc. Am. A* 16, 1143-1156 (1999).

Lalanne, P. "Waveguiding in Blazed-Binary Diffractive Elements." *J. Opt. Soc. Am. A* 16, 2517-2520 (1999). 5 pages.

Latta, J. N. "Analysis of Multiple Hologram Optical Elements with Low Dispersion and Low Aberrations." *Applied Optics* 11, 1686-1696 (1972).

Lee, J. et al., "Giant Nonlinear Response from Plasmonic Metasurfaces Coupled to Intersubband Transitions." *Nature* 511, 65-69 (2014). 11 pages.

Li, X., et al., "Tunable Binary Fresnel Lens Based on Stretchable PDMS/CNT Composite," in "*Solid-State Sensors, Actuators and Microsystems (Transducers), 2015 Transducers—2015 18th International Conference on IEEE*," 2041-2044 (2015).

Lin, D., et al., "Dielectric Gradient Metasurface Optical Elements." *Science* 345, 298-302 (2014). 6 pages.

Liu, V., et al., "S4: A Free Electromagnetic Solver for Layered Periodic Structures." *Computer Physics Communications* 183, 2233-2244 (2012).

Ni, X., et al., "Ultra-Thin, Planar, Babinet-Inverted Plasmonic Metalenses." *Light: Science & Applications* 2, e72 (2013). 6 pages.

Ni, X., et al., "An Ultrathin Invisibility Skin Cloak for Visible Light." *Science* 349, 1310-1314 (2015). 6 pages.

Oskooi, A. F. et al. "Meep: A Flexible Free-Software Package for Electromagnetic Simulations by the FDTD Method." *Computer Physics Communications* 181, 687-702 (2010). 30 pages.

(56) References Cited

OTHER PUBLICATIONS

Pelrine, R., et al., "High-Speed Electrically Actuated Elastomers with Strain Greater Than 100%." *Science* 287, 836-839 (2000).
Piggott, A.Y., et al., "Inverse Design and Demonstration of a Compact and Broadband On-Chip Wavelength Demultiplexer." *Nature Photonics* 9, 374-377 (2015). 5 pages.
Pryce, I. M., et al., "Highly Strained Compliant Optical Metamaterials with Large Frequency Tunability." *Nano Letters* 10, 4222-4227 (2010).
Rogers, J. A., et al., "Materials and Mechanics for Stretchable Electronics," *Science* 327, 1603-1607 (2010).
Sauvan, C., et al., "Broadband Blazing with Artificial Dielectrics." *Optics Letters* 29, 1593-1595 (2004). 4 pages.
Simonov, A.N., et al., "Light Scanner Based on a Viscoelastic Stretchable Grating." *Optics Letters* 30, 949-951 (2005).
Shannon, R. R. Overview of Conformal Optics. *Proc. SPIE 3705, Window and Dome Technologies and Materials VI*, in AeroSense'99, 180-188 (1999). 11 pages.
Shao, J.W., et al., "In Vivo Blood Glucose Quantification Using Raman Spectroscopy." *Plos One*, 7(10), e48127 (2012). 6 pages.
Swanson, G. J. "Binary Optics Technology: The Theory and Design of Multi-level Diffractive Optical Elements." *Technical Report 854, DTIC Document* (1989). 53 pages.
Sweatt, W. C. "Achromatic Triplet Using Holographic Optical Elements." *Applied Optics* 16, 1390-1391 (1977).
Teo, J. Y. H., et al., "Controlling Electromagnetic Fields at Boundaries of Arbitrary Geometries." *Physical Review A* 94, 023820, arXiv:1509.06175, (2015). 11 pages.
Thompson, K. P., et al., "Freeform Optical Surfaces: A Revolution in Imaging Optical Design." *Optics & Photonics News* 23, 30-35 (2012).
Valentine, J., et al., "An Optical Cloak Made of Dielectrics." *Nature Materials* 8, 568-571 (2009).
Viventi, J., et al., "Flexible, Foldable, Actively Multiplexed, High-Density Electrode Array for Mapping Brain Activity in vivo." *Nat Neurosci.* 14, 1599-1605 (2011). 20 pages.
Vo, S., et al., "Sub-Wavelength Grating Lenses with a Twist." *IEEE Photonics Technology Letters* 26, 1375-1378 (2014).
Walia, S., et al. "Flexible Metasurfaces and Metamaterials: A Review of Materials and Fabrication Processes at Micro- and Nano-Scales." *Applied Physics Reviews* 2, 011303 (2015). 16 pages.
Wang, Q., et al., "Optically Reconfigurable Metasurfaces and Photonic Devices Based on Phase Change Materials." *Nature Photonics* 10, 60-65 (2016). 13 pages.
Wang, Y., et al., "Achromatic Fresnel Optics for Wideband Extreme-Ultraviolet and X-ray Imaging." *Nature* 424, 50-53 (2003).
Wang, C., et al., "User-Interactive Electronic Skin for Instantaneous Pressure Visualization." *Nature Materials* 12, 899-904 (2013). 23 pages.
Weingartner, I., et al., "Chromatic Correction of Two- and Three-Element Holographic Imaging Systems." *Optica Acta* 29, 519-529 (1982). 15 pages.
Xu, X., et al., "Flexible Visible-Infrared Metamaterials and Their Applications in Highly Sensitive Chemical and Biological Sensing." *Nano Letters* 11, 3232-3238 (2011).
Yao, Y., et al., "Electrically Tunable Metasurface Perfect Absorbers for Ultrathin Mid-Infrared Optical Modulators," *Nano Letters* 14, 6526-6532 (2014).
Yin, X., et al., "Photonic Spin Hall Effect at Metasurfaces." *Science* 339, 1405-1407 (2013).
Young, M. "Zone Plates and Their Aberrations." *Journal of the Optical Society of America* 62, 972-976 (1972).
Yu, N., et al., "Flat Optics with Designer Metasurfaces." *Nature Materials* 13, 139-150 (2014).
Zhao, Z., et al., "Multispectral Optical Metasurfaces Enabled by Achromatic Phase Transition." *Scientific Reports* 5, 15781 (2015). 9 pages.
Zheng, G., et al., "Metasurface Holograms Reaching 80% Efficiency." *Nature Nanotechnology* 10, 308-312 (2015). 6 pages.
Zhu, L., et al., "Flexible Photonic Metastructures for Tunable Coloration," *Optica* 2, 255-258 (2015).
International Search Report for PCT/US2016/027086 filed on Apr. 12, 2016 on behalf of California Institute of Technology, dated Jul. 20, 2016. 3 pages.
Written Opinion for PCT/US2016/027086 filed on Apr. 12, 2016 on behalf of California Institute of Technology, dated Jul. 20, 2016. 7 pages.
International Search Report for PCT/US2016/027154 filed on Apr. 12, 2016 on behalf of California Institute of Technology, dated Jul. 20, 2016. 4 pages.
Written Opinion for PCT/US2016/027154 filed on Apr. 12, 2016 on behalf of California Institute of Technology, dated Jul. 20, 2016. 5 pages.
International Search Report for PCT/US2016/047811 filed on Aug. 19, 2016 on behalf of California Institute of Technology, dated Oct. 31, 2016. 8 pages.
Written Opinion for PCT/US2016/047811 filed on Aug. 19, 2016 on behalf of California Institute of Technology, dated Oct. 31, 2016. 8 pages.
Restriction Requirement for U.S. Appl. No. 15/097,101, filed Apr. 12, 2016 on behalf of California Institute of Technology, dated Aug. 17, 2017. 6 pages.
Notice of Allowance for U.S. Appl. No. 15/097,101, filed Apr. 12, 2016 on behalf of California Institute of Technology, dated Jan. 11, 2018. 11 pages.
Notice of Allowance for U.S. Appl. No. 15/097,101, filed Apr. 12, 2016 on behalf of California Institute of Technology, dated Apr. 20, 2018. 12 pages.
Non-Final Office Action for U.S. Appl. No. 15/241,914, filed Aug. 19, 2016 on behalf of California Institute of Technology, dated Dec. 13, 2017. 13 pages.
Final Office Action for U.S. Appl. No. 15/241,914, filed Aug. 19, 2016 on behalf of California Institute of Technology, dated May 1, 2018. 21 pages.
Non-Final Office Action for U.S. Appl. No. 15/241,914, filed Aug. 19, 2016 on behalf of California Institute of Technology dated Feb. 5, 2020 13 pages.
Notice of Allowance for U.S. Appl. No. 15/948,677, filed Apr. 9, 2018 on behalf of California Institute of Technology, dated Sep. 25, 2019. 11 Pages.

\* cited by examiner

DISPERSIONLESS AND DISPERSION-CONTROLLED OPTICAL DIELECTRIC METASURFACES

CROSS REFERENCE TO RELATED APPLICATIONS

The present application claims priority to U.S. Provisional Patent Application No. 62/281,913, filed on Jan. 22, 2016, and may be related to U.S. patent application Ser. No. 15/096,615, filed on Apr. 12, 2016, the disclosures of both of which being incorporated herein by reference in their entirety.

STATEMENT OF INTEREST

This invention was made with government support under Grant No. W911NF-14-1-0345 awarded by the Army, Grant no. DE-SC0001293 awarded by the Department of Energy and Grant no. CBET1512266 awarded by the National Science Foundation. The government has certain rights in the invention.

TECHNICAL FIELD

The present disclosure relates to nanophotonics. More particularly, it relates to dispersionless and dispersion-controlled optical dielectric metasurfaces.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIGS. 23-24 illustrate simulated axial intensity distribution for exemplary focusing mirrors with different dispersions designed using the reflective α-Si nano-posts discussed with reference to FIG. 13, panel a.

SUMMARY

Figure 1:
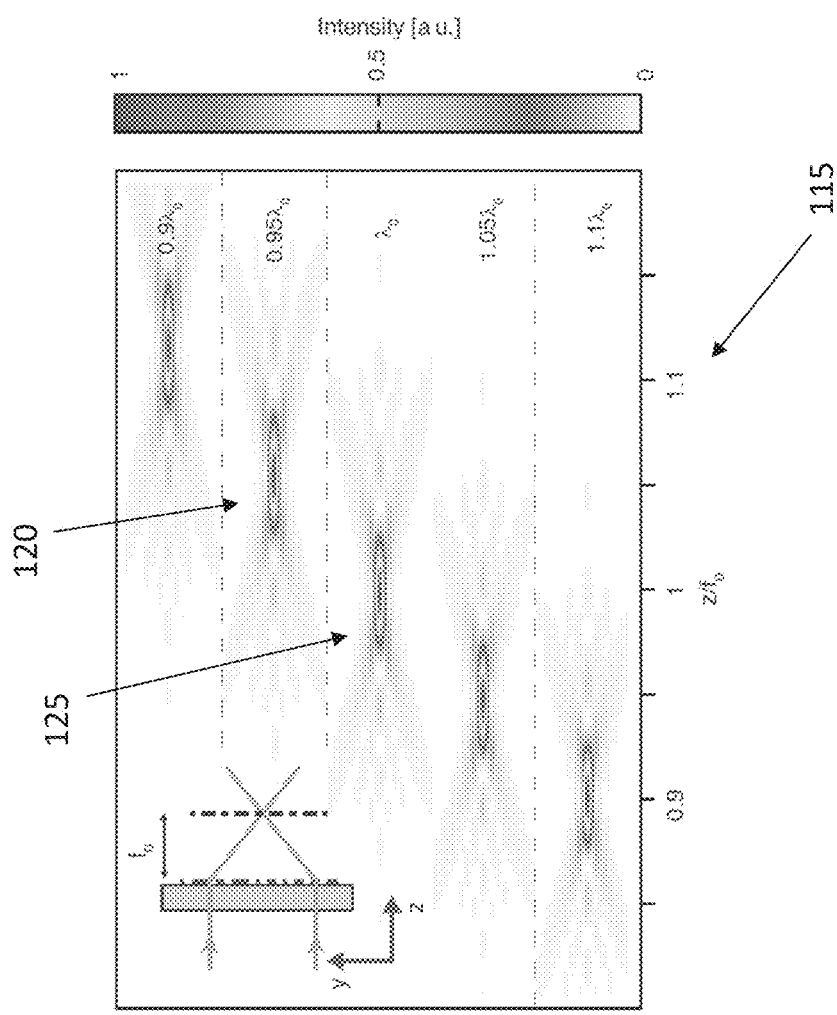
FIG. 1 illustrates different focus locations for lenses.
Figure 1:
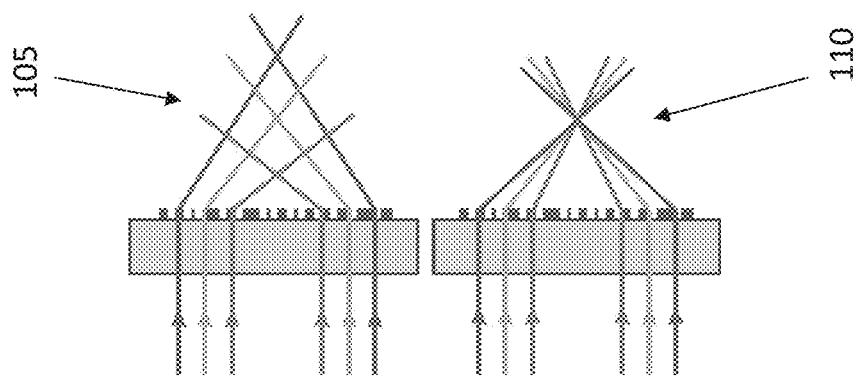

In a first aspect of the disclosure, a method is described, the method comprising: setting a desired phase and chromatic dispersion for a diffractive metasurface device having a desired functionality over a bandwidth; calculating a phase and chromatic dispersion of a scattering element for electromagnetic waves incident on the scattering element, as a function of wavelength of the electromagnetic waves, and as a function of geometrical dimensions of the scattering element; at a plurality of locations on the diffractive metasurface device, minimizing an error between the desired phase and chromatic dispersion of the diffractive metasurface device and the calculated phase and chromatic dispersion of the scattering element, the minimizing being by varying the geometrical dimensions of the scattering element; and designing the diffractive metasurface device by arranging, at each location of the plurality of locations, a scattering element that minimizes the error.

DETAILED DESCRIPTION

Optical metasurfaces are diffractive thin structures that can modify the amplitude, phase, and polarization of light beams for various applications. High contrast dielectric metasurfaces, which are arrays of high refractive index scatterers in a low index medium, have shown high versatility and efficiency in various optical functionalities, see Refs. [1-5]. However, similarly to other diffractive optical devices, metasurfaces can have significant chromatic dispersions that are normally much higher than refractive devices. The present disclosure describes a method for designing dispersionless and dispersion-controlled metasurfaces that can keep a specific functionality over a wider wavelength range than other metasurfaces known in the art.

Generally, optical metasurfaces are structures with subwavelength thicknesses relative to the electromagnetic wavelength range the structures are meant to operate in. In other words, optical metasurfaces are thinner than a wavelength and can therefore shape the amplitude, phase, and polarization of electromagnetic beams. In the present disclosure, reference may be made to the visible light spectrum specifically, or to optical waves, however similar considerations can be valid also for electromagnetic waves outside the visible light spectrum.

Dielectric metasurfaces are, in some embodiments, arrays of dielectric scatterers placed on two dimensional lattices, the array having the capability to control the phase, amplitude, and polarization of light. In some embodiments, an array will comprise a large number of scatterers. The present disclosure describes a method for designing dispersionless metasurfaces that can maintain their functionality over a wide range, or bandwidth of light, or other electromagnetic waves. In some embodiments, the method disclosed herein is based on using meta-atoms that can cover multiple full $2\pi$ phase shifts with different dispersions. In other words, the meta-atoms have phases that change with different rates as the wavelength is varied. The meta-atoms may also be referred to as scatterers or scattering elements. The present disclosure also describes exemplary results for a corrected focusing metasurface mirror that shows a significant increase in the working bandwidth of the device, when compared to a normal metasurface focusing mirror as would be known in the prior art.

Diffraction gratings disperse light in a rainbow of colors with the opposite order than refractive prisms, a phenomenon known as negative dispersion [6, 7]. While refractive dispersion can be controlled via material refractive index, diffractive dispersion is fundamentally an interference effect dictated by geometry. The present disclosure describes how this fundamental property can be altered using dielectric metasurfaces [8, 9, 10]. The present disclosure also describes experimental results of diffractive gratings and focusing mirrors with positive, zero, and hyper negative dispersion. These optical elements can be implemented using a reflective metasurface composed of dielectric nanoposts that provide simultaneous control over phase and its wavelength derivative. In some embodiments, an exemplary focusing mirror is described, that exhibits a five-fold reduction in chromatic dispersion, and thus an almost three times increase in operation bandwidth compared to a regular diffractive element. The present disclosure challenges the generally accepted dispersive properties of diffractive optical devices and extends their applications and functionalities.

Figure 8:
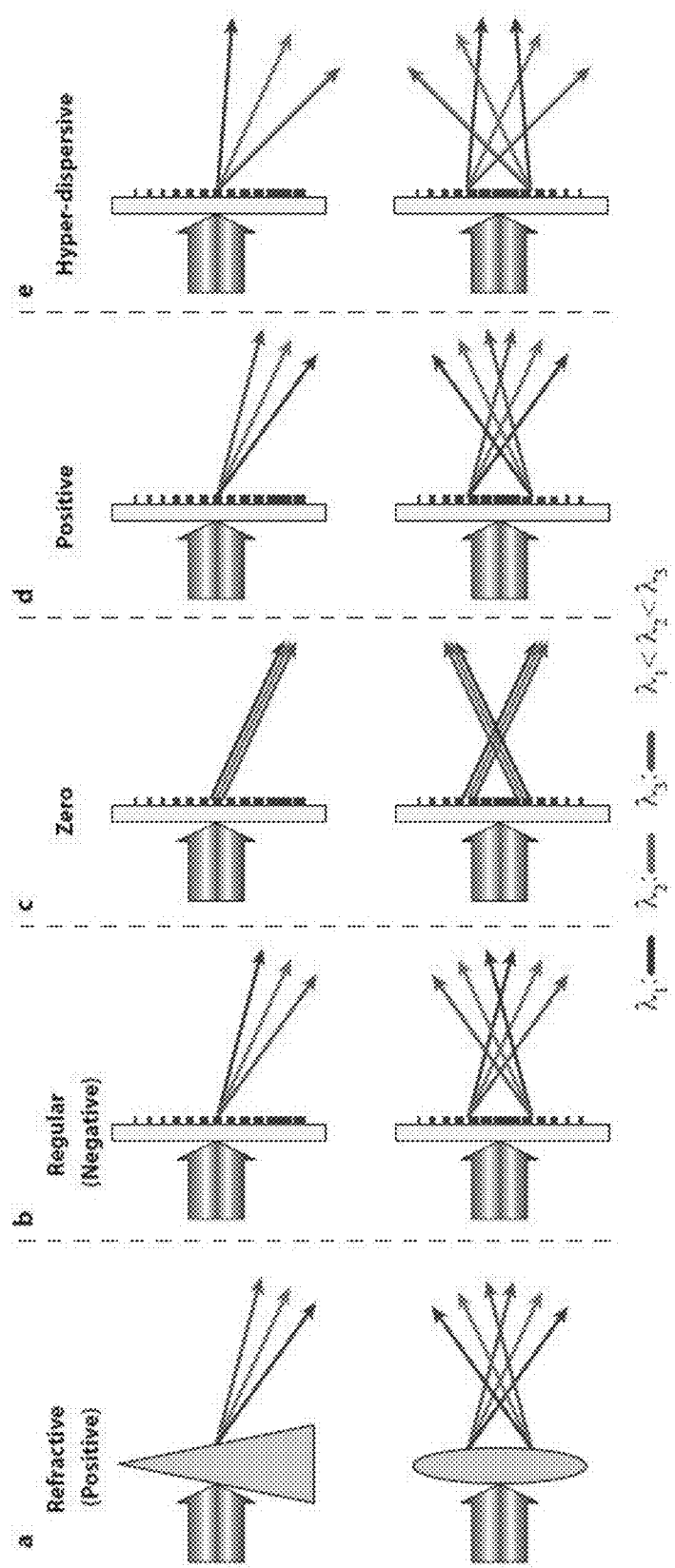
FIG. 8 illustrates schematic examples of different dispersion regimes.

Most optical materials have positive (normal) dispersion, which means that the refractive index decreases at longer wavelengths. As a consequence, blue light is deflected more than red light by dielectric prisms (FIG. 8, panel a). The reason why diffraction gratings are said to have negative dispersion is because they disperse light similar to hypothetical refractive prisms made of a material with negative (anomalous) dispersion (FIG. 8, panel b). For diffractive devices, dispersion is not related to material properties, and it refers to the derivative of a certain device parameter with respect to wavelength. For example, the angular dispersion of a grating that deflects normally incident light by a positive angle $\theta$ is given by $d\theta/d\lambda=\tan(\theta)/\lambda$ (see [6]). Similarly, the wavelength dependence of the focal length (f) of a diffractive lens is given by $df/d\lambda=-f/\lambda$ [6, 7]. The present disclosure refers to diffractive devices that follow these fundamental chromatic dispersion relations as "regular". Achieving new regimes of dispersion control in diffractive optics is important both at the fundamental level and for numerous practical applications. Several distinct regimes can be differentiated as follows. Diffractive devices are dispersionless when the derivative is zero (i.e. $d\theta/d\lambda=0$, $df/d\lambda=0$ shown schematically in FIG. 8, panel c), have positive dispersion when the derivative has opposite sign compared to a regular diffractive device of the same kind (i.e. $d\theta/d\lambda<0$, $df/d\lambda>0$) as shown in FIG. 8, panel d, and are hyper-dispersive when the derivative has a larger absolute value than a regular device (i.e. $|d\theta/d\lambda|>|\tan(\theta)/\lambda|$, $|df/d\lambda|>|-f/\lambda|$, FIG. 8, panel e). The present disclosure describes how these regimes can be achieved in diffractive devices based on optical metasurfaces. In the example of FIG. 8, the diffractive lenses operate in transmission mode; however, the metasurfaces of the present disclosure are generally described as operating in reflection mode. In different embodiments, similar concepts may be applied to lenses operating in transmission mode.

Metasurfaces have attracted great interest in recent years [8-17] because they enable precise control of optical wavefronts and are easy to fabricate with conventional microfabrication technology in a flat, thin, and light weight form factor. Various conventional devices such as gratings and lenses [12-14, 18-25] as well as novel devices [2, 26] have been demonstrated using metasurfaces. These optical elements are composed of large numbers of scatterers, or meta-atoms placed on a two-dimensional lattice to locally shape optical wavefronts. Similar to other diffractive devices, metasurfaces that locally change the propagation direction (e.g. lenses, beam deflectors, holograms) have negative chromatic dispersion [6, 7, 27, 28]. This is because most of these devices are divided in Fresnel zones whose boundaries are designed for a specific wavelength [28, 29]. This chromatic dispersion is an important limiting factor in many applications and its control is of great interest. Metasurfaces with zero and positive dispersion would be useful for making achromatic singlet and doublet lenses, and the larger-than-regular dispersion of hyper-dispersive metasurface gratings would enable high resolution spectrometers. The devices with zero chromatic dispersion discussed herein are fundamentally different from the multiwavelength metasurface gratings and lenses recently reported [28-30]. Multiwavelength devices have several diffraction orders, which result in lenses (gratings) with the same focal length (deflection angle) at a few discrete wavelengths. However, at each of these focal distances (deflection angles), the multi-wavelength lenses (gratings) exhibit the regular negative diffractive chromatic dispersion (see [28, 29]).

The present disclosure describes how simultaneously controlling the phase imparted by the meta-atoms composing the metasurface ($\phi$) and its derivative with respect to the frequency ($\phi'=\partial\phi/\partial\omega$ which can be referred to herein as chromatic phase dispersion or dispersion for brevity) makes it possible to dramatically alter the fundamental chromatic dispersion of diffractive components. This, in effect, is equivalent to simultaneously controlling the "effective refractive index" and "chromatic dispersion" of the meta-atoms. Using this concept, some experimental examples are described, such as metasurface gratings and focusing mirrors that have positive, zero, and hyper chromatic dispersions. The present disclosure also describes an achromatic focusing mirror with a highly diminished focal length chromatic dispersion, resulting in an almost three times increase in its operation bandwidth.

As discussed above, optical metasurfaces can suffer from high chromatic aberrations and dispersion because of their principle of operation, based on diffraction. For instance, a metasurface lens can focus optical waves with different wavelengths to different focal points, as can be seen in the example illustrated in FIG. 1, where a first metasurface lens focuses optical waves of different wavelengths at different locations (105) than a second metasurface which focuses waves of different wavelengths at a same location (110). In fact, a typical metasurface lens (105) focuses lights of different wavelengths to different focal points. Such typical metasurface lens (105), designed with a wrapped phase similar to a Fresnel lens, shows a dispersion very similar to that of a lens with a constant phase for different wavelengths, as illustrated for example in the graph (115) of FIG. 1. FIG. 1 illustrates simulation results (115) showing the change of focal distance as a function of wavelength in a typical metasurface lens. The focus of a typical metasurface lens changes because the Fresnel zone boundaries in the metasurface are constant and do not change with the wavelength. For example, as visible in FIG. 1 (115), the focus for $0.95\lambda_0$ (120) is shifted relative to that of $\lambda_0$ (125).

Figure 2:
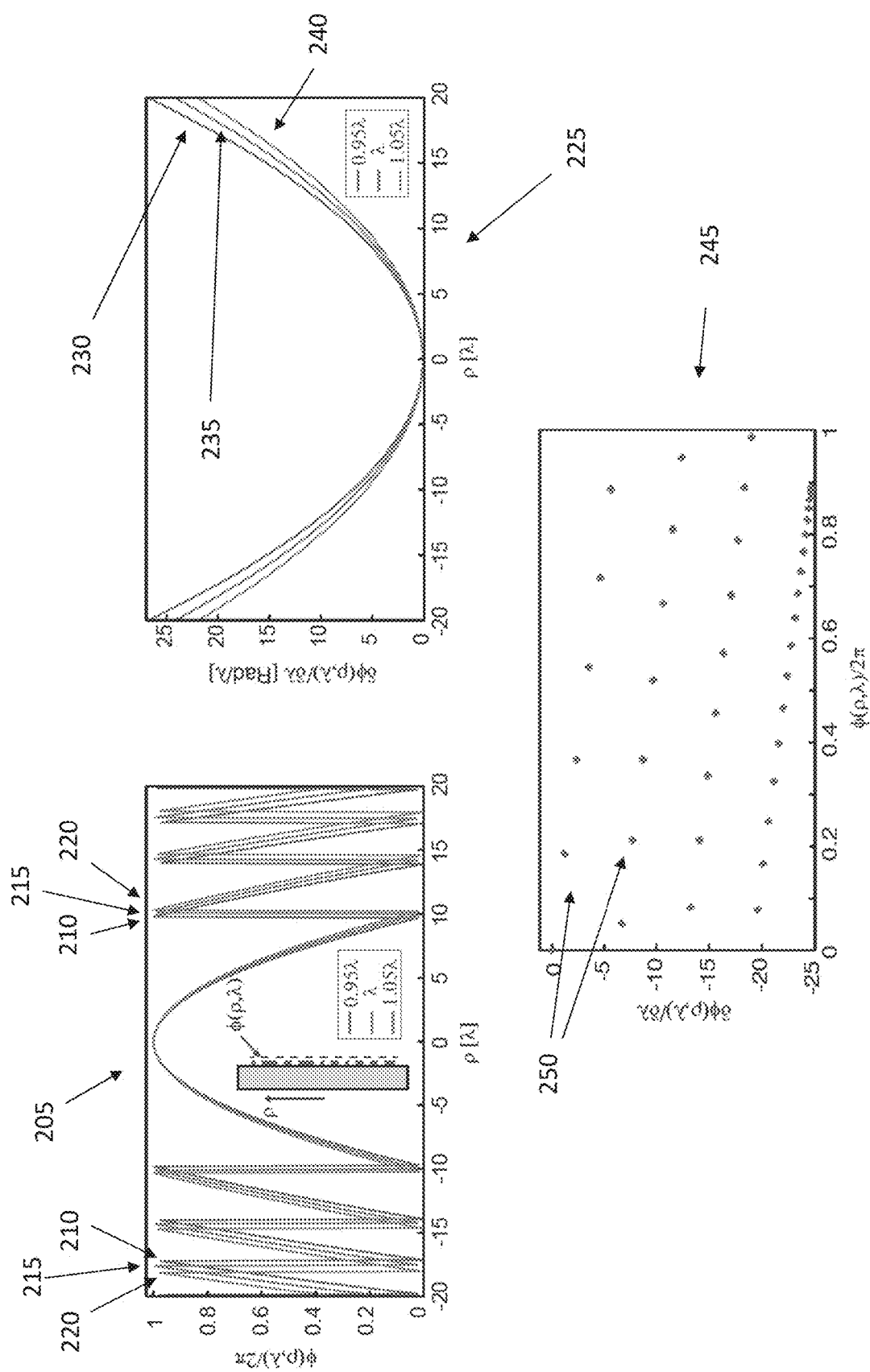
FIG. 2 illustrates exemplary design parameters to control dispersion.

The phase profiles required to keep the focal distance of a metasurface lens constant, for the range of wavelengths from $0.95\lambda$, to $1.05\lambda$ ($\lambda$ being the center wavelength), are shown in FIG. 2, (205), as a function of distance to the center of the lens. In FIG. 2, the phase profile for $0.95\lambda$ is shown (210). The phase profile for $\lambda$ (215) has a similar profile to that for $0.95\lambda$, with peaks shifted to slightly greater wavelengths to the right of the zero of the graph. For positive $\rho$ values, the peaks are progressively shifted to the right, while for negative $\rho$ values, the peaks are progressively shifted to the left. A similar pattern can be seen for $1.05\lambda$ (220).

It can be seen from the graph (205) that to achieve a constant focal distance, a change in the phase profile of the lens is needed, including a change in the Fresnel zone boundaries. FIG. 2 also illustrates the "dispersion", i.e. $\delta\varphi/\delta\lambda$, needed to achieve this small phase change (225). The dispersion is almost constant for different wavelengths, and only varies with $\rho$, the axial distance to the center of the lens. The dependence on $\rho$ can be seen, for example, in the curves for $0.95\lambda$, (230), $\lambda$ (235) and $1.05\lambda$ (240). The values $0.95\lambda$, $\lambda$ and $1.05\lambda$ are considered in this example, however different values for multiples of $\lambda$ may be chosen to design the metasurface with a desired phase profile, as understood by the person of ordinary skill in the art.

In some embodiments, the dispersion of meta-atoms in a narrow bandwidth can be modeled using a linear dispersion approximation such as a linear Taylor expansion:

$$\phi(\lambda, r) \approx \phi(\lambda_0, r) + \frac{\partial\phi(\lambda, r)}{\partial\lambda}\bigg|_{\lambda=\lambda_0}(\lambda - \lambda_0)$$

where r is a geometric parameter, or a material parameter (or, alternatively, a set of parameters) that identifies the meta-atom. The two observations gathered from the graphs (205) and (225) show that a suitable parameter domain for the design of dispersionless metasurfaces is the $$\left(\phi; \frac{\partial\phi}{\partial\lambda}\right)$$

plane (i.e. the phase-dispersion plane). For instance, the meta-atoms covering the part of the phase-dispersion plane shown in FIG. 2 (245) can be used to design a dispersionless metasurface lens with the phase profiles drawn in (205). The dots (250) can be obtained by sampling the dispersion vs phase graph at points half a wavelength apart. With larger areas covered in the phase-dispersion plane, larger and higher numerical aperture dispersionless lenses become possible. FIG. 2 illustrates some examples of some embodiments of the methods and structures of the present disclosure. However, other embodiments may be realized as described in the present disclosure. The graph (245) illustrates the dispersion versus phase graph sampled at points distanced $\lambda/2$. It can be seen that multiple full $2\pi$ phase coverages with different dispersions can be needed for a metasurface lens.

Figure 3:
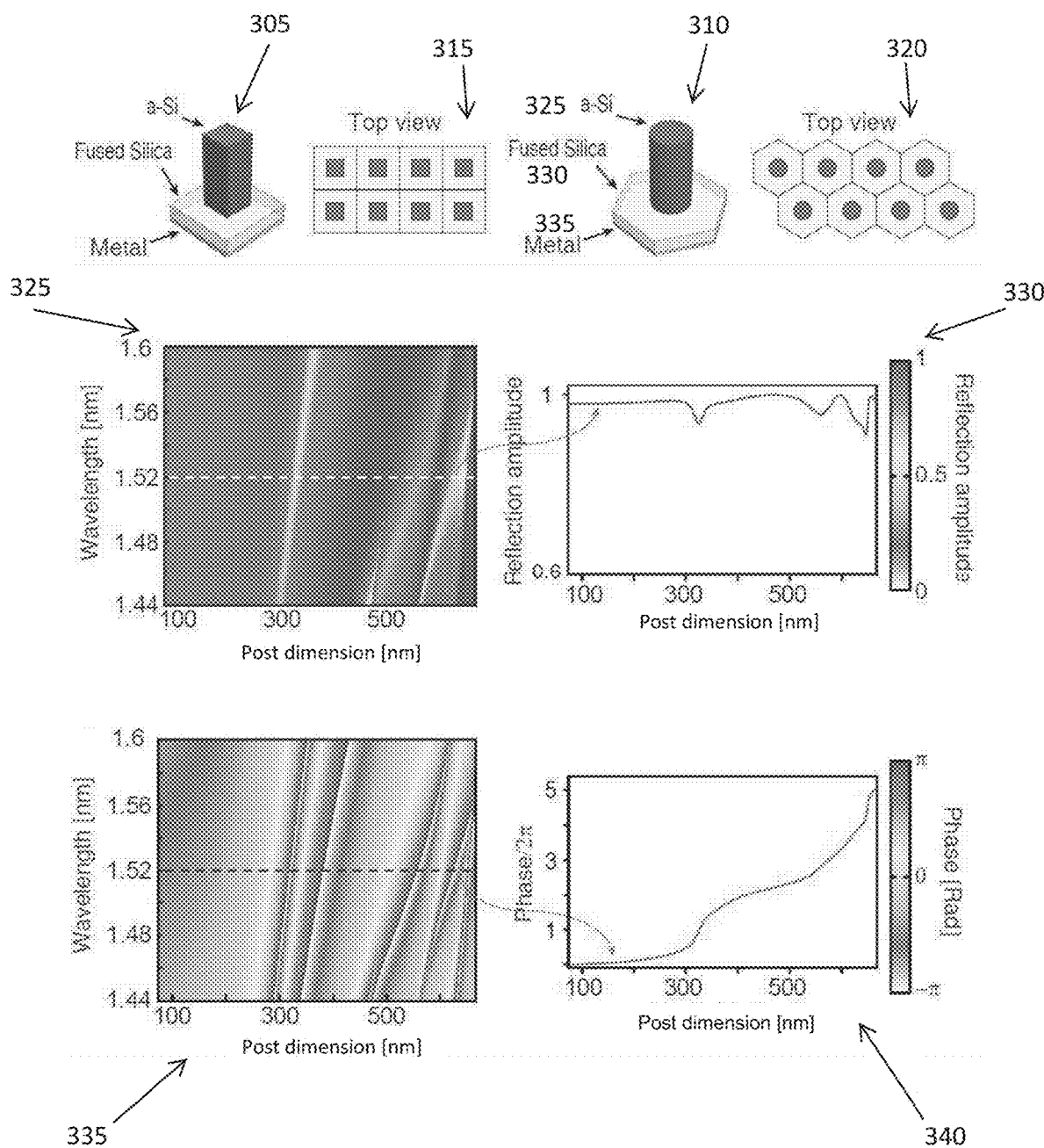
FIG. 3 illustrates exemplary metasurface posts.

In one embodiment, a type of metasurface that has the capability of achieving multiple full phase coverages with different dispersions (hence covering a large area in the phase-dispersion plane) comprises reflective high contrast dielectric metasurfaces. Two exemplary geometries of such metasurfaces are shown in FIG. 3. In one embodiment, the metasurfaces comprise an array of parallelepipeds, for example pillars having a square cross-section (305). For example, the square pillars (305) may be arranged in rectangular or square arrays (315). In other embodiments, the pillars may have a circular or elliptical cross-section (310). The pillars (310) may be arranged in hexagonal arrays (320). In other embodiments, different cross-section pillars may be used with different types of arrays. In some embodiments, the pillars are fabricated on substrates, forming the scattering elements or meta-atoms.

In some embodiments, the meta-atoms comprise a high index dielectric resonator, for example made of amorphous silicon (a-Si). The resonator may, for instance, have a cubic or cylindrical shape, or be a pillar with a square or circular cross-section. The resonator may be placed on a low index dielectric spacer, such as $SiO_2$ or fused silica. The spacer may be placed on a metallic reflector. For example, FIG. 3 illustrates a pillar made of a-Si (325) with a fused silica spacer (330) on a metallic layer (335).

The meta-atoms can be placed in a periodic 2D lattice (rectangular, triangular, hexagonal, etc.) to form the metasurface or array of scattering elements. FIG. 3 illustrates two possible types of meta-atoms and periodic lattices capable of supporting multiple $2\pi$ phase shifts with different values of dispersion. The meta-atoms examples in FIG. 3 consist of cubic (305) or cylindrical (310) a-Si nano-posts placed on a periodic lattice on a metallic reflector. A low refractive index dielectric spacer can be placed between the metal and the nano-posts.

Typical reflection amplitude and phase graphs for the cubic meta-atoms versus the post lateral dimension and wavelength are shown in FIG. 3. For example, the lateral dimension of a pillar having a circular cross-section is the diameter of the circle. In particular, the reflection amplitude as a function of the wavelength and the post dimension is illustrated (325). An exemplary cross section of the reflection amplitude graph (325) is illustrated in (330). In the example of graph (325), the nano-posts are 725 nm tall, the rectangular lattice constant is 740 nm, and the spacer layer is 325 nm thick.

FIG. 3 also illustrates an exemplary reflection phase of a periodic array of square cross section meta-atoms as a function of meta-atom lateral dimension and wavelength (335). An exemplary cross section of the unwrapped reflection phase graphs (335) is also illustrated (340), showing about five full a phase coverages with different dispersions.

It can be seen from (325) and (335) that, while the reflection amplitude remains high for all wavelengths and post lateral dimensions, the reflection phase covers almost five full $2\pi$ shifts with different high and low values for the dispersion. For example, for a lateral dimension close to 100 nm, the phase is close to zero, while the reflection amplitude is almost 1. For a lateral dimension above 600 nm, the phase approaches $10\pi$, and the reflection remains high, close to a value of 1.

To design a dispersionless metasurface with a specific functionality (or a metasurface with a certain desired dispersion), the desired complex transfer function can be calculated at several wavelengths, in the operating range of the device. The meta-atom for each lattice site can then be chosen to minimize the total error of the metasurface. For example, the total error can be calculated as a weighted function of complex amplitude differences between the desired transfer functions and the meta-atom reflections.

Figure 4:
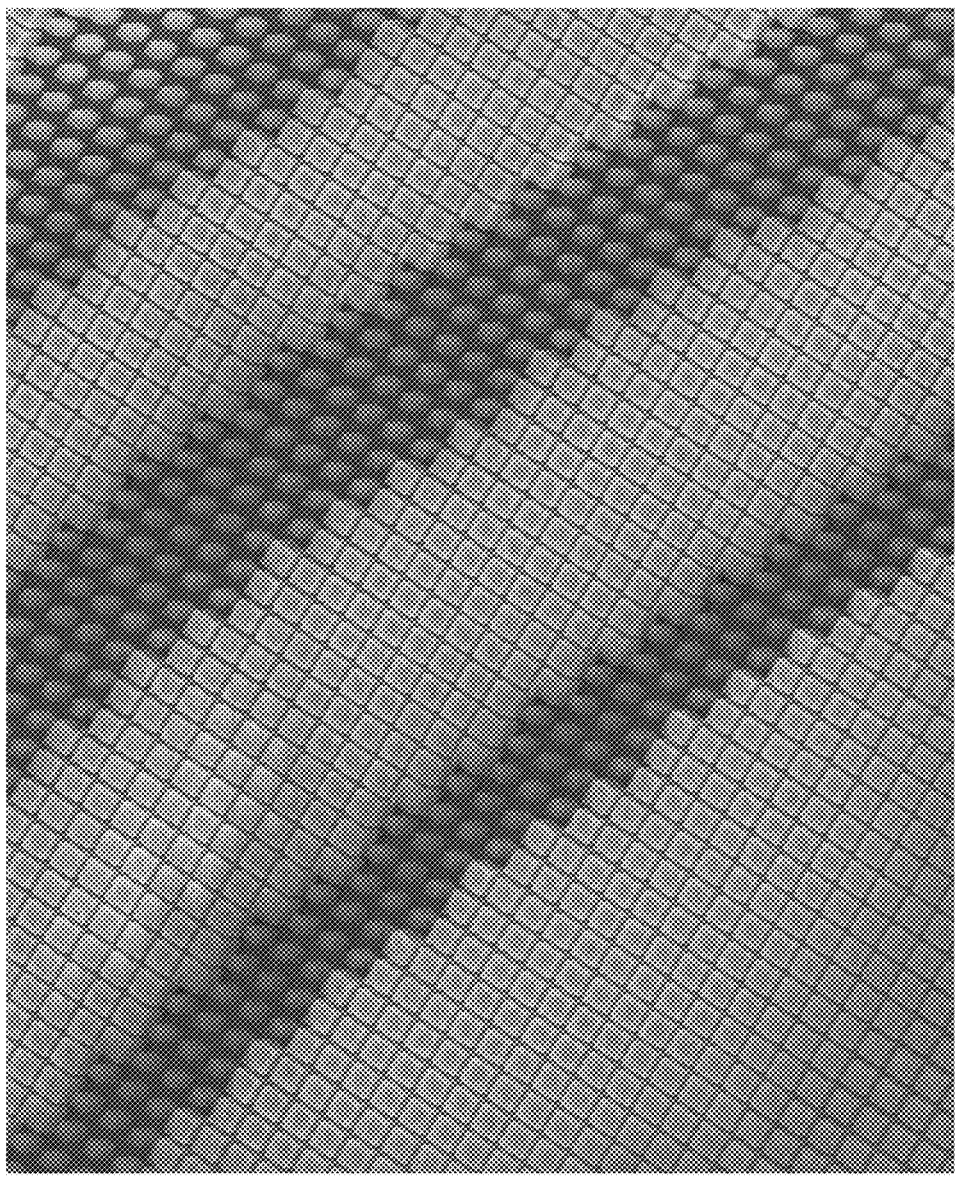
FIGS. 4-5 illustrate exemplary metasurfaces.
Figure 5:
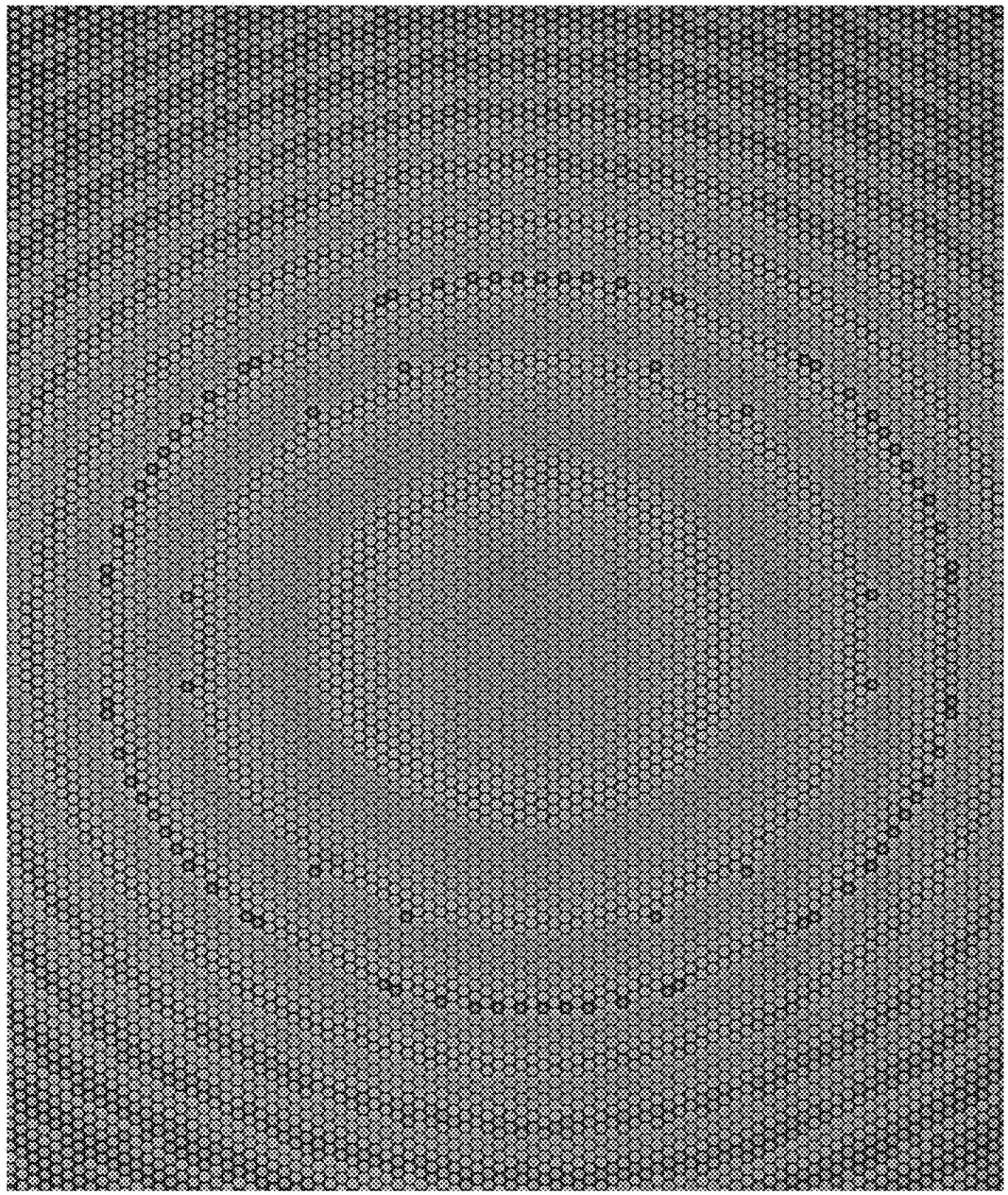

Scanning electron micrographs of two aspherical focusing mirrors designed with the method described above and based on the meta-atoms discussed with reference to FIG. 3 are illustrated in FIGS. 4 and 5. The examples of dispersionless metasurface focusing mirrors illustrated in FIGS. 4 and 5 are based on cubic (FIG. 4) and cylindrical (FIG. 5) nano-posts.

Figure 6:
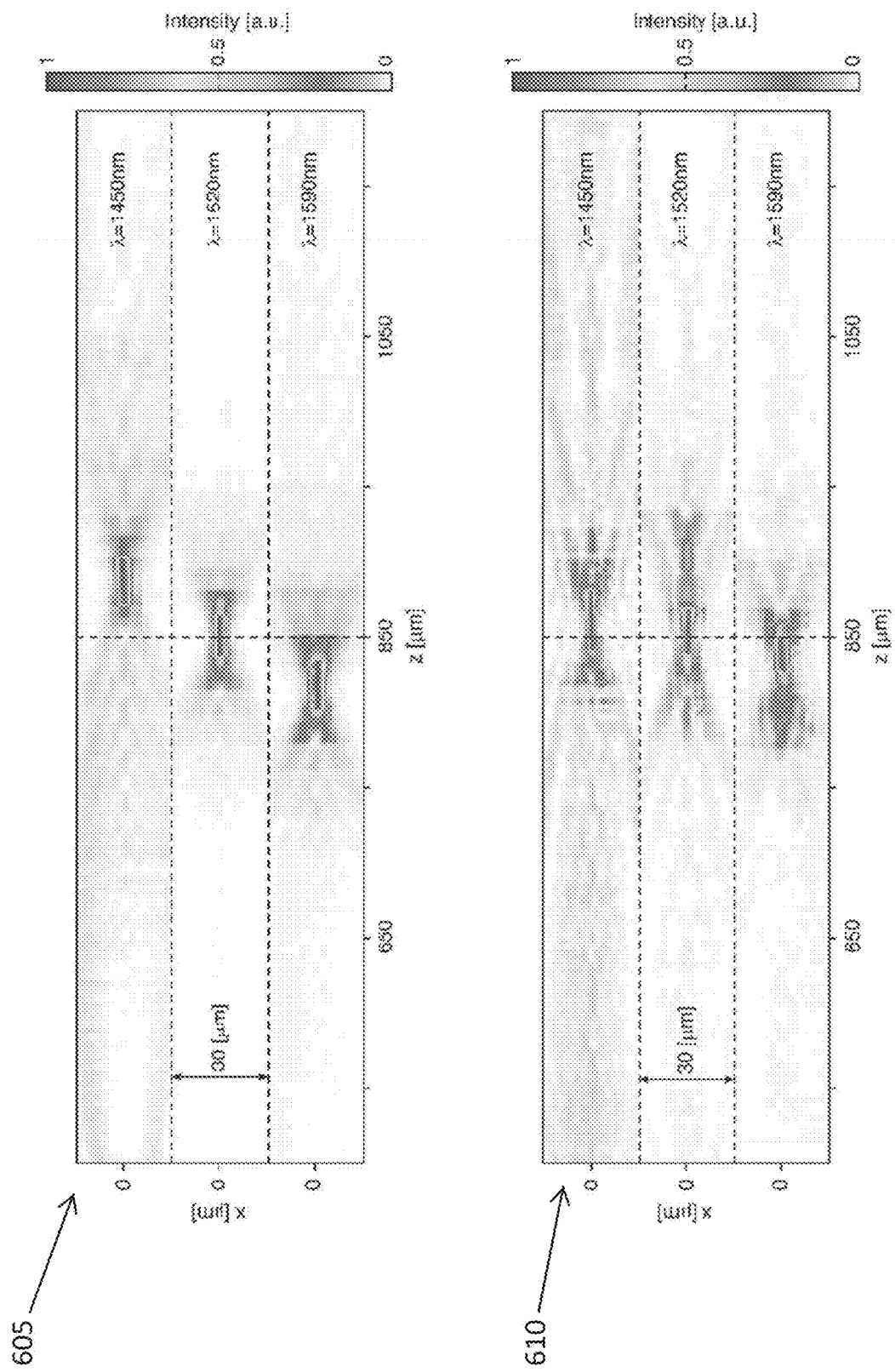
FIG. 6 illustrates focus distance control with a metasurface.
Figure 7:
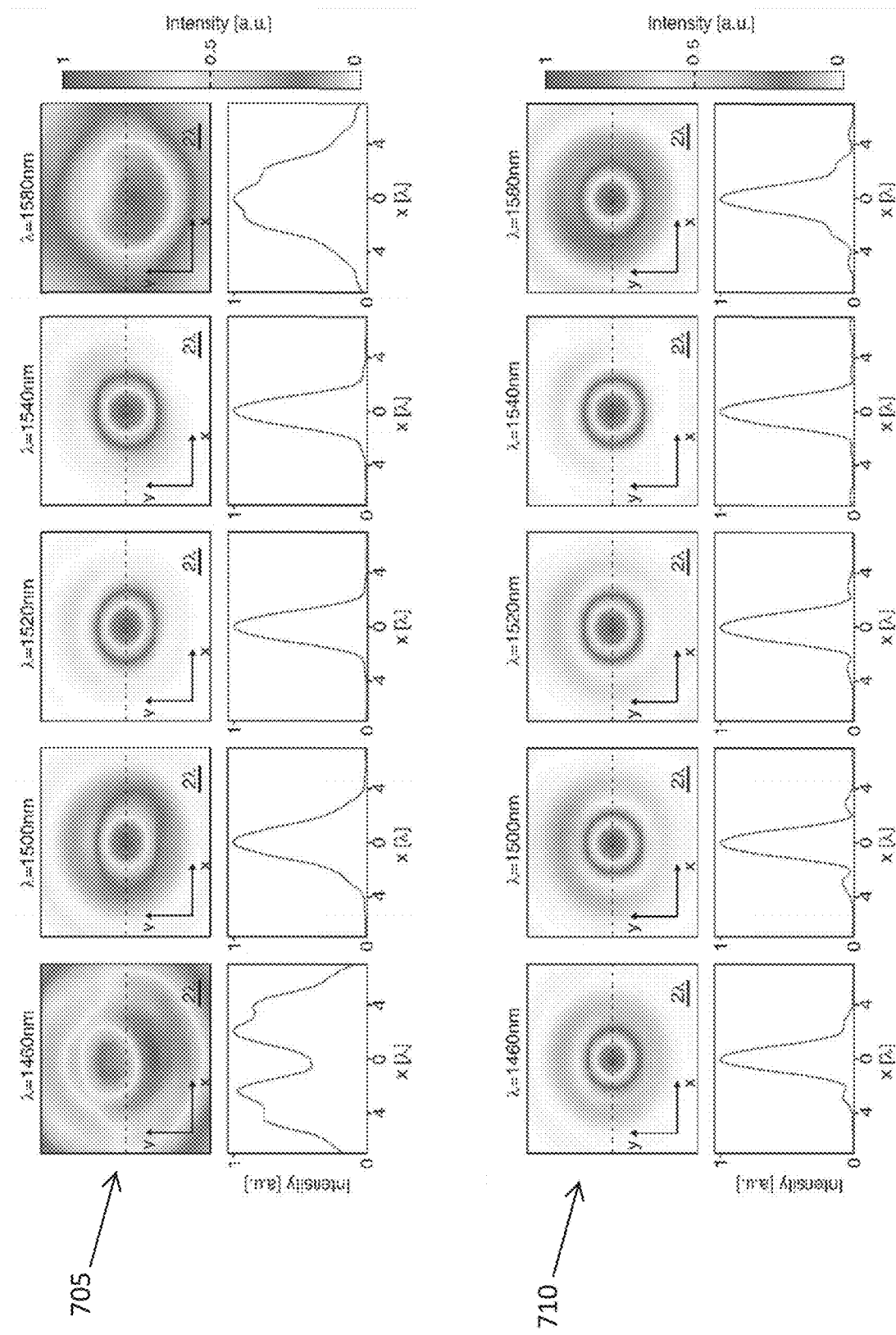
FIG. 7 illustrates focusing quality with a metasurface.

Measurement results for a dispersionless focusing mirror and those of a normal focusing mirror with the same size and focal distance are shown in FIGS. 6 and 7. FIG. 6 illustrates the optical light intensity measured in the axial plane of a normal focusing metasurface mirror designed to focus light at 1520 nm to a distance of 850 µm from the surface (605). FIG. 6 also illustrates the normal chromatic diffractive dispersion of such a metasurface (605). It can be seen that the focus location shifts at different wavelengths.

FIG. 6 (610) illustrates the optical intensity measured in the axial plane of a dispersionless focusing metasurface mirror designed to maintain a nearly diffraction-limited focus at a distance of 850 µm for the wavelengths in the range of 1450 nm to 1590 nm. The results show a significant reduction in the metasurface dispersion. The focal distance movement in this case is significantly lower, and it is seen that the 850 µm plane (i.e. the design focal distance) remains within a half focal depth of the actual focal distance at all wavelengths. In this example, the light remains in focus over the wavelength range.

FIG. 7 illustrates the intensity distribution of light in the 850 µm plane for the two devices of FIG. 6. Specifically, for a normal metasurface the intensity distribution measured in the plane 850 µm away from the metasurface is illustrated (705). It can be noted that, while the light at 1520 nm is focused to a nearly diffraction-limited spot, the light quickly goes out of focus as the wavelength is varied. By contrast, the same measurements as in (705) are illustrated in (710) for the dispersionless metasurface mirror. A nearly diffraction-limited focus is observed over the whole wavelength range for the dispersionless metasurface (710).

In fact, from FIGS. 6 and 7 it can be seen that, while the normal focusing mirror is completely out of focus in the plane at 1460 nm and 1580 nm, the dispersionless mirror remains in nearly diffraction-limited focus over the same wavelength range. Thus, FIGS. 6 and 7 illustrate exemplary results for metasurfaces fabricated as described in the present disclosure.

In addition to designing dispersionless metasurfaces, the methods described herein can be applied to designing metasurfaces with specific, given dispersions. For instance, a lens (or focusing mirror) with a chromatic dispersion dissimilar to normal metasurface lenses could be designed. In other embodiments, a grating with reduced or increased dispersion can also be designed and fabricated.

It can be understood, from the present disclosure, that the array of nanopillars or other types of scattering elements can comprise different profiles or patterns, i.e. regions with different nanopillars arranged in different configurations, as exemplified in FIGS. 4 and 5. For example, in FIG. 4 pillars with different lateral dimensions are illustrated. The specific arrangement of the pillars can be determine according to the desired dispersion profile of the metasurface lens. Therefore, in some embodiments the present disclosure describes how to fabricate a metasurface lens with a desired dispersion profile. The amplitude and phase of electromagnetic waves can be calculated as a function of wavelength and scattering element dimensions. The pattern of the scattering elements can be determined according to the calculated amplitude and phase that result in the desired dispersion profile.

In the following, the present disclosure will describe an expanded analysis of the metasurfaces, introducing additional concepts compared to those described above.

In the following, the case of devices with zero chromatic dispersion will be considered. For frequency independent operation, a device should impart a constant delay for different frequencies, similar to a refractive device made of a non-dispersive material [6]. Therefore, the phase profile will be proportional to the frequency:

$$\phi(x,y;\omega)=\omega T(x,y), \quad (1)$$

where $\omega=2\pi c/\lambda$ is the angular frequency ($\lambda$: wavelength, c: speed of light) and T (x,y) determines the function of the device (for instance $T(x,y)=-x \sin \theta_0/c$ for a grating that deflects light by angle $\theta_0$; $T(x,y)=-\sqrt{x^2+y^2+f^2}/c$ for a spherical-aberration-free lens with a focal distance f). Since the phase profile is a linear function of $\omega$, it can be realized using a metasurface composed of meta-atoms that control the phase $\phi(x,y; \omega_0)=T(x,y)\omega_0$ and its dispersion $\phi'=\partial\phi(x,y;\omega)/\partial\omega=T(x,y)$. The bandwidth of dispersionless operation corresponds to the frequency interval over which the phase locally imposed by the meta-atoms is linear with frequency $\omega$. For gratings or lenses, a large device size results in a large $|T(x,y)|$, which means that the meta-atoms should impart a large phase dispersion. Since the phase values at the center wavelength $\lambda_0=2\pi c/\omega_0$ can be wrapped into the 0 to $2\pi$ interval, the meta-atoms only need to cover a rectangular region in the phase-dispersion plane bounded by $\phi=0$ and $2\pi$ lines, and $\phi'=0$ and $\phi'_{max}$ lines, where $\phi'_{max}$ is the maximum required dispersion which is related to the device size. The required phase-dispersion coverage means that, to implement devices with various phase profiles, for each specific value of the phase, various meta-atoms are needed to provide that specific phase, but with different dispersion values.

To realize metasurface devices with non-zero dispersion of a certain parameter $\xi(\omega)$, phase profiles of the following form can be used:

$$\phi(x,y;\omega)=\omega T(x,y,\xi(\omega)) \quad (2)$$

For instance, the parameter $\xi(\omega)$ can be the deflection angle of a diffraction grating $\theta(\omega)$ or the focal length of a diffractive lens $f(\omega)$. As shown in a following section of the present disclosure, to independently control the parameter $\xi(\omega)$ and its chromatic dispersion $\partial\xi/\partial\omega$ at $\omega=\omega_0$, the phase dispersion and the phase at this frequency can be controlled. The required dispersion for a certain parameter value $\xi_0=\xi(\omega_0)$, and a certain dispersion $\partial\xi/\partial\omega|_{\omega=\omega_0}$ can be given by:

$$\left.\frac{\partial\phi(x,y;\omega)}{\partial\omega}\right|_{\omega=\omega_0} = T(x,y,\xi_0) + \partial\xi/\partial\omega\bigg|_{\omega=\omega_0} \omega_0 \left.\frac{\partial T(x,y,\xi)}{\partial\xi}\right|_{\xi=\xi_0}. \quad (3)$$

This dispersion relation is valid over a bandwidth where a linear approximation of $\xi(\omega)$ is valid. In other embodiments, higher than linear Taylor expansions may be used instead.

Assuming hypothetical meta-atoms that provide independent control of phase and dispersion up to a dispersion of −150 Rad/µm (to adhere to the commonly used convention, the dispersion is reported here in terms of wavelength) at the center wavelength of 1520 nm, it is possible to design and simulate, for example, four gratings with different chromatic dispersions, as described in a following section of the present disclosure. The simulated deflection angles as functions of wavelength are plotted in FIG. 9, panel a. All gratings in this example are 150 µm wide, and have a deflection angle of 10 degrees at their center wavelength of 1520 nm. The positive dispersion grating exhibits a dispersion equal in absolute value to the negative dispersion of a regular grating with the same deflection angle, but with an opposite sign. The hyper-dispersive design is three times more dispersive than the regular grating, and the dispersionless beam deflector shows almost no change in its deflection angle. Besides gratings, is is also possible to design focusing mirrors exhibiting regular, zero, positive, and hyper dispersions. The focusing mirrors, in some embodiments, have a diameter of 500 µm and a focal distance of 850 µm at 1520 nm. Hypothetical meta-atoms with a maximum dispersion of −200 Rad/µm are required to implement these focusing mirror designs. The simulated focal distances of the four designs are plotted in FIG. 9, panel b. The axial plane intensity distributions at three wavelengths are plotted in FIG. 9, panels c to f.

Figure 10:
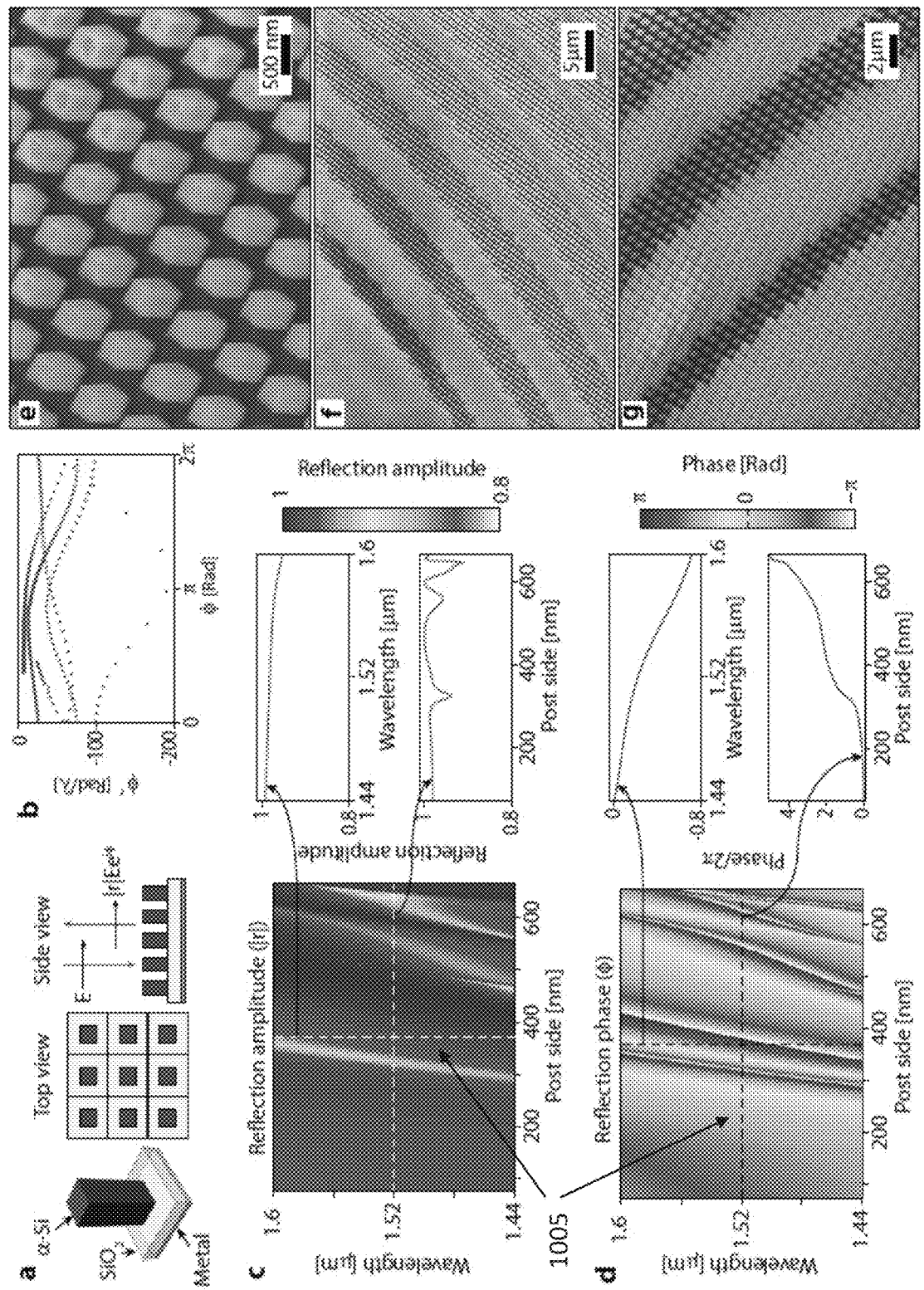
FIG. 10 illustrates exemplary high dispersion silicon meta-atoms.

An example of meta-atoms capable of providing 0 to $2\pi$ phase coverage and different dispersions is shown in FIG. 10, panel a. The meta-atoms, in this embodiment, are composed of a square cross-section amorphous silicon ($\alpha$-Si) nano-post on a low refractive index silicon dioxide ($SiO_2$) spacer layer on an aluminum reflector. They are located on a periodic square lattice (FIG. 10, panel a). The simulated dispersion versus phase plot for the meta-atoms at the wavelength of $\lambda_0=1520$ nm is depicted in FIG. 10, panel b, and shows a partial coverage up to the dispersion value of ∼−100 Rad/µm (the meta-atoms in this example are 725 nm tall, the $SiO_2$ layer is 325 nm thick, the lattice constant is 740 nm, and the nano-post side length is varied from 74 to 666 nm at 1.5 nm steps). Simulated reflection amplitude and phase for the periodic lattice are plotted in FIG. 10, panels c and d, respectively. The reflection amplitude over the bandwidth of interest is close to 1 for all nano-post side lengths. The operation of the nano-post meta-atoms can be intuitively understood as truncated multi-mode waveguides with many resonances in the bandwidth of interest [26, 31]. By going through the nano-post twice, light can obtain larger phase shifts compared to the transmissive operation mode of the metasurface (i.e. without the metallic reflector). The metallic reflector keeps the reflection amplitude high for all sizes, which makes the use of high quality factor resonances possible. High quality factor resonances are necessary for achieving large dispersion values, because, as shown in a following section of the present disclosure, the dispersion is given by $\phi' \approx -Q/\lambda_0$, where Q is the quality factor of the resonance. In an alternative view, resonances with large quality factors correspond to large group delays in the meta-atoms. For example, in the special case of a lens with zero dispersion, light passing through the middle of the lens can experience a delay with respect to light passing close to the lens circumference, so the meta-atoms in the middle can compensate for this delay. Therefore, the largest achievable meta-atom quality factors can limit the device size.

Using the dispersion-phase parameters provided by this exemplary metasurface, it is possible to design four exemplary gratings operating in various dispersion regimes. The gratings are ∼90 µm wide and have a 10-degree deflection angle at 1520 nm. They are designed to operate in the 1450 to 1590 nm wavelength range, and have regular negative, zero, positive, and hyper (three-times-larger negative) dispersion. Since the phase of the meta-atoms does not follow a linear frequency dependence over this wavelength interval (FIG. 10, panel d), it is possible to calculate the desired phase profile of the devices at 8 wavelengths in the range (1450 to 1590 nm at 20 nm steps), and form an 8×1 complex reflection coefficient vector at each point on the metasurface. Applying the data of FIG. 10, panels c and d, a similar complex reflection coefficient vector can be calculated for each meta-atom. Subsequently, at each lattice site of the metasurface, it is possible to place a meta-atom whose reflection vector has the shortest weighted Euclidean distance to the desired reflection vector at that site. The weights allow for emphasizing different parts of the operation bandwidth, and can be chosen based on the optical spectrum of interest or other considerations. In some embodiments, an inverted Gaussian weight ($\exp((\lambda-\lambda_0)^2/2\sigma^2)$, $\sigma=300$ nm) can be used, which values wavelengths farther away from the center wavelength of $\lambda_0=1520$ nm. The designed devices can be fabricated using standard semiconductor fabrication techniques as described in the following. FIG. 10, panels e to g show scanning electron micrographs of exemplary nano-posts, and some exemplary devices fabricated using the reflective meta-atoms.

Figure 11:
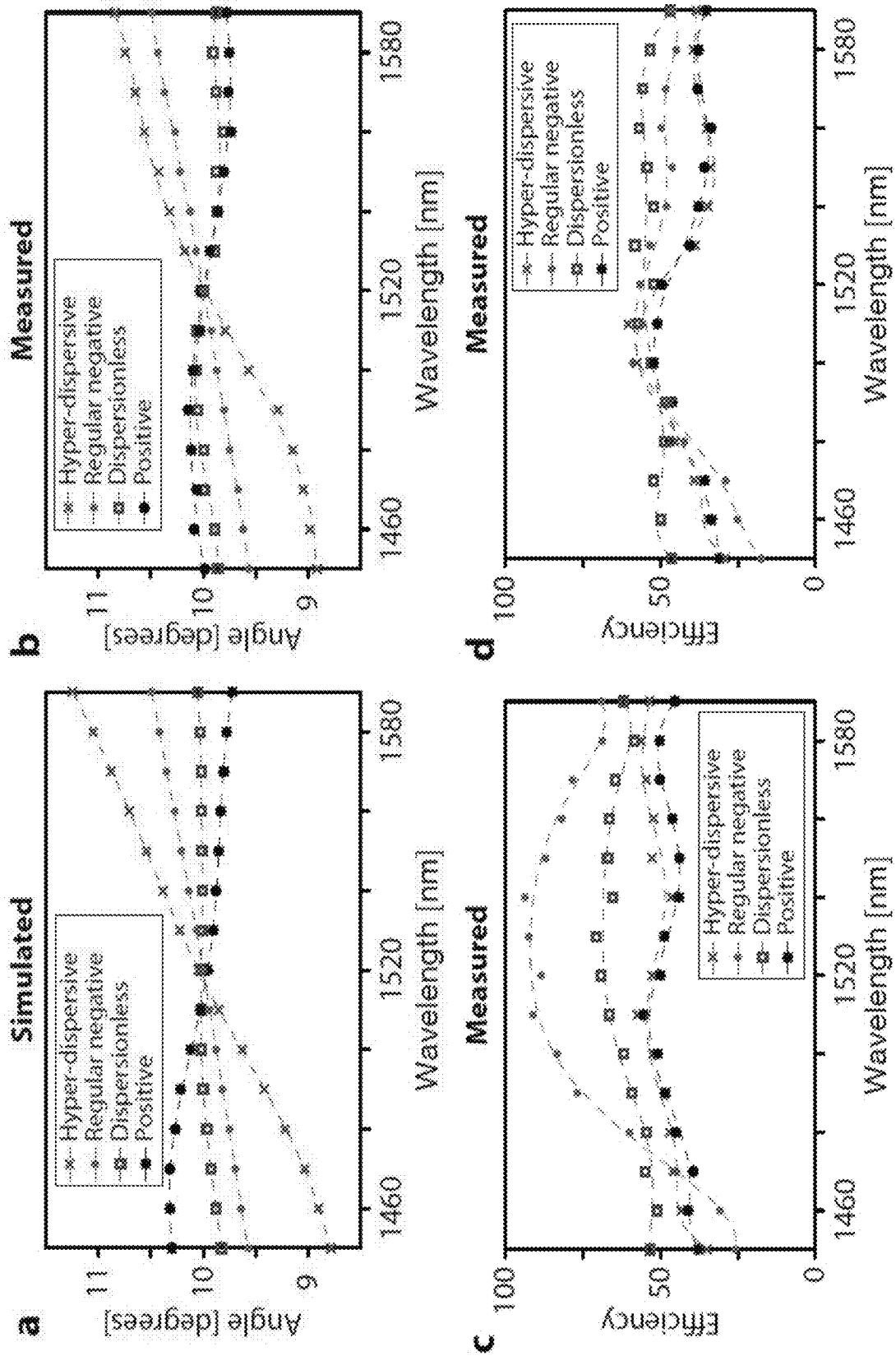
FIGS. 11-12 illustrate simulation and measurement results of gratings in different dispersion regimes.
Figure 12:
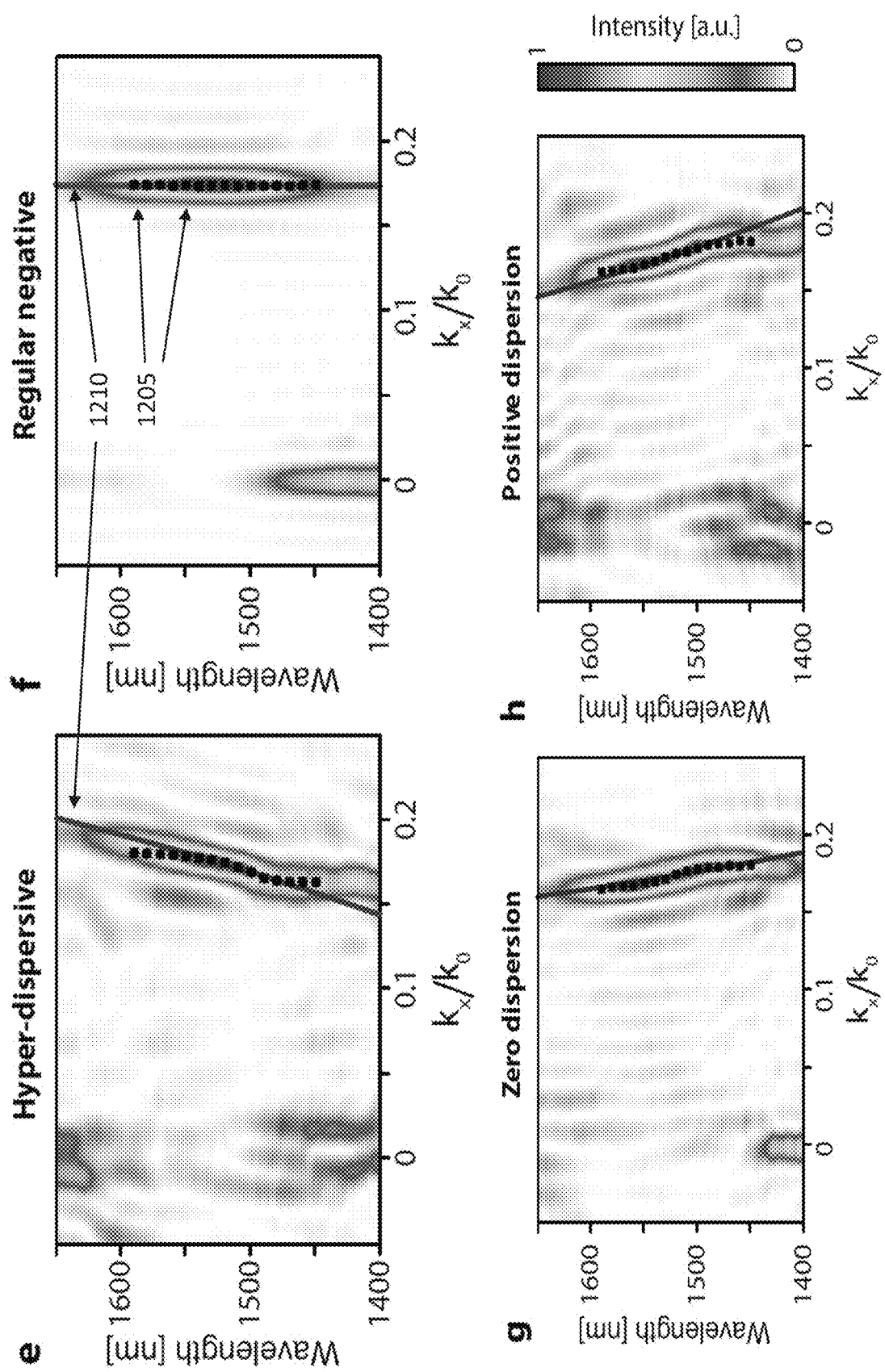

FIG. 11, panels a and b show the simulated and measured deflection angles for gratings, respectively. The measured values are calculated by finding the center of mass of the deflected beam 3 mm away from the grating surface. The zero dispersion grating shows an apochromatic behavior resulting in a reduced dispersion, the positive grating shows positive dispersion in the ∼1490-1550 nm bandwidth, and the hyper-dispersive grating shows an enhanced dispersion in the measurement bandwidth. This can also be viewed from the grating momentum point of view: a regular grating has a constant momentum set by its period, resulting in a constant transverse wave-vector. By contrast, the momentum of the hyper-dispersive grating increases with wavelength, while that of the zero and positive gratings decreases with wavelength. This means that the effective period of the non-regular gratings changes with wavelength, resulting in the desired chromatic dispersion. FIG. 12, panels e to h show good agreement between simulated intensities of these gratings versus wavelength and transverse wave-vector and the measured beam deflection illustrated as dots, e.g. (1205). The plotted line (1210) is the theoretical expectation of the maximum intensity trajectory. Measured deflection efficiencies of the gratings, defined as the power deflected by the gratings to the desired order, divided by the power reflected from a plain aluminum reflector are plotted in FIG. 11, panels c and d for TE and TM illuminations, respectively. A similar difference in the efficiency of the gratings for TE and TM illuminations has also been observed in Refs. [1, 26].

Figure 13:
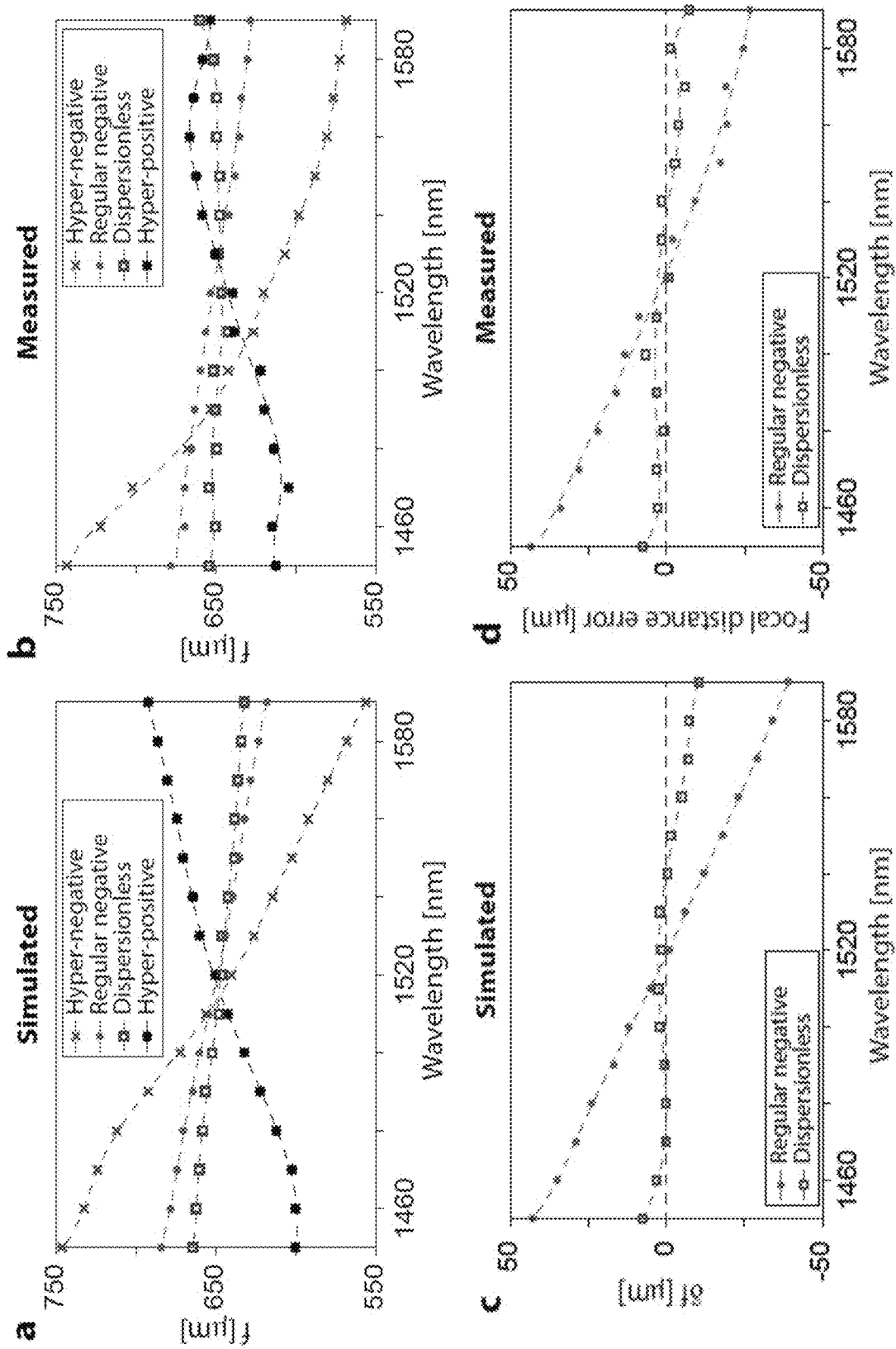
FIGS. 13-16 illustrate simulation and measurement results for mirrors with different dispersion regimes.

As another example of diffractive devices with controlled chromatic dispersion, four spherical-aberration-free focusing mirrors with different chromatic dispersions were designed, fabricated and measured using the same reflective dielectric meta-atoms. The mirrors, in these embodiments, are 240 µm in diameter and are designed to have a focal distance of 650 µm at 1520 nm. In FIG. 13, panels a and b show simulated and measured focal distances for the four focusing mirrors. The positive dispersion mirror, in this example, is designed with dispersion twice as large as a regular mirror with the same focal distance, and the hyper-dispersive mirror has a negative dispersion three and a half times larger than a regular one. The zero dispersion mirror shows a significantly reduced dispersion, while the hyper-dispersive one shows a highly enhanced dispersion. The positive mirror shows the expected dispersion in the ∼1470 to 1560 nm range.

As an application of diffractive devices with dispersion control, it is possible to fabricate a spherical-aberration-free focusing mirror with increased operation bandwidth. For brevity, this device is referred to as a dispersionless mirror. Since the absolute focal distance change is proportional to the focal distance itself, a relatively long focal distance is helpful for unambiguously observing the change in the device dispersion. Also, a higher NA value can be preferred because it results in a shorter depth of focus, thus making the measurements easier. Having these considerations in mind, a diameter of 500 µm and a focal distance of 850 µm (NA≈0.28) were chosen for the exemplary mirror, requiring a maximum dispersion of $\phi'_{max} \approx -98$ Rad/µm which is achievable with the proposed reflective meta-atoms. Two exemplary dispersionless mirrors were designed with two σ values of 300 and 50 nm. For comparison, a regular metasurface mirror was designed, for operation at $\lambda_0 = 1520$ nm and with the same diameter and focal distance as the dispersionless mirrors. The simulated focal distance deviations (from the designed 850 µm) for the regular and dispersionless (σ=300 nm) mirrors are plotted in FIG. 13 panel c, showing a considerable reduction in chromatic dispersion for the dispersionless mirror.

Figure 14:
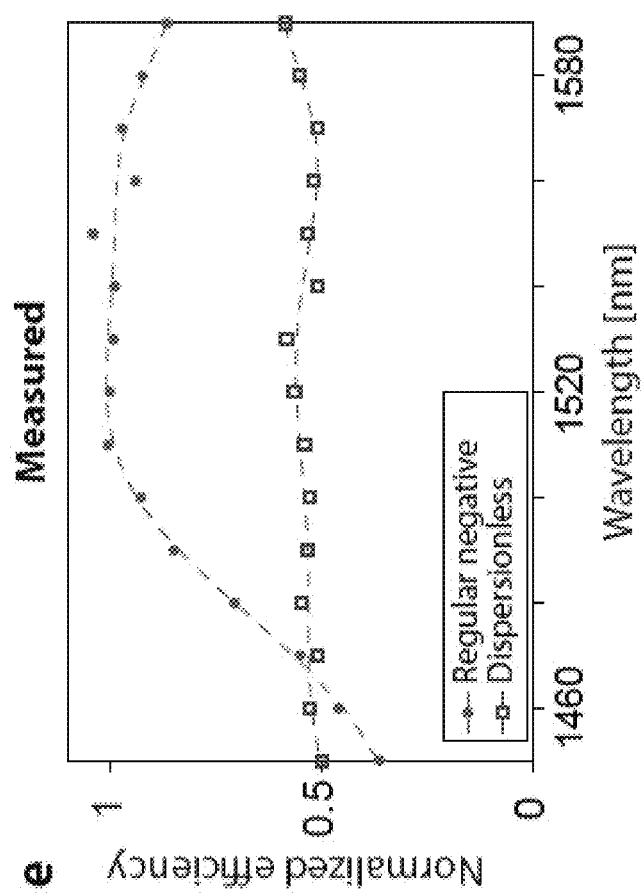
Figure 15:
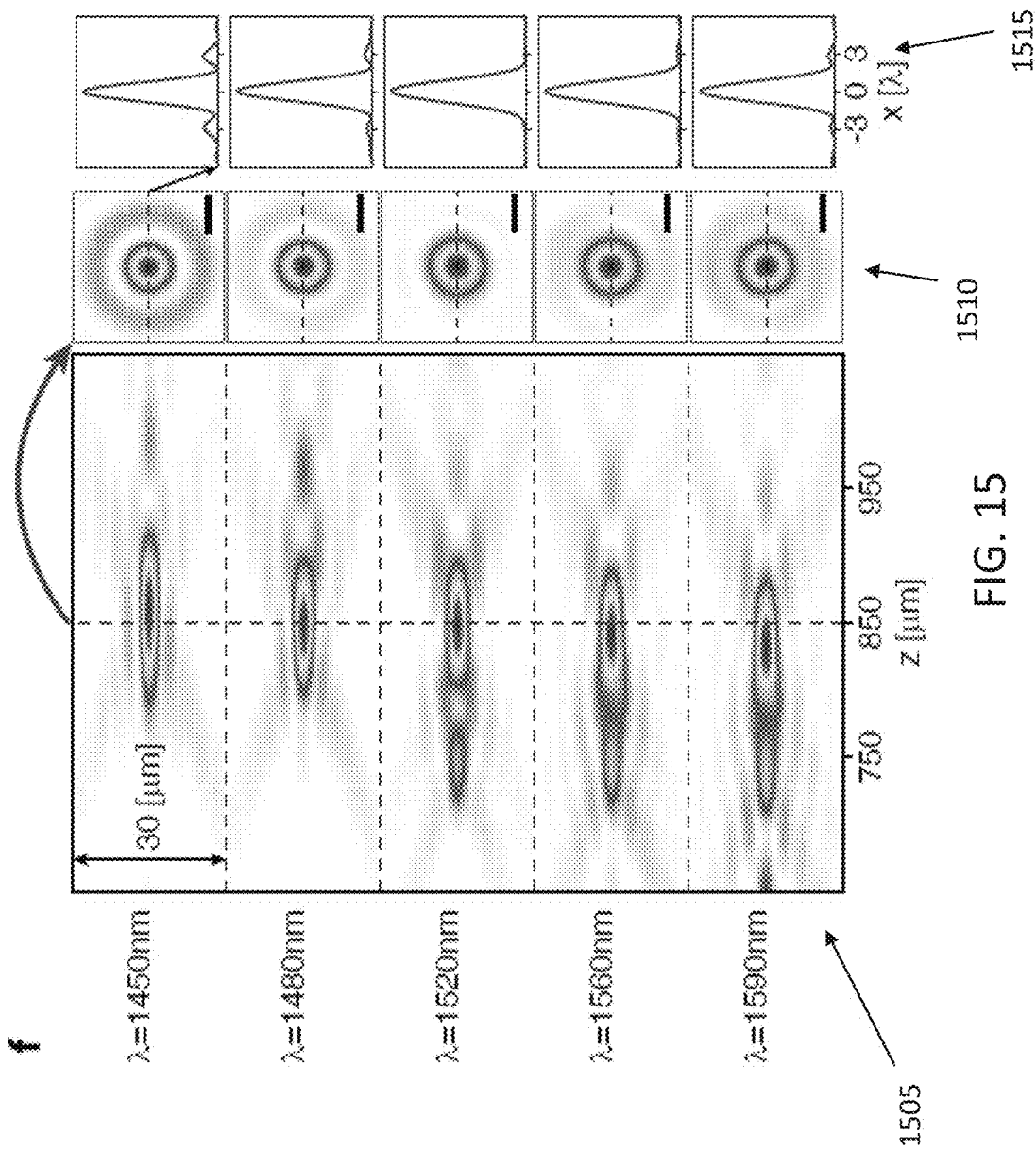
Figure 16:
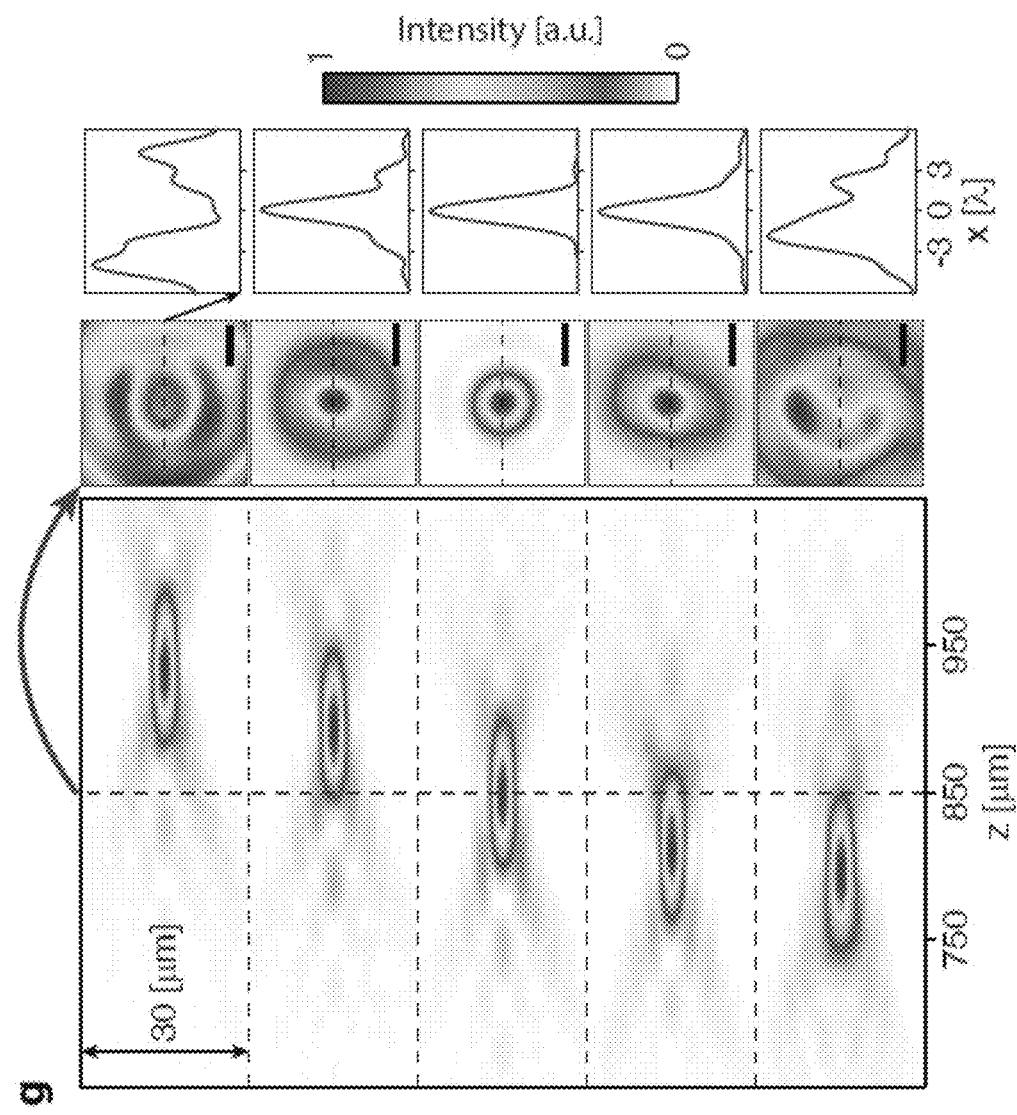

FIG. 13 panel d, FIG. 14 panel e, FIG. 15, panel f, and FIG. 16 panel g summarize the measurement results for the dispersionless and regular mirrors. As FIG. 13 panel d and FIG. 16 panel g show, the focal distance of the regular mirror changes almost linearly with wavelength. The dispersionless mirror, however, shows a highly diminished chromatic dispersion. Besides, as seen from the focal plane intensity measurements, while the dispersionless mirrors are in focus in the 850 µm plane throughout the measured bandwidth, the regular mirror is in focus only from 1500 to 1550 nm. Focusing efficiencies, defined as the ratio of the optical power focused by the mirrors to the power incident on them, were measured at different wavelengths for the regular and dispersionless mirrors. The measured efficiencies were normalized to the efficiency of the regular metasurface mirror at its center wavelength of 1520 nm (which is estimated to be ~80%-90% based on FIG. 10, measured grating efficiencies, and Ref. [1]). The normalized efficiency of the dispersionless mirror is between 50% and 60% in the whole wavelength range and shows no significant reduction in contrast to the regular metasurface mirror.

The reduction in efficiency compared to a mirror designed only for the center wavelength (i.e. the regular mirror) is caused by two main factors. First, the required region of the phase-dispersion plane is not completely covered by the reflective nano-post meta-atoms. Second, the meta-atom phase does not change linearly with respect to frequency in the relatively large bandwidth of 140 nm as would be ideal for a dispersionless metasurface. Both of these factors result in deviation of the phase profiles of the demonstrated dispersionless mirrors from the ideal ones. Furthermore, dispersionless metasurfaces use meta-atoms supporting resonances with high quality factors, thus leading to higher sensitivity of these devices to fabrication errors compared to the regular metasurfaces.

In the previous sections, it is shown that independent control over phase and dispersion of meta-atoms can be used to engineer the chromatic dispersion of diffractive metasurface devices over continuous wavelength regions. This is in effect similar to controlling the "material dispersion" of meta-atoms to compensate, over-compensate, or increase the structural dispersion of diffractive devices. A reflective dielectric metasurface platform has been described, providing this independent control. Several exemplary gratings and focusing mirrors have been described, exhibiting positive, negative, zero, and enhanced dispersions. In some embodiments, the chromatic aberrations of a focusing mirror were corrected, resulting in a ~3 times bandwidth increase (based on an Strehl ratio>0.6). Therefore, the concept of metasurface design based on dispersion-phase parameters of the meta-atoms has been described, and can also be used for developing transmissive dispersion engineered metasurface devices.

In the following, several experimental methods are described to fabricate exemplary devices according to the methods described in the present disclosure. As the person of ordinary skill in the art will understand, the devices described in the present disclosure are exemplary, and different devices may be fabricated having different parameters.

Simulation and Design.

Figure 9:
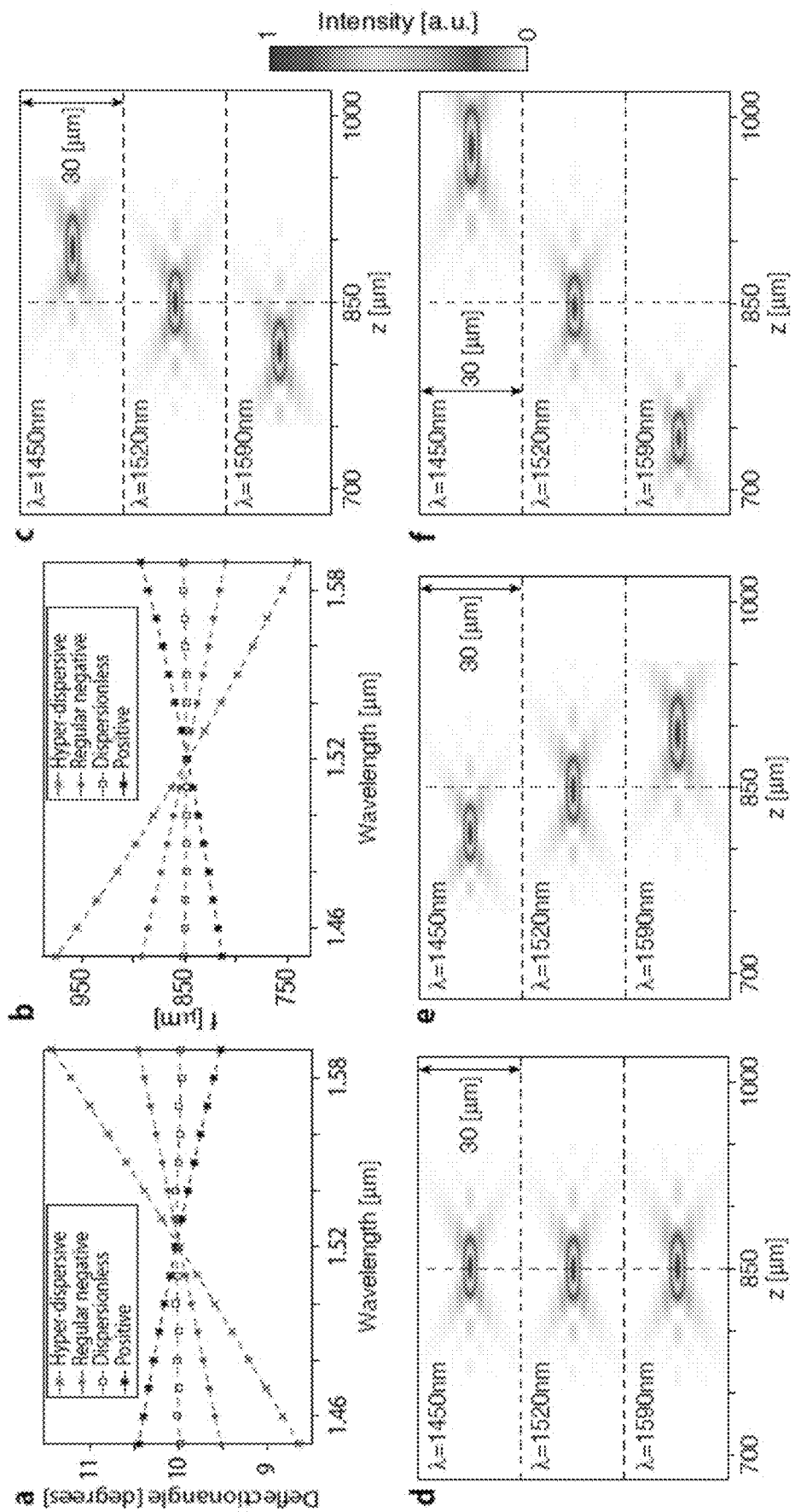
FIG. 9 illustrates simulation results of dispersion-engineered metasurfaces.

The gratings with different dispersions discussed in FIG. 9 panel a were designed using hypothetical meta-atoms that completely cover the required region of the phase-dispersion plane. It was assumed that the meta-atoms provide 100 different phase steps from 0 to 2π, and that for each phase, 10 different dispersion values are possible, linearly spanning the 0 to −150 Rad/µm range. It was also assumed that all the meta-atoms have a transmission amplitude of 1. The design began with constructing the ideal phase masks at eight wavelengths equally spaced in the 1450 to 1590 nm range. This results in a vector of eight complex numbers for the ideal transmission at each point on the metasurface grating. The meta-atoms were assumed to form a two dimensional square lattice with a lattice constant of 740 nm, and one vector was generated for each lattice site. The optimum meta-atom for each site was then found by minimizing the Euclidean distance between the transmission vector of the meta-atoms and the ideal transmission vector for that site. The resulting phase mask of the grating was then found through a two-dimensional interpolation of the complex valued transmission coefficients of the chosen meta-atoms. The grating area was assumed to be illuminated uniformly, and the deflection angle of the grating was found by taking the Fourier transform of the field after passing through the phase mask, and finding the angle with maximum intensity. A similar method was used to design and simulate the focusing mirrors discussed in FIG. 9 panels b-f. In this case, the meta-atoms are assumed to cover dispersion values up to −200 Rad/µm. The meta-atoms provide 21 different dispersion values distributed uniformly in the 0 to −200 Rad/µm range. The focusing mirrors were designed and the corresponding phase masks were found in a similar manner to the gratings. A uniform illumination was used as the source, and the resulting field after reflection from the mirror was propagated in free space using a plane wave expansion method to find the intensity in the axial plane. The focal distances plotted in FIG. 9 panel b show the distance of the maximum intensity point from the mirrors at each wavelength. The gratings and focusing mirrors discussed in FIG. 11 panel a and FIG. 13 panels a and c are designed and simulated in a similar manner, except for using actual dielectric meta-atom reflection amplitudes and phases instead of the hypothetical ones.

Reflection amplitude and phase of the meta-atoms were found using rigorous coupled wave analysis technique [32]. For each meta-atom size, a uniform array on a subwavelength lattice was simulated using a normally incident plane wave. The subwavelength lattice ensures the existence of only one propagating mode which justifies the use of only one amplitude and phase for describing the optical behavior at each wavelength. In the simulations, the amorphous silicon layer was assumed to be 725 nm thick, the $SiO_2$ layer was 325 nm, and the aluminum layer was 100 nm thick. A 30-nm-thick $Al_2O_3$ layer was added between the Al and the oxide layer (this layer served as an etch stop layer to avoid exposing the aluminum layer during the etch process). Refractive indices were set as follows in the simulations: $SiO_2$: 1.444, $Al_2O_3$: 1.6217, and Al: 1.3139-i13.858. The refractive index of amorphous silicon used in the simulations is plotted in FIG. 30.

The finite-difference time-domain (FDTD) simulations of the gratings (FIG. 12 panels e-h) were performed using a normally incident plane-wave illumination with a Gaussian amplitude in time (and thus a Gaussian spectrum) in MEEP, a FDTD simulation software package developed at MIT to model electromagnetic systems [33]. The reflected electric field was saved in a plane placed one wavelength above the input plane at time steps of 0.05 of the temporal period. The results in FIG. 12 panels e-h are obtained via Fourier transforming the fields in time and space resulting in the reflection intensities as a function of frequency and transverse wave-vector.

Sample Fabrication.

A 100-nm aluminum layer and a 30-nm $Al_2O_3$ layer were deposited on a silicon wafer using electron beam evaporation. This was followed by deposition of 325 nm of $SiO_2$ and 725 nm of amorphous silicon using the plasma enhanced chemical vapor deposition (PECVD) technique at 200° C. A ~300 nm thick layer of positive electron-beam resist was spun on the sample at 5000 rpm for 1 min, and was baked at 180° C. for 3 min. The pattern was generated using an electron beam lithography system, and was developed for 3 minutes in the developer. A ~70-nm $Al_2O_3$ layer was subsequently evaporated on the sample, and the pattern was reversed with a lift off process. The $Al_2O_3$ hard mask was then used to etch the amorphous silicon layer in a 3:1 mixture of $SF_6$ and $C_4F_8$ plasma. The mask was later removed using a 1:1 solution of ammonium hydroxide and hydrogen peroxide at 80° C.

Measurement Procedure.

Figure 22:
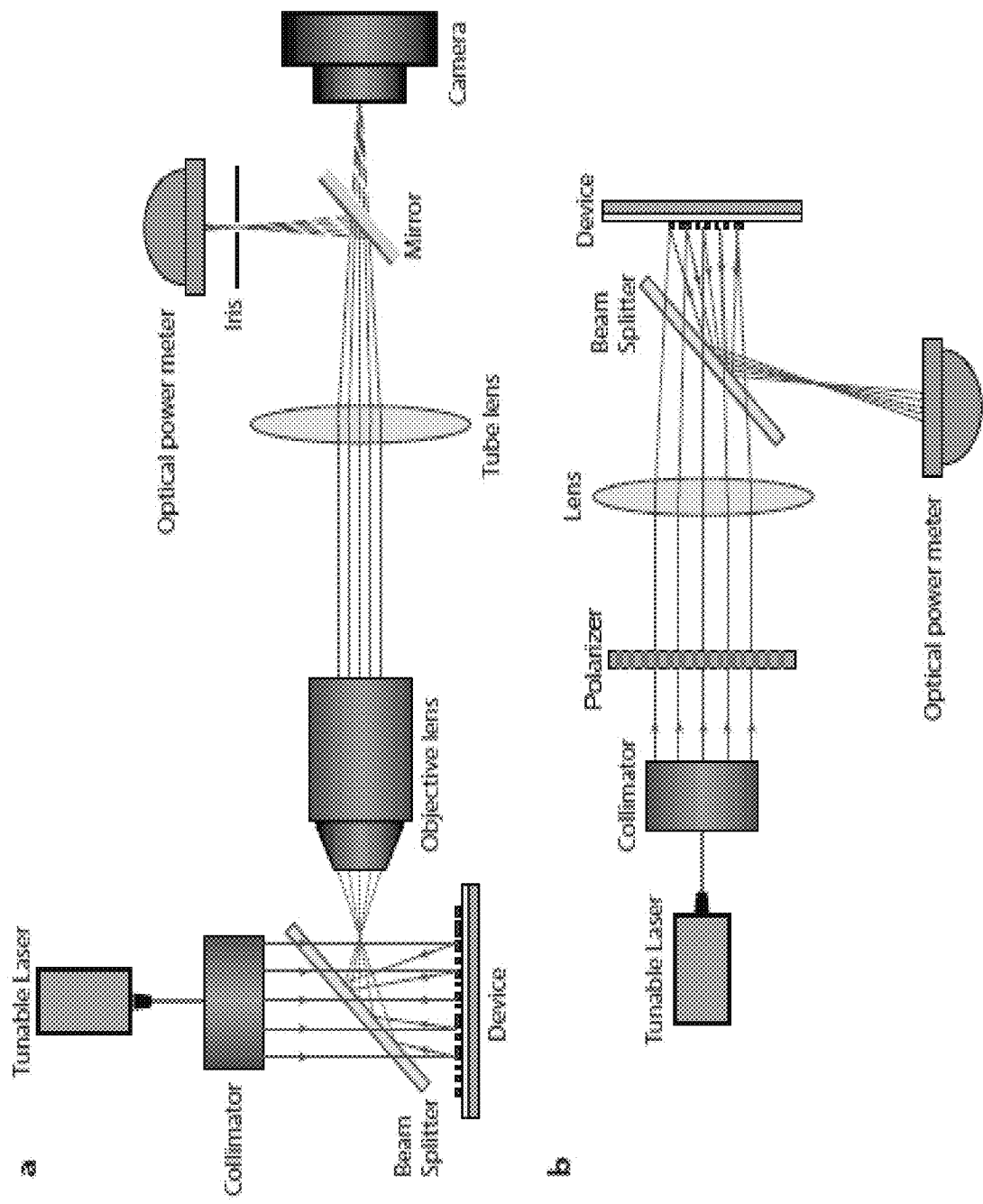
FIG. 22 illustrates exemplary measurement setups.

The Measurement Setup is Shown in FIG. 22 Panel a. Light emitted from a tunable laser source was collimated using a fiber collimation package, passed through a 50/50 beam splitter, and illuminated the device. For grating measurements a lens with a 50 mm focal distance was also placed before the grating at a distance of ~45 mm to partially focus the beam and reduce the beam divergence after being deflected by the grating in order to decrease the measurement error (as shown in FIG. 22 panel b). The light reflected from the device was redirected using the same beam splitter, and imaged using a custom built microscope. The microscope consists of a 50× objective (NA=0.5), a tube lens with a 20 cm focal distance, and an InGaAs camera. The grating deflection angle was found by calculating the center of mass for the deflected beam imaged 3 mm away from the gratings surface. For efficiency measurements of the focusing mirrors, a flip mirror was used to send light towards an iris (2 mm diameter, corresponding to an approximately 40 μm iris in the object plane) and a photodetector. The efficiencies were normalized to the efficiency of the regular mirror at its center wavelength by dividing the detected power through the iris by the power measured for the regular mirror at its center wavelength. The measured intensities were up-sampled using their Fourier transforms in order to achieve smooth intensity profiles in the focal and axial planes. To measure the grating efficiencies, the setup shown in FIG. 22 panel b was used, and the photodetector was placed ~50 mm away from the grating, such that the other diffraction orders fall outside its active area. The efficiency was found by calculating the ratio of the power deflected by the grating to the power normally reflected by the aluminum reflector in areas of the sample with no grating. The beam-diameter on the grating was calculated using the setup parameters, and it was found that ~84% of the power was incident on the 90 μm wide gratings. This number was used to correct for the lost power due to the larger size of the beam compared to the grating.

In the following, some topics utilized in the sections above are expanded in details.

Chromatic Dispersion of Diffractive Devices.

Chromatic dispersion of a regular diffractive grating or lens is set by its function. The grating momentum for a given order of a grating with a certain period is constant and does not change with changing wavelength. If the size of the grating reciprocal lattice vector of interest is denoted by $k_G$, it is possible to obtain:

$$\sin(\theta) = \frac{k_G}{2\pi/\lambda} \Longrightarrow \theta = \sin^{-1}\left(\frac{k_G}{2\pi/\lambda}\right), \quad (4)$$

where θ is the deflection angle at a wavelength λ for normally incident beam. The chromatic angular dispersion of the grating (dθ/dλ) is then given by:

$$\frac{d\theta}{d\lambda} = \frac{k_G/2\pi}{\sqrt{1-(k_G\lambda/2\pi)^2}} = \frac{\tan(\theta)}{\lambda}. \quad (5)$$

and in terms of frequency:

$$\frac{d\theta}{d\omega} = -\frac{\tan(\theta)}{\omega}. \quad (6)$$

Therefore, the dispersion of a regular grating only depends on its deflection angle and the wavelength. Similarly, focal distance of one of the focal points of diffractive and metasurface lenses changes as df/dλ=−f/λ (thus df/dω=f/ω ([6, 28, 29]).

Chromatic Dispersion of Multiwavelength Diffractive Devices.

Figure 17:
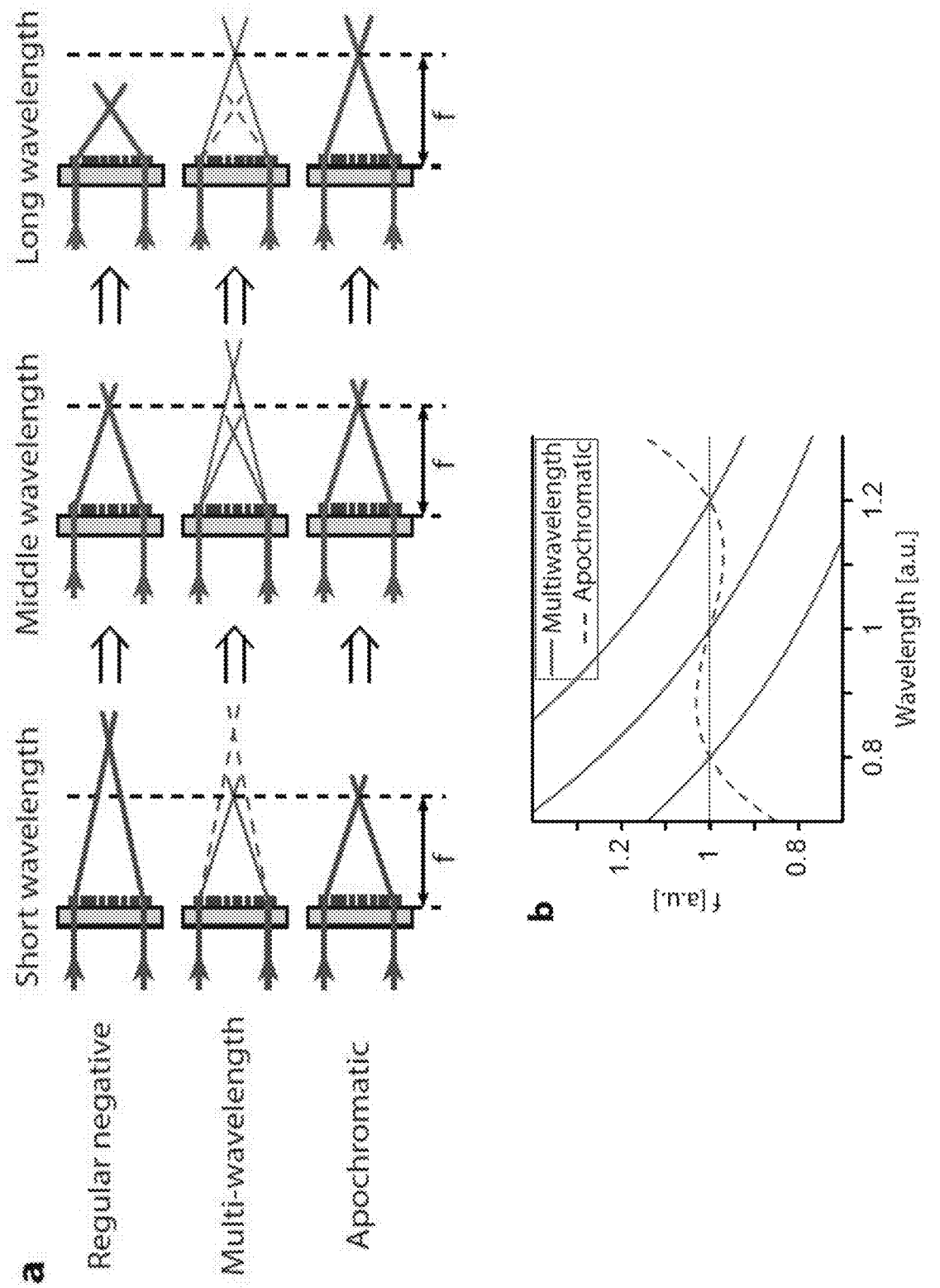
FIG. 17 illustrates a comparison of regular, multi-wavelength, and apochromatic lenses.

As mentioned above, multiwavelength diffractive devices ([28, 29, 30]) do not change the dispersion of a given order in a grating or lens. They are essentially multi-order gratings or lenses, where each order has the regular (negative) diffractive chromatic dispersion. These devices are designed such that at certain distinct wavelengths of interest, one of the orders has the desired deflection angle or focal distance. If the blazing of each order at the corresponding wavelength is perfect, all of the power can be directed towards that order at that wavelength. However, at wavelengths in between the designed wavelengths, where the grating or lens is not corrected, the multiple orders have comparable powers, and show the regular diffractive dispersion. This is schematically shown in shown in FIG. 17 panel a. FIG. 17 panel b compares the chromatic dispersion of a multi-wavelength diffractive lens to a typical refractive apochromatic lens.

Generalization of Chromatic Dispersion Control to Non-zero Dispersions.

This section describes the general form of equations for the dispersion engineered metasurface diffractive devices. It is assumed that the function of the device is set by a parameter ξ(ω), which is frequency dependent. For instance, ξ might denote the deflection angle of a grating or the focal distance of a lens. The phase profile of a device with a desired ξ(ω) is given by $$\phi(x,y,\xi(\omega);\omega) = \omega T(x,y,\xi(\omega)), \quad (7)$$

which is the generalized form of the Eq. (4). To control the parameter $\xi(\omega)$ and its dispersion (i.e. derivative) at a given frequency $\omega_0$, $\xi(\omega)$ can be approximated as $\xi(\omega) \approx \xi_0 + \partial \xi / \partial \omega |_{\omega=\omega_0} (\omega - \omega_0)$ over a narrow bandwidth around $\omega_0$. Using this approximation, it is possible to rewrite Eq. (7) as:

$$\phi(x,y;\omega) = \omega T(x,y,\xi_0 + \partial\xi/\partial\omega|_{\omega=\omega_0}(\omega-\omega_0)) \tag{8}$$

At $\omega_0$, Eq. (8) reduces to:

$$\phi(x,y;\omega)|_{\omega=\omega_0} = \omega_0 T(x,y,\xi_0), \tag{9}$$

and the phase dispersion at $\omega_0$ is given by $$\frac{\partial \phi(x,y;\omega)}{\partial \omega}\bigg|_{\omega=\omega_0} = T(x, y, \xi_0) + \partial\xi/\partial\omega\bigg|_{\omega=\omega_0} \omega_0 \frac{\partial T(x, y, \xi)}{\partial \xi}\bigg|_{\xi=\xi_0}. \tag{10}$$

Based on Eqs. (9) and (10), the values of $\xi_0$ and $\partial\xi/\partial\omega|_{\omega=\omega_0}$ can be set independently, if the phase $\phi(x,y,\omega_0)$ and its derivative $\partial\phi/\partial\omega$ can be controlled simultaneously and independently. Therefore, the device function at $\omega_0$ (determined by the value of $\xi_0$) and its dispersion (determined by $\partial\xi/\partial\omega|_{\omega=\omega_0}$) will be decoupled. The zero dispersion case is a special case of Eq. (10) with $\partial\xi/\partial\omega|_{\omega=\omega_0}=0$. In the following these results are applied to the special cases of blazed gratings and spherical-aberration-free lenses (also correct for spherical-aberration-free focusing mirrors).

For a 1-dimensional conventional blazed grating, $\xi=\theta$ (the deflection angle), and $T=-x \sin(\theta)$. Therefore the phase profile with a general dispersion is given by:

$$\phi(x;\omega) = -\omega x \sin[\theta_0 + D(\omega - \omega_0)], \tag{11}$$

where $D = \partial\theta/\partial\omega|_{\omega=\omega_0} = vD_0$, and $D_0 = -\tan(\theta_0)/\omega_0$ is the angular dispersion of a regular grating with deflection angle $\theta_0$ at the frequency $\omega_0$. The generalized dispersion D is expressed as a multiple of the regular dispersion $D_0$ with a real number v to benchmark the change in dispersion. For instance, v=1 corresponds to a regular grating, v=0 represents a dispersionless grating, v=−1 denotes a grating with positive dispersion, and v=3 results in a grating three times more dispersive than a regular grating (i.e. hyper-dispersive). Various values of v can be achieved using the method of simultaneous control of phase and dispersion of the meta-atoms, and thus it is possible to break this fundamental relation between the deflection angle and angular dispersion. The phase derivative necessary to achieve a certain value of v is given by:

$$\frac{\partial \phi(x;\omega)}{\partial \omega}\bigg|_{\omega=\omega_0} = -x/c \sin(\theta_0)(1-v), \tag{12}$$

or in terms of wavelength:

$$\frac{\partial \phi(x, \lambda)}{\partial \lambda}\bigg|_{\lambda=\lambda_0} = \frac{2\pi}{\lambda_0^2} x \sin(\theta_0)(1-v). \tag{13}$$

For a spherical-aberration-free lens, $\xi=f$ and $T(x,y,f) = -\sqrt{x^2+y^2+f^2}/c$. Again it is possible to approximate f with its linear approximation $f(\omega)=f_0+D(\omega-\omega_0)$, with $D=\partial f/\partial \omega|_{\omega=\omega_0}$ denoting the focal distance dispersion at $\omega=\omega_0$. The regular dispersion for such a lens is given by $D_0=f_0/\omega_0$. Similar to the gratings, it is possible to write the more general form for the focal distance dispersion as $D=vD_0$, where v is some real number. In this case, the required phase dispersion is given by:

$$\frac{\partial \phi(x, y; \omega)}{\partial \omega}\bigg|_{\omega=\omega_0} = -\frac{1}{c}\left[\sqrt{x^2 + y^2 + f_0^2} + \frac{v f_0^2}{\sqrt{x^2 + y^2 + f_0^2}}\right], \tag{14}$$

which can also be expressed in terms of wavelength:

$$\frac{\partial \phi(x, y; \lambda)}{\partial \lambda}\bigg|_{\lambda=\lambda_0} = \frac{2\pi}{\lambda_0^2}\left[\sqrt{x^2 + y^2 + f_0^2} + \frac{v f_0^2}{\sqrt{x^2 + y^2 + f_0^2}}\right]. \tag{15}$$

Maximum Meta-Atom Dispersion Required for Controlling Chromatic Dispersion of Gratings and Lenses.

Since the maximum achievable dispersion is limited by the meta-atom design, it is useful to find a relation between the maximum dispersion required for implementation of a certain metasurface device. These maxima can be found for the cases of gratings and lenses with given desired dispersions, as follows.

For the grating case, it results from Eq. (13) that the maximum required dispersion is given by $$\max\left(\frac{\partial \phi(x;\lambda)}{\partial \lambda}\bigg|_{\lambda=\lambda_0}\right) = k_0 X \frac{\sin(\theta_0)}{\lambda_0}(1-v), \tag{16}$$

where X is the length of the grating, and $k_0=2\pi/\lambda_0$ is the wavenumber. It is important to note that based on the value of v, the sign of the meta-atom dispersion changes. However, in order to ensure a positive group velocity for the meta-atoms, the dispersions should be negative. Thus, if 1−v>0, a term should be added to make the dispersion values negative. It is possible to add a term of type $\phi_0 = kL_0$ to the phase without changing the function of the device. This term can be used to shift the required region in the phase-dispersion plane. Therefore, it is actually the difference between the minimum and maximum of Eqs. 13 and 15 that sets the maximum required dispersion. Using a similar it is possible to find the maximum necessary dispersion for a spherical-aberration-free lens as $$\phi'_{max} = \tag{17}$$

$$\max\left(\frac{\partial \phi(x, y; \lambda)}{\partial \lambda}\bigg|_{\lambda=\lambda_0}\right) = -\frac{k_0 f}{\lambda_0} \begin{cases} \frac{\Theta+v}{\sqrt{\Theta}} - 1 - v & v < 1 \\ \frac{\Theta+v}{\sqrt{\Theta}} - 2\sqrt{v} & 1 < v < \sqrt{\Theta} \\ (1-\sqrt{v})^2 & \sqrt{\Theta} < v < \Theta \\ -\left(\frac{\Theta+v}{\sqrt{\Theta}} - 1 - v\right) & \Theta < v \end{cases},$$

where f is the focal distance of the lens, and $\Theta=(f^2+R^2)/f^2=1/(1-NA^2)$ (R: lens radius, NA: numerical aperture). The function $\log[\phi'_{max}/(-k_0 f/\lambda_0)]$ is plotted in FIG. 18 panel a as a function of NA and v. In the simpler case of dispersionless lenses (i.e. v=0), Eq. (17) can be further simplified to $$\phi'_{max} = \max\left(\frac{\partial \phi(x, y; \lambda)}{\partial \lambda}\bigg|_{\lambda=\lambda_0}\right) = -\frac{k_0 R - \sqrt{1-NA^2}}{\lambda} \cdot \frac{1}{NA} \approx -\frac{k_0 R NA}{2\lambda} \quad (18)$$

where R is the lens radius and the approximation is valid for small values of NA. The maximum required dispersion for the dispersionless lens is normalized to $-k_0 R/\lambda_0$ and is plotted in FIG. 18 panel b as a function of NA.

Relation Between Dispersion and Quality Factor of Highly Reflective or Transmissive Meta-Atoms.

It is possible to show that the phase dispersion of a meta-atom is linearly proportional to the stored optical energy in the meta-atoms, or equivalently, to the quality factor of the resonances supported by the meta-atoms. To relate the phase dispersion of transmissive or reflective meta-atoms to the stored optical energy, it is possible to follow an approach similar to the one taken in chapter 8 of Ref [34] for finding the dispersion of a single port microwave circuit. It is possible to start from the frequency domain Maxwell's equations:

$$\nabla \times E = i\omega\mu H,$$

$$\nabla \times H = -i\omega\varepsilon E, \quad (19)$$

and take the derivative of the Eq. (19) with respect to the frequency:

$$\nabla \times \frac{\partial E}{\partial \omega} = i\mu H i\omega\mu \frac{\partial H}{\partial \omega}, \quad (20)$$

$$\nabla \times \frac{\partial H}{\partial \omega} = -i\varepsilon E - i\omega\varepsilon \frac{\partial E}{\partial \omega}. \quad (21)$$

Multiplying Eq. (20) by H* and the conjugate of Eq. (21) by $\partial E/\partial\omega$, and subtracting the two, it is possible to obtain $$\nabla \cdot \left(\frac{\partial E}{\partial \omega} \times H^*\right) = i\mu|H|^2 + i\omega\mu \frac{\partial H}{\partial \omega} \cdot H^* - i\omega\varepsilon \frac{\partial E}{\partial \omega} \cdot E^*. \quad (22)$$

Similarly, multiplying Eq. (21) by E* and the conjugate of Eq. (20) by $\partial H/\partial\omega$, and subtracting the two it is possible to find:

$$\nabla \cdot \left(\frac{\partial H}{\partial \omega} \times E^*\right) = -i\varepsilon|E|^2 - i\omega\varepsilon \frac{\partial E}{\partial \omega} \cdot E^* + i\omega\mu \frac{\partial H}{\partial \omega} \cdot H^*. \quad (23)$$

Subtracting Eq. (23) from Eq. (22) it is possible to obtain:

$$\nabla \cdot \left(\frac{\partial E}{\partial \omega} \times H^* - \frac{\partial H}{\partial \omega} \times E^*\right) = i\mu|H|^2 + i\varepsilon|E|^2. \quad (24)$$

Figure 33:
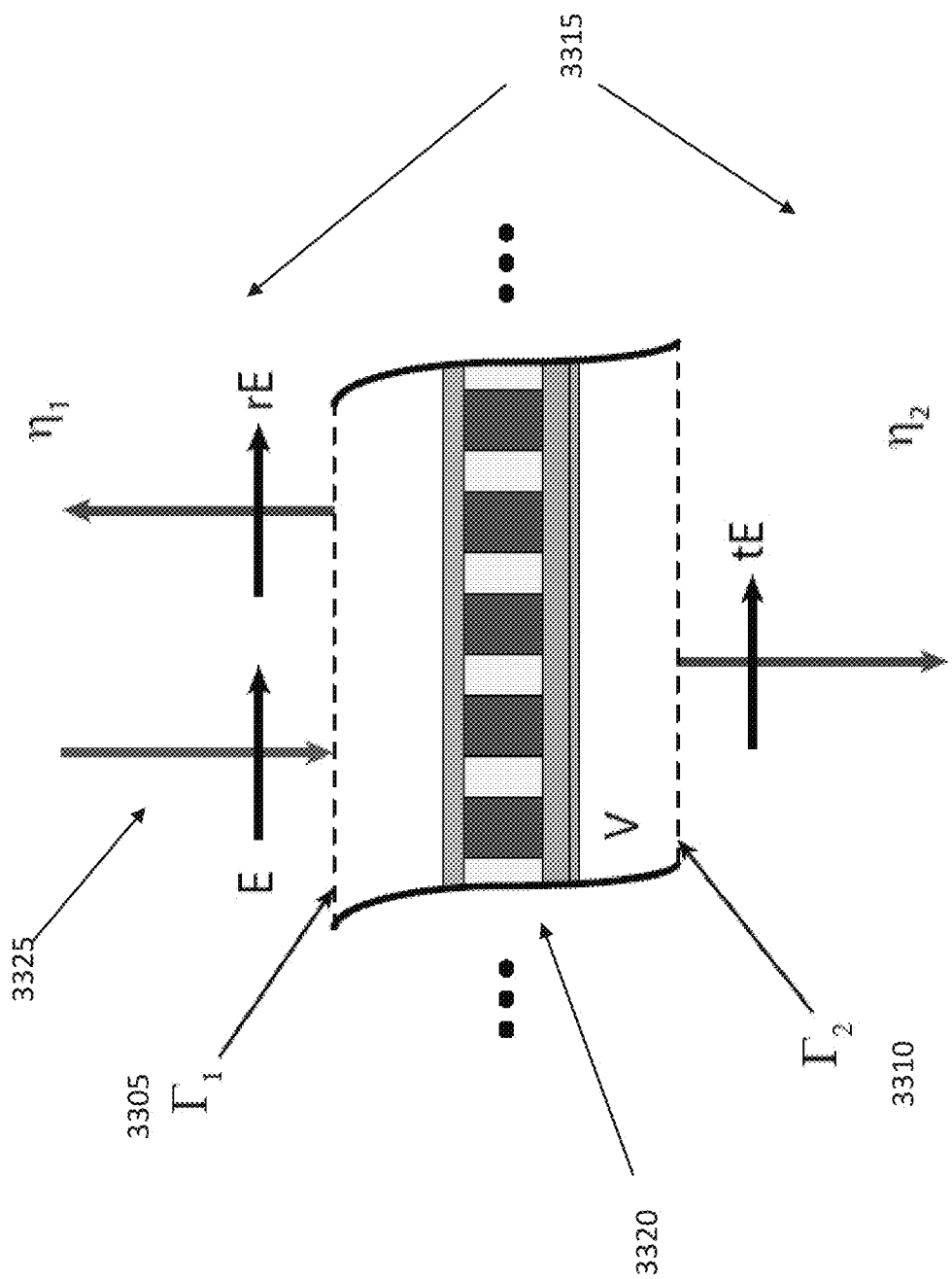
FIG. 33 illustrates a schematic of an exemplary metasurface.

Integrating both sides of Eq. (24), and using the divergence theorem to convert the left side to a surface integral leads to:

$$\oint_{\partial V} \left(\frac{\partial E}{\partial \omega} \times H^* - \frac{\partial H}{\partial \omega} \times E^*\right) = i\int_V (\mu|H|^2 + \varepsilon|E|^2) dv = 2iU, \quad (25)$$

where U is the total electromagnetic energy inside the volume V, and $\partial V$ denotes the surrounding surface of the volume. Now it is possible to consider a metasurface composed of a subwavelength periodic array of meta-atoms as shown in FIG. 33. It is also possible to consider two virtual planar boundaries $\Gamma_1$ and $\Gamma_2$ (3305,3310) on both sides on the metasurface. The two virtual boundaries (3305,3310) are considered far enough from the metasurface that the metasurface evanescent fields die off before reaching them. Because the metasurface is periodic with a subwavelength period and preserves polarization, it is possible to write the transmitted and reflected fields at the virtual boundaries in terms of only one transmission t and reflection r coefficients. The fields at these two boundaries are given by:

$$E_1 = E + rE \quad (26)$$
$$H_1 = -\hat{z} \times \left(\frac{E}{\eta_1} - r\frac{E}{\eta_1}\right)$$
$$E_2 = tE$$
$$H_2 = t\hat{z} \times \frac{E}{\eta_2}$$

where E is the input field, $E_1$ and $E_2$ are the total electric fields at $\Gamma_1$ and $\Gamma_2$, respectively, and $\eta_1$ and $\eta_2$ are wave impedances in the materials on the top and bottom of the metasurface.

Inserting fields from Eq. (26) to Eq. (25), and using the uniformity of the fields to perform the integration over one unit of area, it is possible to obtain:

$$\frac{\partial r}{\partial \omega} r^* \frac{|E|^2}{\eta_1} + \frac{\partial t}{\partial \omega} t^* \frac{|E|^2}{\eta_2} = i\tilde{U} \quad (27)$$

where $\tilde{U}$ is the optical energy per unit area that is stored in the metasurface layer. For a loss-less metasurface that is totally reflective (i.e. t=0 and $r=e^{i\phi}$), it is possible to obtain:

$$\frac{\partial \phi}{\partial \omega} = \frac{\tilde{U}}{P_{in}}, \quad (28)$$

where $P_{in}=|E|^2/\eta_1$ was used to denote the per unit area input power. The dispersion can then be expressed as:

$$\frac{\partial \phi}{\partial \lambda} = \frac{\partial \phi}{\partial \omega} \frac{\partial \omega}{\partial \lambda} = -\frac{\omega}{\lambda} \frac{\tilde{U}}{P_{in}}. \quad (29)$$

Eq. (29) can be used in the present disclosure to calculate the dispersion from solutions of the electric and magnetic fields at a single wavelength, which reduces simulation time. In addition, in steady state the input and output powers are equal $P_{out}=P_{in}$, and therefore it is possible to obtain:

$$\frac{\partial \phi}{\partial \lambda} = -\frac{1}{\lambda} \frac{\omega \tilde{U}}{P_{out}} = -\frac{Q}{\lambda} \quad (30)$$

where it has been assumed that almost all of the stored energy is in one single resonant mode, and Q is the quality factor of that mode. Therefore, in order to achieve large dispersion values, resonant modes with high quality factors can be advantageous.

FIG. 8 illustrates schematic examples of different dispersion regimes: panel a, Positive chromatic dispersion in refractive prisms and lenses made of materials with normal dispersion; panel b, Regular (negative) dispersion in typical diffractive and metasurface gratings and lenses; panel c, Schematic illustration of zero dispersion in dispersion-controlled metasurfaces; panel d, positive dispersion in dispersion-controlled metasurfaces; panel e, hyper dispersion in dispersion-controlled metasurfaces. Only three wavelengths are shown in FIG. 8, but the dispersions are valid for any other wavelength in the bandwidth. The diffractive devices are shown in transmission mode, while in other embodiments, devices may operate in reflection mode.

FIG. 9 illustrates simulation results of dispersion-engineered metasurfaces based on theoretical meta-atoms: panel a shows simulated deflection angles for gratings with regular, zero, positive, and hyper dispersions. The exemplary gratings are 150 μm wide and have a 10-degree deflection angle at 1520 nm. In panel b, FIG. 9 illustrates simulated focal distances for metasurface focusing mirrors with different types of dispersion. The mirrors are 500 μm in diameter and have a focal distance of 850 μm at 1520 nm. All gratings and focusing mirrors are designed using hypothetical meta-atoms that provide independent control over phase and dispersion. In panel c, FIG. 9 illustrates intensity in the axial plane for the focusing mirrors with regular negative; in panel d zero dispersion plotted at three wavelengths, in panel e positive dispersion plotted at three wavelengths, and in panel f hyper dispersion plotted at three wavelengths.

FIG. 10 illustrates exemplary high dispersion silicon meta-atoms: panel a, A meta-atom composed of a square cross-section amorphous silicon nano-post on a silicon dioxide layer on a metallic reflector. Top and side views of the meta-atoms arranged on a square lattice are also shown. In panel b, FIG. 10 illustrates simulated dispersion versus phase plot for the meta-atom shown in panel a at $\lambda_0$=1520 nm. In panel c, FIG. 10 illustrates simulated reflection amplitude, and in panel d, phase as a function of the nano-post side length and wavelength. The reflection amplitude and phase along the dashed lines (1005) are also plotted. In panels e-g, FIG. 10 illustrates scanning electron micrographs of the fabricated nano-posts and devices.

FIGS. 11-12 illustrate simulation and measurement results of gratings in different dispersion regimes. In panel a, FIG. 11 illustrates simulated deflection angles for gratings with different dispersions, designed using exemplary reflective meta-atoms. In panel b, FIG. 11 illustrates measured deflection angles for the same grating. In panel c, FIG. 11 illustrates measured deflection efficiency for the gratings under TE illumination, and in panel d, under TM illumination. In panels e-h, FIG. 12 illustrates a comparison between FDTD simulation results showing the intensity distribution of the diffracted wave as a function of normalized transverse wave-vector ($k_x/k_0$, $k_0=2\pi/\lambda_0$, and $\lambda_0$=1520 nm) and wavelength for different gratings, and the measured peak intensity positions plotted with black stars. All simulations in FIG. 12 are performed with TE illumination. The lines (1210) show the theoretically expected maximum intensity trajectories.

FIGS. 13-16 illustrate simulation and measurement results for mirrors with different dispersion regimes. In panel a, FIG. 13 illustrates simulated focal distance for focusing mirrors with different dispersions, designed using the reflective meta-atoms. The exemplary mirrors are 240 μm in diameter and have a focal distance of 650 μm at 1520 nm. In panel b, FIG. 13 illustrates measured focal distances of the same focusing mirrors. In panel c, FIG. 13 illustrates simulated and, in panel d, measured focal distance deviation from its design value of 850 μm as a function of wavelength for the dispersionless and regular mirrors. In panel e, FIG. 14 illustrates measured efficiency for the regular and dispersionless mirrors normalized to the efficiency of the regular device at its center wavelength of 1520 nm. In panel f, FIG. 15 illustrates measured intensity in the axial plane of the dispersionless metasurface mirror at five wavelengths (1505). Intensity distributions measured in the desired focal plane (i.e. 850 μm away from the mirror surface) at the same wavelengths are shown in (1510), and their one dimensional profiles along the x axis are plotted in (1215). In panel g, FIG. 16 illustrates the same type of plots as in FIG. 15 but for the regular mirror. Scale bars: 2λ.

FIG. 17 illustrates a comparison of regular, multi-wavelength, and apochromatic lenses. In panel a, FIG. 17 illustrates a schematic comparison of a regular, a multi-wavelength, and an apochromatic metasurface lens. The multi-wavelength lens is corrected at a short and a long wavelength to have a single focal point at a distance f, but it has two focal points at wavelengths in between them, none of which is at f. The apochromatic lens is corrected at the same short and long wavelengths, and in the wavelengths between them it will have a single focus very close to f. In panel b, FIG. 17 illustrates focal distances for three focal points of a multiwavelength lens corrected at three wavelengths, showing the regular dispersion (i.e. f∝1/λ) of each focus with wavelength. For comparison, the focal distance for the single focus of a typical apochromatic lens is plotted.

Figure 18:
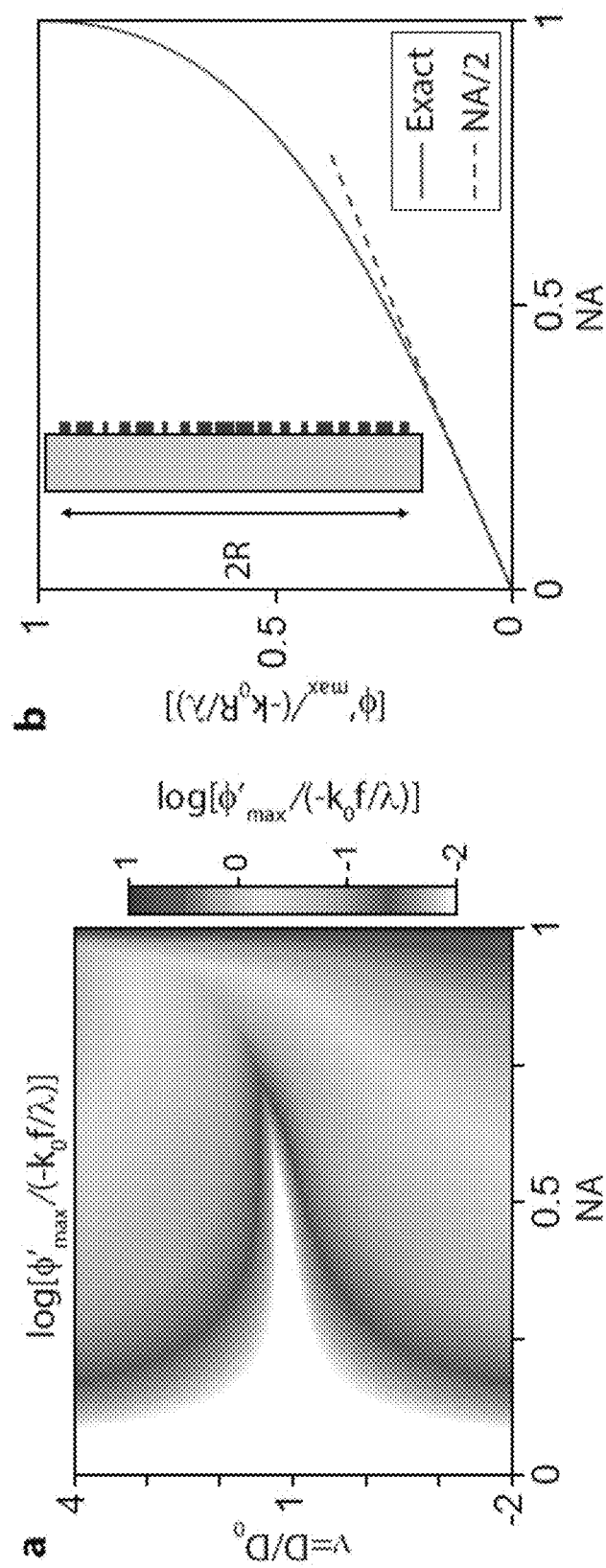
FIG. 18 illustrates an example of the maximum required dispersion of meta-atoms for lenses.

FIG. 18 illustrates an example of the maximum required dispersion of meta-atoms for lenses. In panel a, FIG. 18 illustrates the maximum meta-atom dispersion necessary to control the dispersion of a spherical-aberration-free lens. The maximum dispersion is normalized to $-k_0 f/\lambda_0$ and is plotted on a logarithmic scale. In panel b, FIG. 18 illustrates the maximum dispersion, normalized to $-k_0 R/\lambda_0$, required for a dispersionless lens. R is the radius, f is the focal distance, and NA is the numerical aperture of the lens.

Figure 19:
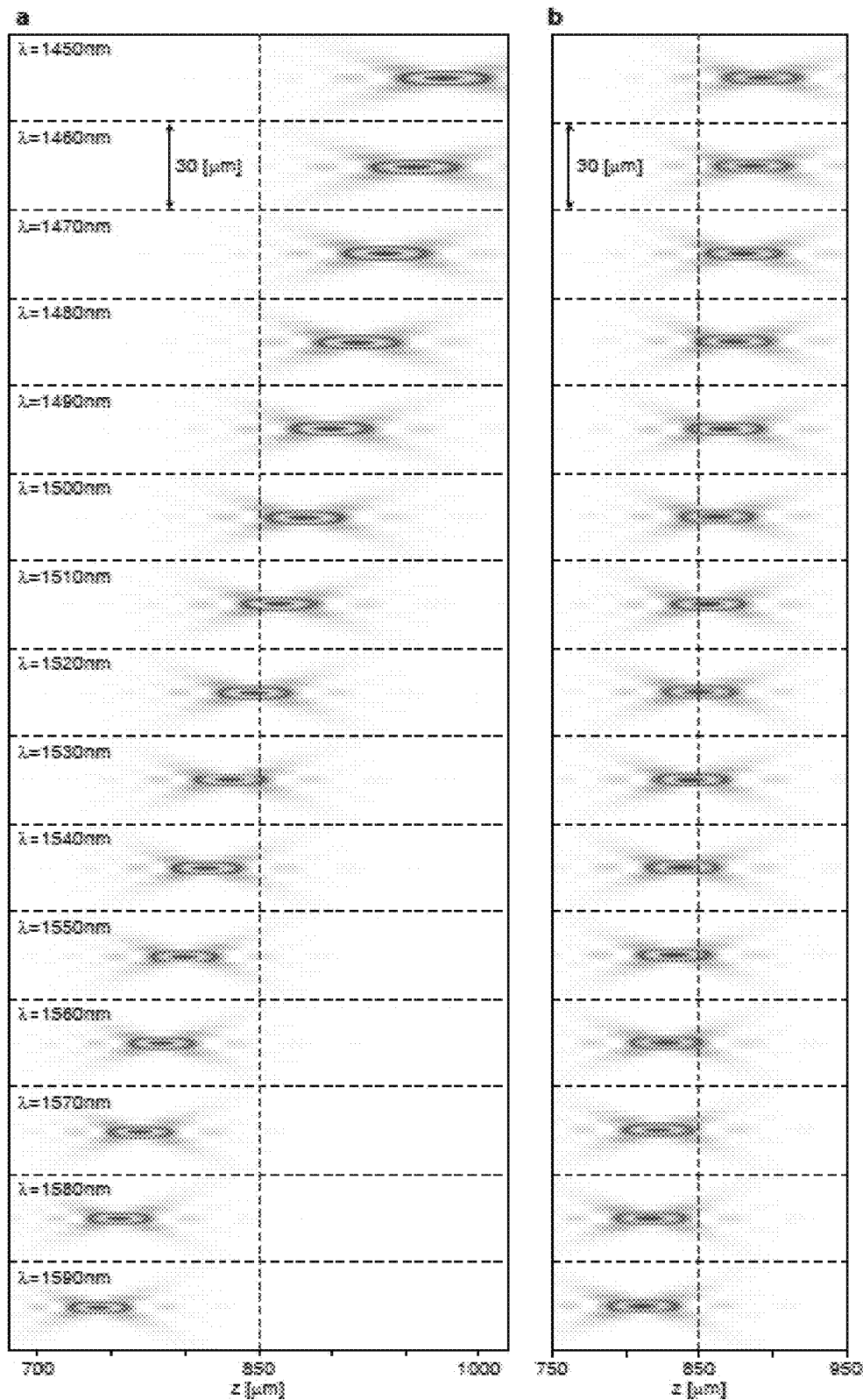
FIGS. 19-20 illustrate simulated axial intensity distribution for focusing mirrors with different dispersions.
Figure 20:
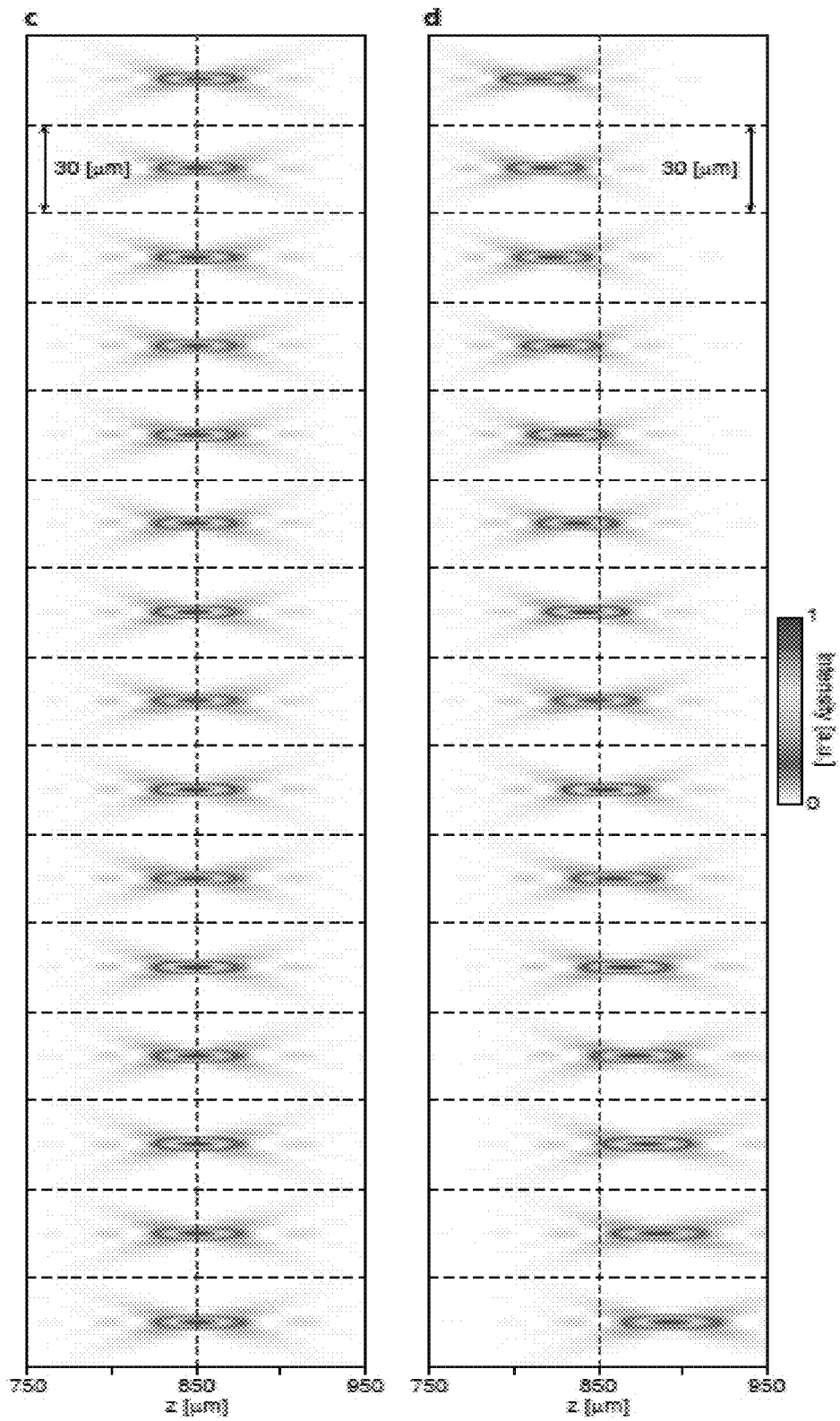

FIGS. 19-20 illustrate simulated axial intensity distribution for focusing mirrors with different dispersions designed using exemplary meta-atoms. In panel a, FIG. 19 illustrates data for a hyper-dispersive mirror; in panel b, data for a mirror with regular dispersion. In panel c, FIG. 20 illustrates data for a mirror with zero dispersion; in panel d, data for a mirror with positive dispersion.

Figure 21:
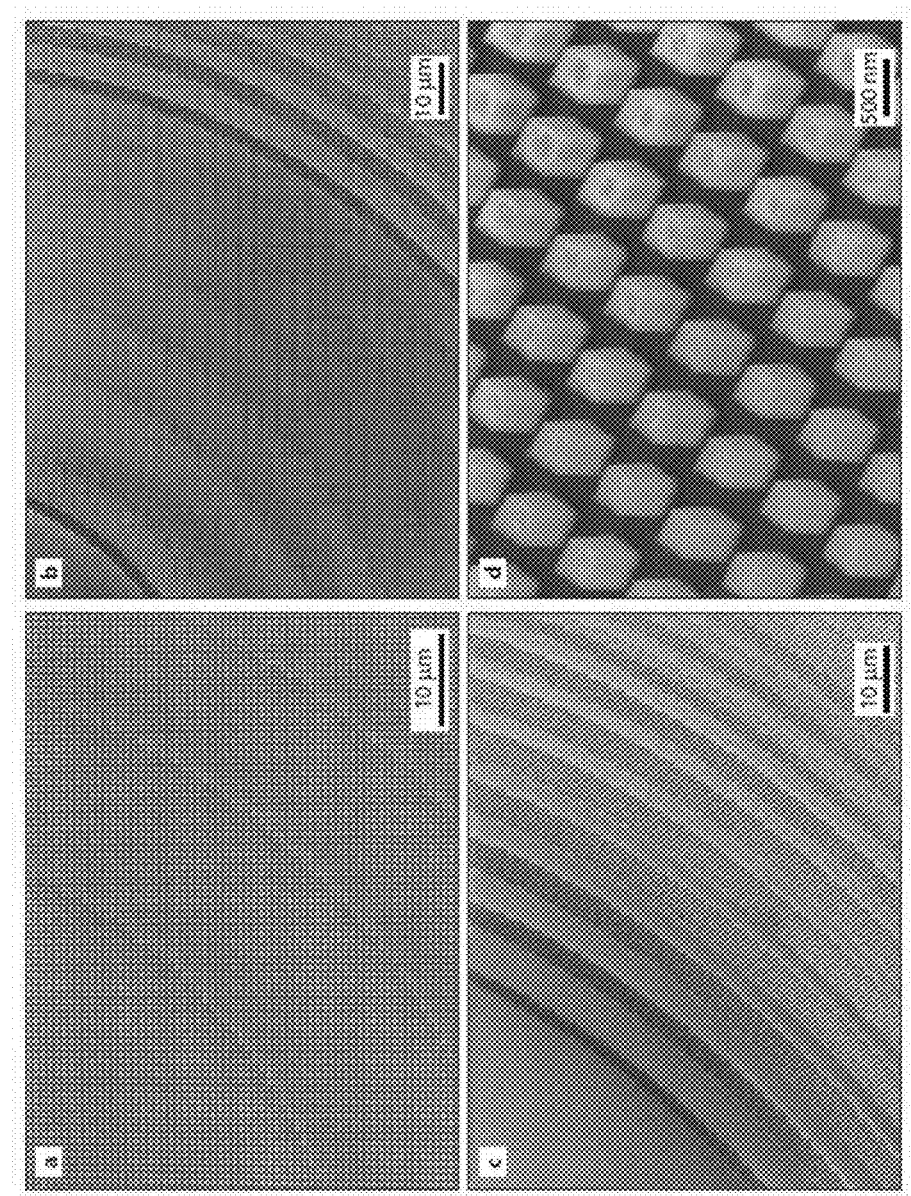
FIG. 21 illustrates scanning electron micrographs of exemplary metasurface.

FIG. 21 illustrates scanning electron micrographs of exemplary metasurface focusing mirrors with an 850 μm focal distance: in panel a, a regular metasurface mirror; in panel b, a dispersionless metasurface mirror with σ=300 nm; in panel c, σ=50 nm; and in panel d, fabricated meta-atoms.

FIG. 22 illustrates exemplary measurement setups. In panel a, FIG. 22 illustrates a schematic diagram of the setup used to measure the deflection angles of gratings, and focus patterns and axial plane intensity distributions of focusing mirrors at different wavelengths. To measure the efficiency of the focusing mirrors, the flip mirror, iris, and optical power meter were used. In panel b, FIG. 22 illustrates the setup used to measure the efficiencies of the gratings. The power meter was placed at a long enough distance such that the other diffraction orders fell safely outside its active aperture area.

Figure 23:
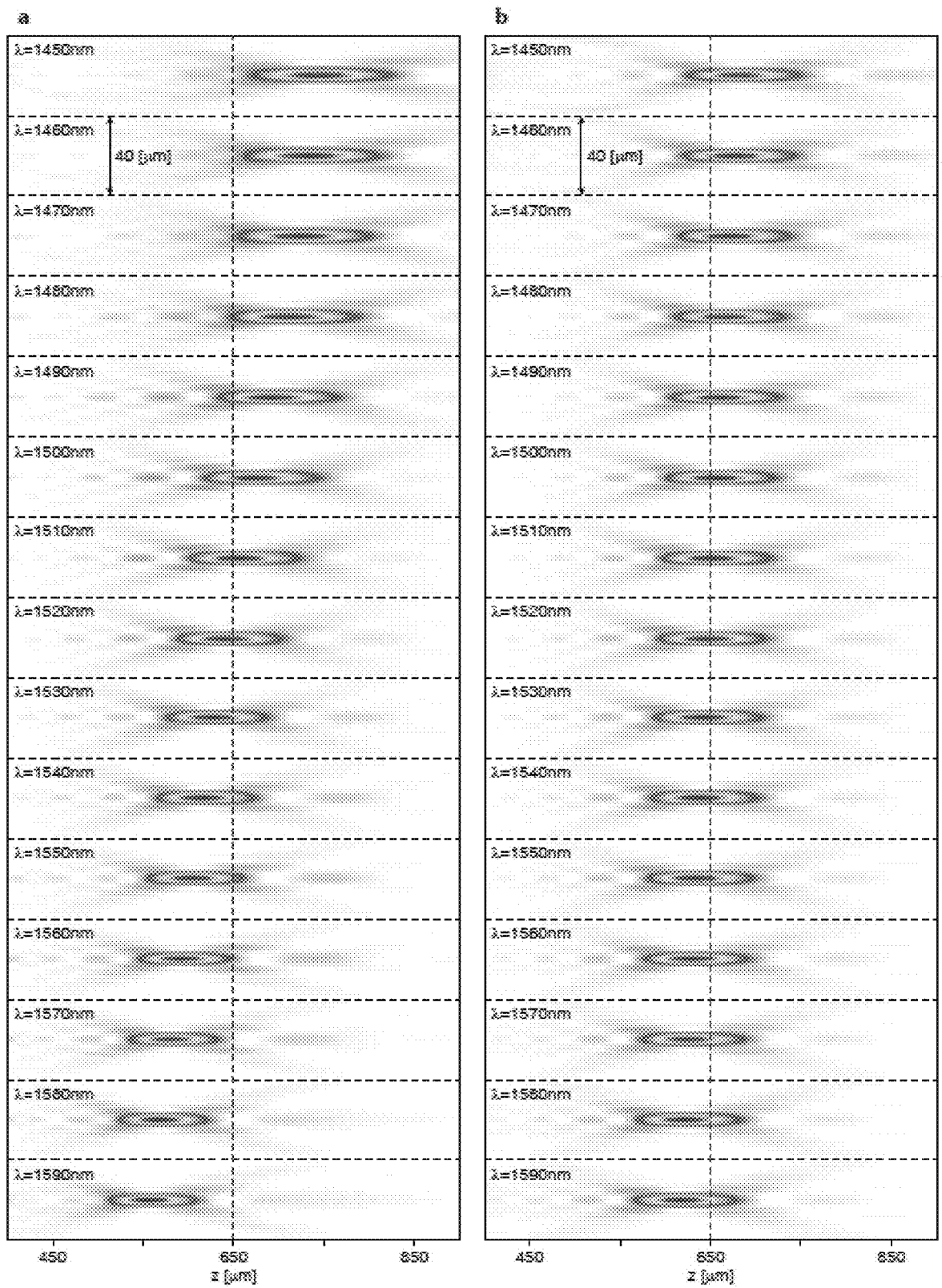
Figure 24:
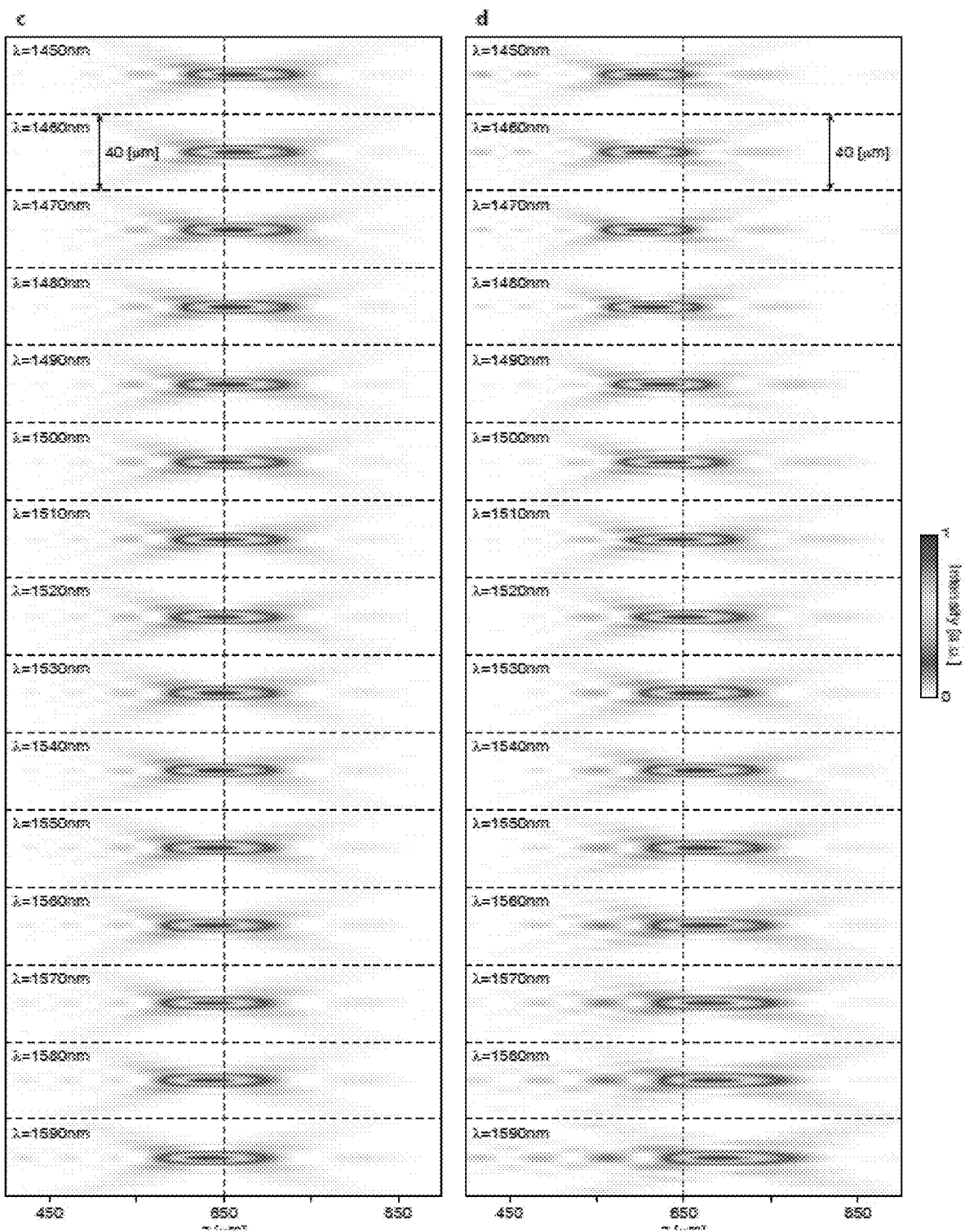

FIGS. 23-24 illustrate simulated axial intensity distribution for exemplary focusing mirrors with different dispersions designed using the reflective α-Si nano-posts discussed with reference to FIG. 13, panel a. In panel a, FIG. 23 illustrates data for a hyper-dispersive mirror. In panel b, FIG. 23 illustrates data for a mirror with regular dispersion. In panel c, FIG. 24 illustrates data for a mirror with zero dispersion. In panel d, FIG. 24 illustrates data for a mirror with a positive dispersion with an amplitude twice the regular negative dispersion.

Figure 25:
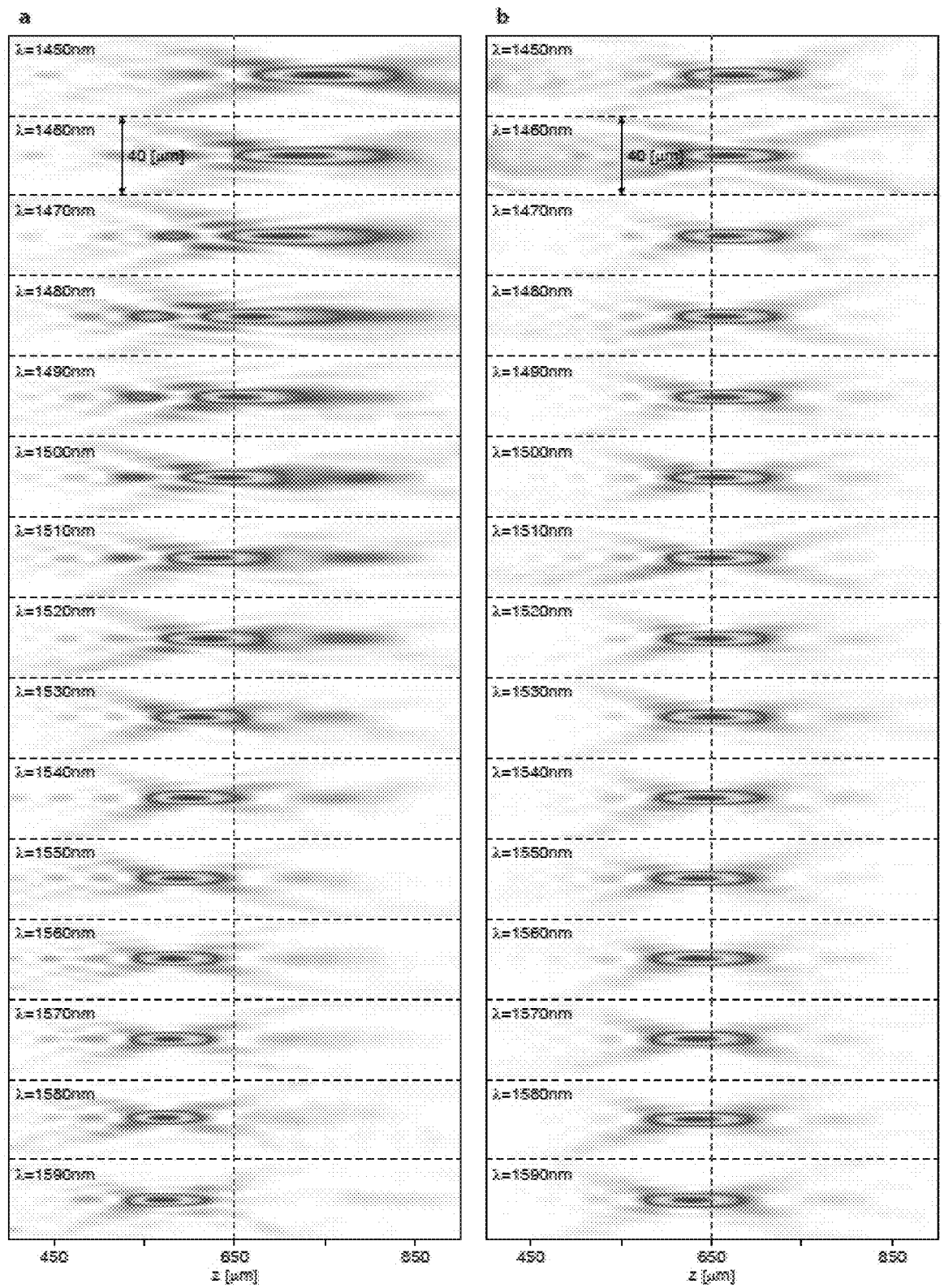
FIGS. 25-26 illustrate measured axial intensity distributions for focusing mirrors with different dispersions designed using the reflective α-Si nano-posts discussed in FIG. 13, panel b.
Figure 26:
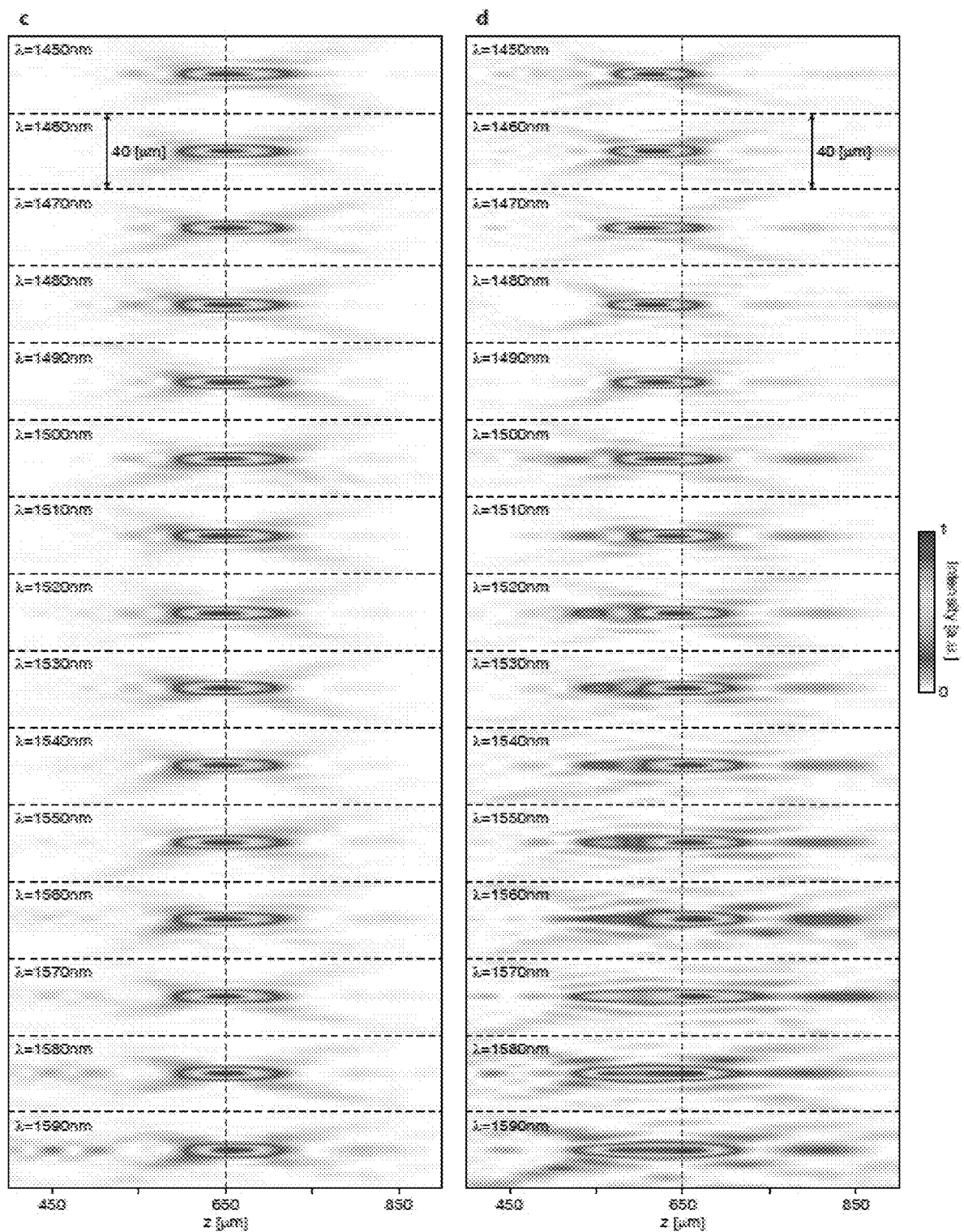

FIGS. 25-26 illustrate measured axial intensity distributions for focusing mirrors with different dispersions designed using the reflective α-Si nano-posts discussed in FIG. 13, panel b. In panel a, FIG. 25 illustrates data for a hyper-dispersive mirror. In panel b, FIG. 25 illustrates data for a mirror with regular dispersion. In panel c, FIG. 26 illustrates data for a mirror with zero dispersion. In panel d, FIG. 26 illustrates data for a mirror with a positive dispersion with an amplitude twice the regular negative dispersion.

Figure 27:
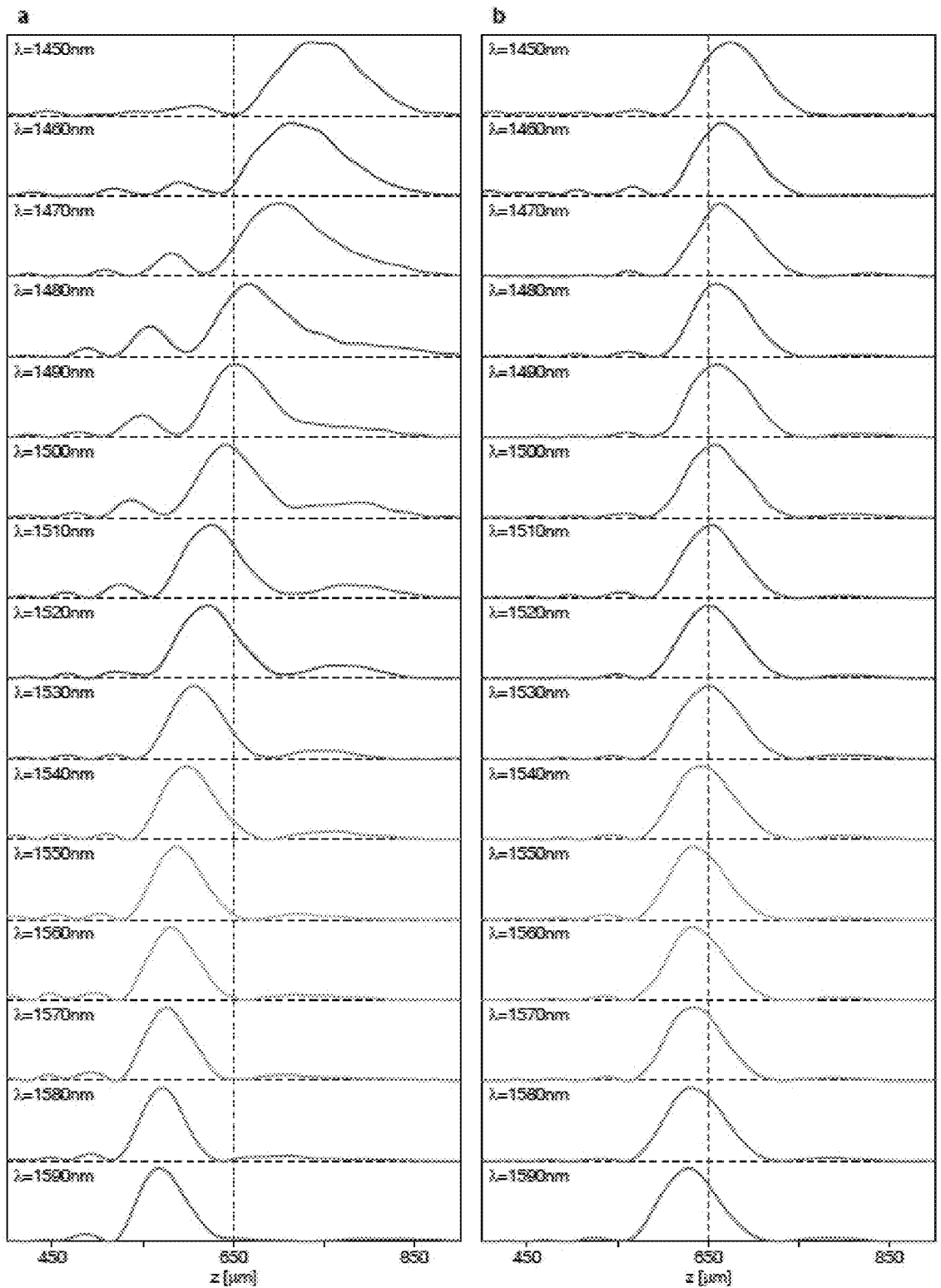
FIGS. 27-28 illustrate one-dimensional cuts of the measured axial intensities plotted in FIGS. 25-26.
Figure 28:
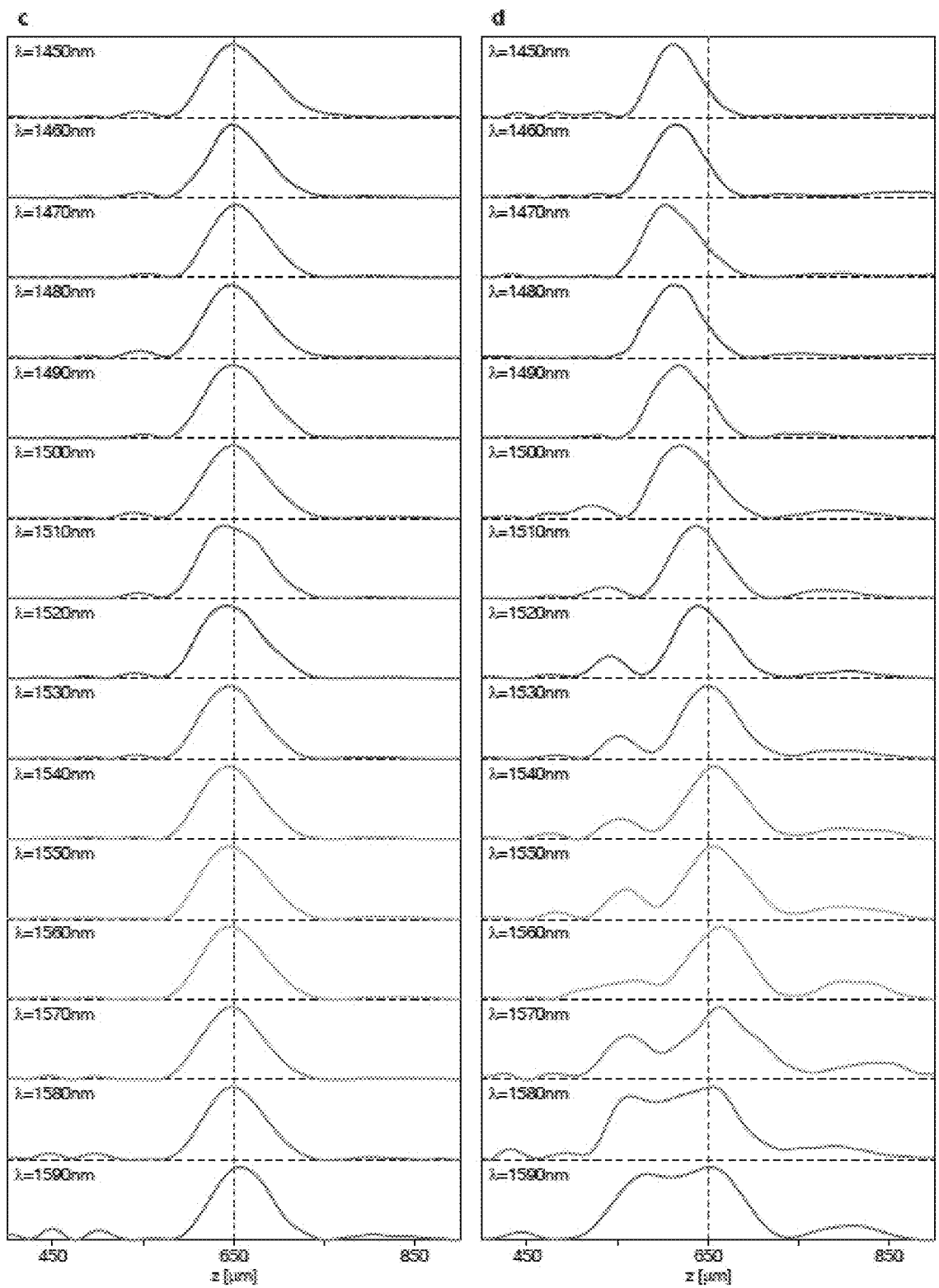

FIGS. 27-28 illustrate one-dimensional cuts of the measured axial intensities plotted in FIGS. 25-26. In panel a, FIG. 27 illustrates data for a hyper-dispersive mirror. In panel b, FIG. 27 illustrates data for a mirror with regular dispersion. In panel c, FIG. 28 illustrates data for a mirror with zero dispersion. In panel d, FIG. 28 illustrates data for a mirror with a positive dispersion with an amplitude twice the regular negative dispersion.

Figure 29:
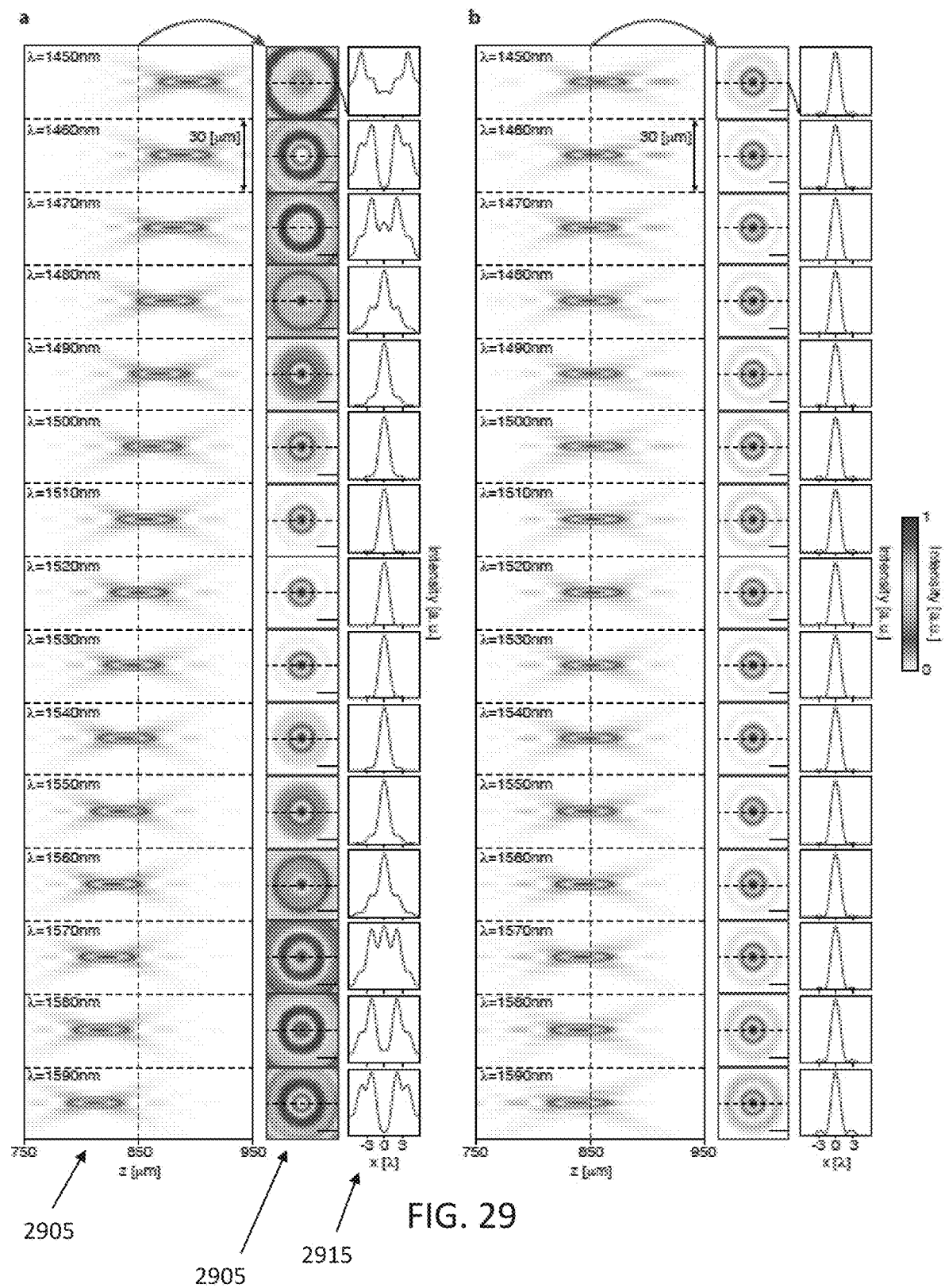
FIG. 29 illustrates extended simulation results for the regular and dispersionless mirrors.

FIG. 29 illustrates extended simulation results for the regular and dispersionless mirrors discussed in FIGS. 13-16. In panel a, FIG. 29 illustrates simulated axial plane (2905) and focal plane (2910) intensities for a regular metasurface focusing mirror designed using the proposed reflective dielectric meta-atoms. One-dimensional cross-sections of the focal plane intensity is plotted in (2915). The exemplary focusing mirror has a diameter of 500 µm and a focal distance of 850 µm at 1520 nm. In panel b, FIG. 29 illustrates similar results for a focusing mirror with the same parameters designed to have a minimal dispersion in the bandwidth. Scale bars: 2λ.

Figure 30:
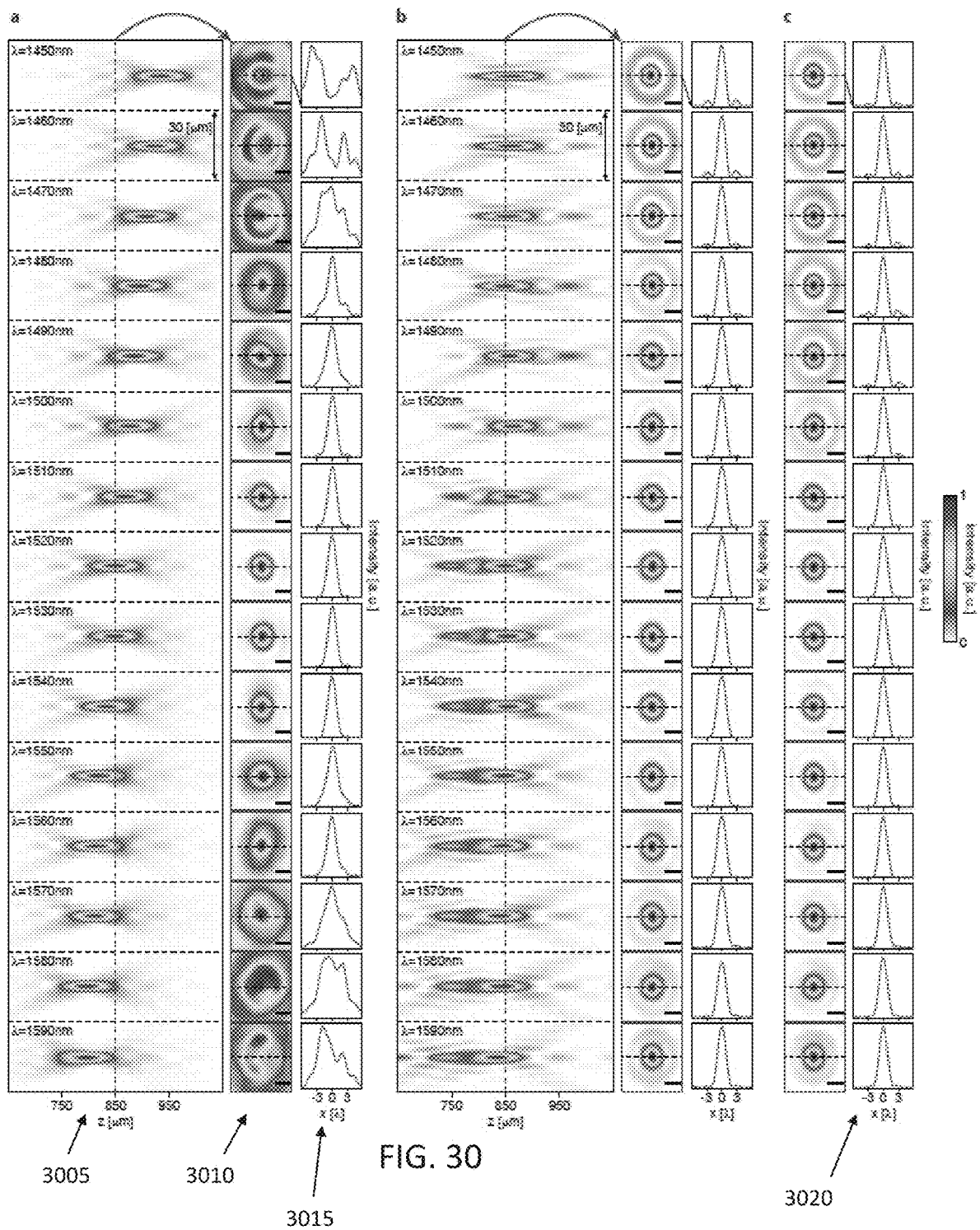
FIG. 30 illustrates complete measurement results for the dispersionless and regular mirrors discussed in FIGS. 13-16.

FIG. 30 illustrates complete measurement results for the dispersionless and regular mirrors discussed in FIGS. 13-16. In panel a, FIG. 30 illustrates measured intensities for the regular metasurface mirror. The axial plane intensities are shown in (3005), the measured intensities in the 850 µm plane are plotted in (3010), and one dimensional cuts of the focal plane measurements are shown in (3015). In panel b, FIG. 30 illustrates results in a similar manner as in panel a, but for the dispersionless mirror design with σ=300 nm. In panel c, FIG. 30 illustrates measured intensities in the plane 850 µm away from the surface of the dispersionless mirror with σ=50 nm. One dimensional cuts of the measured intensities are shown in (3020). Scale bars: 2λ.

Figure 31:
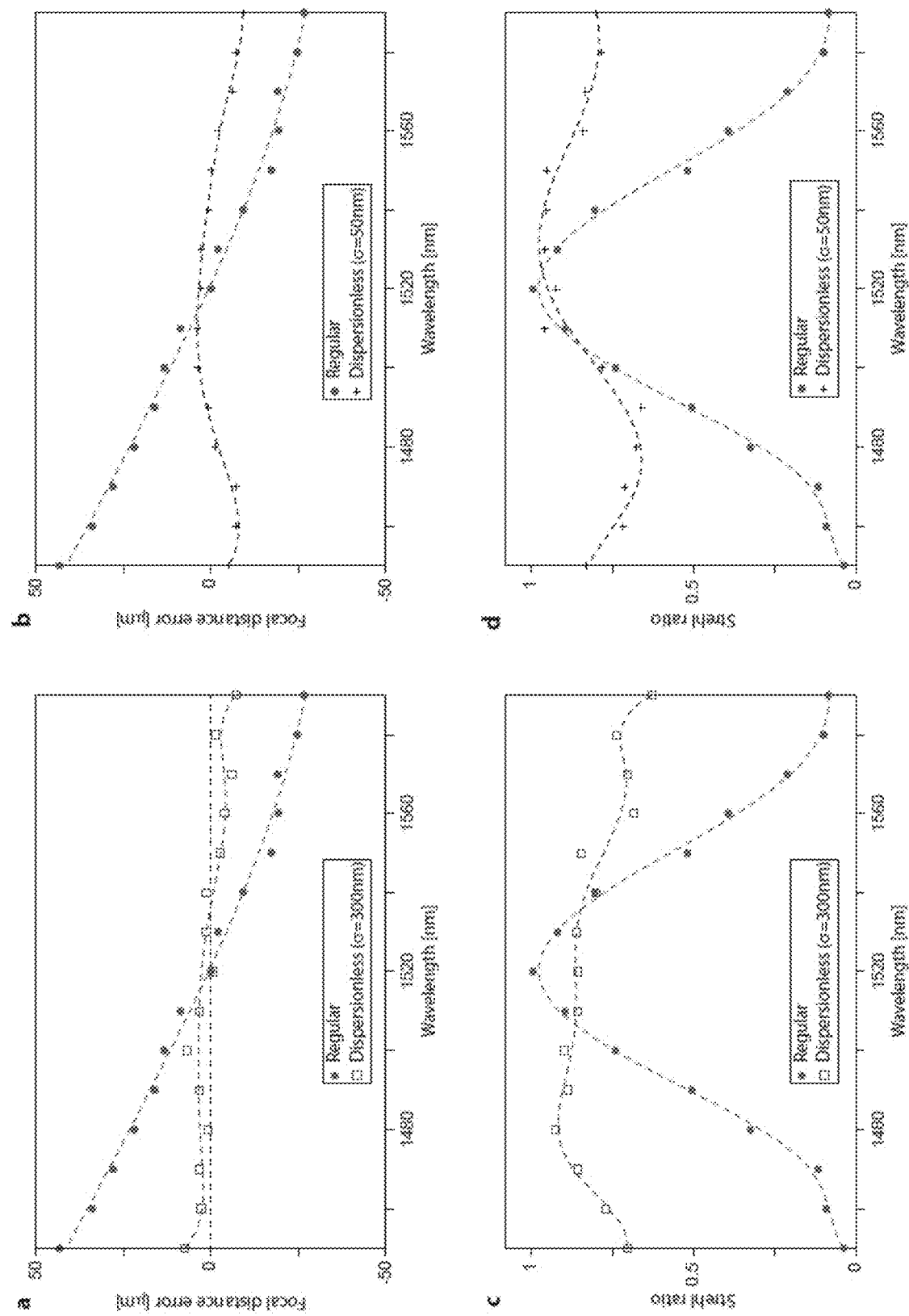
FIG. 31 illustrates measured focal distances and Strehl ratios for the regular and dispersionless mirrors.

FIG. 31 illustrates measured focal distances and Strehl ratios for the regular and dispersionless mirrors. In panel a, FIG. 31 illustrates measured focal distances for the regular and dispersionless (σ=300 nm) mirrors (as in FIG. 13). In panel b, FIG. 31 illustrates measured focal distances for the regular and dispersionless (σ=50 nm) mirrors. In panel c, FIG. 31 illustrates Strehl ratios calculated from the measured two dimensional modulation transfer functions (MTF) of the regular and dispersionless (σ=300 nm) metasurface mirrors. To find the Strehl ratio, the volume enclosed by the normalized two dimensional MTF is calculated at each wavelength. In panel d, FIG. 31 illustrates similar graphs as in panel c, calculated and plotted for the σ=50 nm dispersionless mirror. In both cases, a clear flattening of the Strehl ratio, which is a measure of the contrast of an image formed by the mirror, is observed compared to the regular metasurface mirror.

Figure 32:
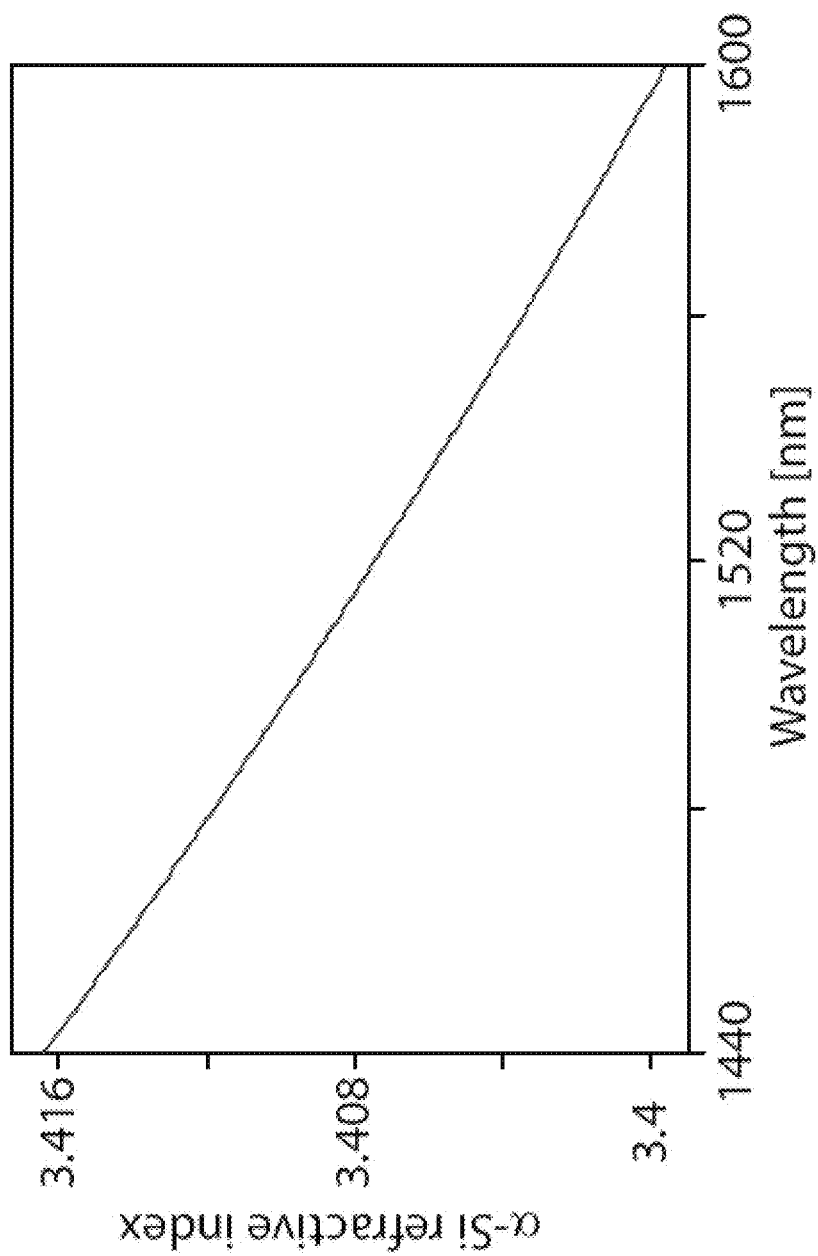
FIG. 32 illustrates the refractive index of amorphous silicon.

FIG. 32 illustrates the refractive index of amorphous silicon. The refractive index values were obtained using spectroscopic ellipsometry. FIG. 33 illustrates a schematic of an exemplary metasurface. The exemplary metasurface (3320) is located between two uniform materials (3315) with wave impedances of $\Theta_1$ and $\eta_2$, and it is illuminated with a normally incident plane wave from the top side (3325). Virtual planar boundaries $\Gamma_1$ and $\Gamma_2$ (3305,3310) can be used for calculating field integrals on each side of the metasurface.

In some embodiments, the lateral dimension of the scattering elements is varied, while in other embodiments another geometrical dimension, such as the height, is varied instead. In other embodiments, both geometrical dimensions can be varied. In some embodiments, the methods comprise setting a desired phase and chromatic dispersion for a diffractive metasurface device having a desired functionality over a bandwidth of interest. The metasurface structures have been termed lenses in the present disclosure, however such structures can generally be referred to as metasurface devices, as different functionalities may be implemented.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present disclosure, shown in the reference list below, are incorporated herein by reference in their entirety.

REFERENCES

[1] Arbabi, A., Horie, Y., Ball, A. J., Bagheri, M. & Faraon, A. "Subwavelength-thick lenses with high numerical apertures and large efficiency based on high-contrast transmitarrays," Nat. Commun. 6, 7069 (2015).

[2] Arbabi, A., Horie, Y., Bagheri, M. & Faraon, A. "Dielectric metasurfaces for complete control of phase and polarization with subwavelength spatial resolution and high transmission," Nat. Nanotechnol. 10, 937-943 (2015).
[3] A. Arbabi, M. Bagheri, A. Ball, Y. Horie, D. Fattal, and A. Faraon, "Controlling the Phase Front of Optical Fiber Beams using High Contrast Metastructures," in CLEO: 2014.
[4] A. Arbabi, Y. Horie, M. Bagheri, A. Faraon, "Highly efficient polarization control using subwavelength high contrast transmitarrays," Proc. SPIE: 2015.
[5] A. Arbabi, Y. Horie, A. J. Ball, M. Bagheri, A. Faraon, "Efficient high NA flat micro-lenses realized using high contrast transmitarrays," Proc. SPIE 2015.
[6] Born, M. & Wolf, E. Principles of Optics: Electromagnetic Theory of Propagation, Interference and Diffraction of Light (Cambridge University Press, 1999).
[7] O'Shea, D. C., Suleski, T. J., Kathman, A. D. & Prather, D. W. Diffractive Optics: Design, Fabrication, and Test (SPIE Press, 2004).
[8] Kildishev, A. V., Boltasseva, A. & Shalaev, V. M. Planar photonics with metasurfaces. Science 339, 1232009 (2013).
[9] Yu, N. & Capasso, F. Flat optics with designer metasurfaces. Nat. Mater. 13, 139-150 (2014).
[10] Jahani, S. & Jacob, Z. All-dielectric metamaterials. Nat. Nanotechnol. 11, 23-36 (2016).
[11] Koenderink, A. F., Al, A. & Polman, A. Nanophotonics: Shrinking light-based technology. Science 348, 516-521 (2015).
[12] Lalanne, P., Astilean, S., Chavel, P., Cambril, E. & Launois, H. Blazed binary subwavelength gratings with efficiencies larger than those of conventional chelette gratings. Opt. Lett. 23, 1081-1083 (1998).
[13] Lalanne, P., Astilean, S., Chavel, P., Cambril, E. & Launois, H. Design and fabrication of blazed binary diffractive elements with sampling periods smaller than the structural cutoff. J. Opt. Soc. Am. A 16, 1143-1156 (1999).
[14] Fattal, D., Li, J., Peng, Z., Fiorentino, M. & Beausoleil, R. G. Flat dielectric grating reflectors with focusing abilities. Nat. Photon. 4, 466-470 (2010).
[15] Yin, X., Ye, Z., Rho, J., Wang, Y. & Zhang, X. Photonic spin hall effect at metasurfaces. Science 339, 1405-1407 (2013).
[16] Lee, J. et al. Giant nonlinear response from plasmonic metasurfaces coupled to intersubband transitions. Nature 511, 65-69 (2014).
[17] Silva, A. et al. Performing mathematical operations with metamaterials. Science 343, 160-163 (2014).
[18] Ni, X., Ishii, S., Kildishev, A. V. & Shalaev, V. M. Ultra-thin, planar, babinet-inverted plasmonic metalenses. Light: Sci. Appl. 2, e72 (2013).
[19] Vo, S. et al. Sub-wavelength grating lenses with a twist. IEEE Photonics Technol. Lett. 26, 1375-1378 (2014).
[20] Lin, D., Fan, P., Hasman, E. & Brongersma, M. L. Dielectric gradient metasurface optical elements. Science 345, 298-302 (2014).
[21] Yu, Y. F. et al. High-transmission dielectric metasurface with $2\pi$ phase control at visible wavelengths. Laser Photon. Rev. 9, 412-418 (2015).
[22] Decker, M. et al. High-efficiency dielectric huygens surfaces. Adv. Opt. Mater. 3, 813-820 (2015).
[23] Wang, Q. et al. Optically reconfigurable metasurfaces and photonic devices based on phase change materials. Nat. Photon. 10, 60-65 (2016).
[24] Kamali, S. M., Arbabi, E., Arbabi, A., Horie, Y. & Faraon, A. Highly tunable elastic dielectric metasurface lenses. arXiv:1604.03597 (2016).
[25] Faraon, A., Arbabi, A., Horie, Y., Arbabi, E. & Kamali, S. M. Flat free-space optical elements based on dielectric metasurfaces. SPIE Newsroom 6375.
[26] Kamali, S. M., Arbabi, A., Arbabi, E., Horie, Y. & Faraon, A. Decoupling optical function and geometrical form using conformal flexible dielectric metasurfaces. Nat. Commun. 7, 11618 (2016).
[27] Sauvan, C., Lalanne, P. & Lee, M.-S. L. Broadband blazing with artificial dielectrics. Opt. Lett. 29, 1593-1595 (2004).
[28] Arbabi, E., Arbabi, A., Kamali, S. M., Horie, Y. & Faraon, A. Multiwavelength polarizationinsensitive lenses based on dielectric metasurfaces with meta-molecules. Optica 3, 628-633 (2016).
[29] Faklis, D. & Morris, G. M. Spectral properties of multiorder diffractive lenses. Appl. Opt. 34, 2462-2468 (1995).
[30] Aieta, F., Kats, M. A., Genevet, P. & Capasso, F. Multiwavelength achromatic metasurfaces by dispersive phase compensation. Science 347, 1342-1345 (2015).
[31] Lalanne, P. Waveguiding in blazed-binary diffractive elements. J. Opt. Soc. Am. A 16, 2517-2520 (1999).
[32] Liu, V. & Fan, S. S4: A free electromagnetic solver for layered periodic structures. Comput. Phys. Commun. 183, 2233-2244 (2012).
[33] Oskooi, A. F. et al. Meep: A flexible free-software package for electromagnetic simulations by the fdtd method. Comput. Phys. Commun. 181, 687-702 (2010).
[34] Harrington, R. Time-Harmonic Electromagnetic Fields (Wiley, 2001).

What is claimed is:

1. A method comprising:
setting a desired phase and chromatic dispersion for a diffractive metasurface device having a desired functionality over a bandwidth;
calculating a phase and chromatic dispersion of a scattering element for electromagnetic waves incident on the scattering element, as a function of wavelength of the electromagnetic waves, and as a function of geometrical dimensions of the scattering element;
at a plurality of locations on the diffractive metasurface device, minimizing an error between the desired phase and chromatic dispersion of the diffractive metasurface device and the calculated phase and chromatic dispersion of the scattering element, the minimizing being by varying the geometrical dimensions of the scattering element;
designing the diffractive metasurface device by arranging, at each location of the plurality of locations, a scattering element that minimizes the error; and
fabricating the diffractive metasurface device according to the designing.

2. The method of claim 1, wherein varying the geometrical dimensions of the scattering element is by changing the lateral dimension of the scattering element.

3. The method of claim 1, wherein varying the geometrical dimensions of the scattering element is by changing the height of the scattering element.

4. The method of claim 1, wherein the diffractive metasurface device operates in reflection mode.

5. The method of claim 1, wherein the diffractive metasurface device operates in transmission mode.

6. The method of claim 1, wherein minimizing an error is according to a cost function.

7. The method of claim 1, wherein the scattering element is a post on a spacer layer, the spacer layer being on a metallic layer and having a lower refractive index than the post.

8. The method of claim 7, wherein the post is a cylinder.

9. The method of claim 7, wherein the post is a parallelepiped.

10. The method of claim 1, wherein the scattering element is amorphous Si and the spacer layer is $SiO_2$.

11. The method of claim 1, wherein the plurality of locations forms a periodic lattice.

12. The method of claim 1, wherein the diffractive metasurface device comprises at least a first group of scattering elements having at least one geometrical dimension different from at least a second group of scattering elements.

* * * * *